(12) United States Patent
Lee

(10) Patent No.: US 10,136,053 B2
(45) Date of Patent: Nov. 20, 2018

(54) SYSTEM AND METHOD FOR CONTROLLING A SPECIMEN SCANNER REMOTELY

(71) Applicant: Innova Plex, Inc., Sugar Land, TX (US)

(72) Inventor: Bernard Lee, Sugar Land, TX (US)

(73) Assignee: Innova Plex, Inc., Sugar Land, TX (US)

( * ) Notice: Subject to any disclaimer, the term of this patent is extended or adjusted under 35 U.S.C. 154(b) by 160 days.

(21) Appl. No.: 15/076,582

(22) Filed: Mar. 21, 2016

(65) Prior Publication Data

US 2016/0277663 A1 Sep. 22, 2016

Related U.S. Application Data

(63) Continuation of application No. 14/664,883, filed on Mar. 22, 2015, now Pat. No. 9,854,163.

(51) Int. Cl.
| | |
|---|---|
| *H04N 7/18* | (2006.01) |
| *H04N 9/47* | (2006.01) |
| *H04N 5/232* | (2006.01) |
| *H04N 5/225* | (2006.01) |
| *G02B 21/36* | (2006.01) |
| *G02B 21/00* | (2006.01) |
| *G06T 7/571* | (2017.01) |
| *G02B 21/24* | (2006.01) |

(52) U.S. Cl.
CPC ....... *H04N 5/23229* (2013.01); *G02B 21/006* (2013.01); *G02B 21/0032* (2013.01); *G02B 21/0036* (2013.01); *G02B 21/0056* (2013.01); *G02B 21/244* (2013.01); *G02B 21/367* (2013.01); *G06T 7/571* (2017.01); *H04N 5/2256* (2013.01); *H04N 5/23206* (2013.01); *H04N 5/23212* (2013.01); *H04N 5/23216* (2013.01); *G06T 2207/10056* (2013.01); *G06T 2207/10148* (2013.01); *G06T 2207/30024* (2013.01)

(58) Field of Classification Search
None
See application file for complete search history.

(56) References Cited

U.S. PATENT DOCUMENTS

| 5,918,274 A * | 6/1999 | Chen | B82Y 35/00 |
| | | | 73/105 |
| 2005/0119527 A1* | 6/2005 | Banik | A61B 1/00059 |
| | | | 600/117 |

(Continued)

*Primary Examiner* — Talha M Nawaz
(74) *Attorney, Agent, or Firm* — Spradley PLLC; Michael Spradley

(57) ABSTRACT

This disclosure teaches a system and method for controlling a specimen scanner remotely. In one embodiment, a method for controlling a specimen scanner remotely can comprise the step of communicating with a specimen scanner to a network. The specimen scanner can comprise a camera, a stage, one or more lenses, and one or more light sources. The method can comprise the additional step of providing a graphical user interface to a remote computer connected to the network. The graphical user interface can be operable to control the camera, choose one of the one or more lenses, and adjust the one or more light sources. The method can further comprise the step of receiving instructions from the remote computer, and controlling the specimen scanner based on those instructions.

22 Claims, 56 Drawing Sheets

(56) References Cited

U.S. PATENT DOCUMENTS

| | | | |
|---|---|---|---|
| 2005/0197536 A1* | 9/2005 | Banik | A61B 1/00059 600/179 |
| 2006/0234586 A1* | 10/2006 | Wong | A47L 13/16 442/327 |
| 2011/0209901 A1* | 9/2011 | MacDonald | C08J 7/04 174/254 |
| 2014/0150562 A1* | 6/2014 | Warren | G01Q 60/366 73/780 |
| 2015/0192769 A1* | 7/2015 | Dresel | G02B 21/367 356/450 |
| 2016/0216413 A1* | 7/2016 | Naismith | G02B 5/0221 |

* cited by examiner

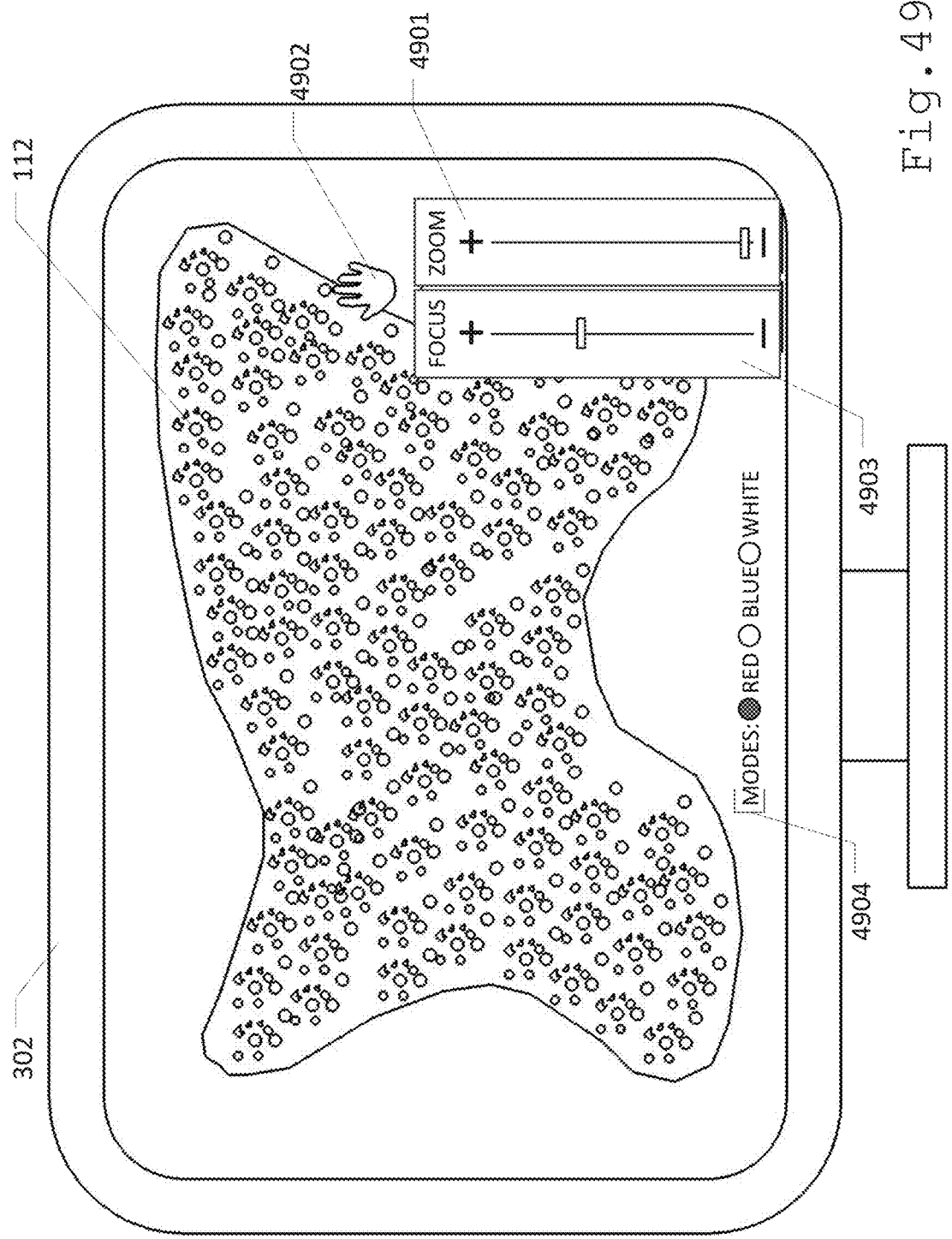

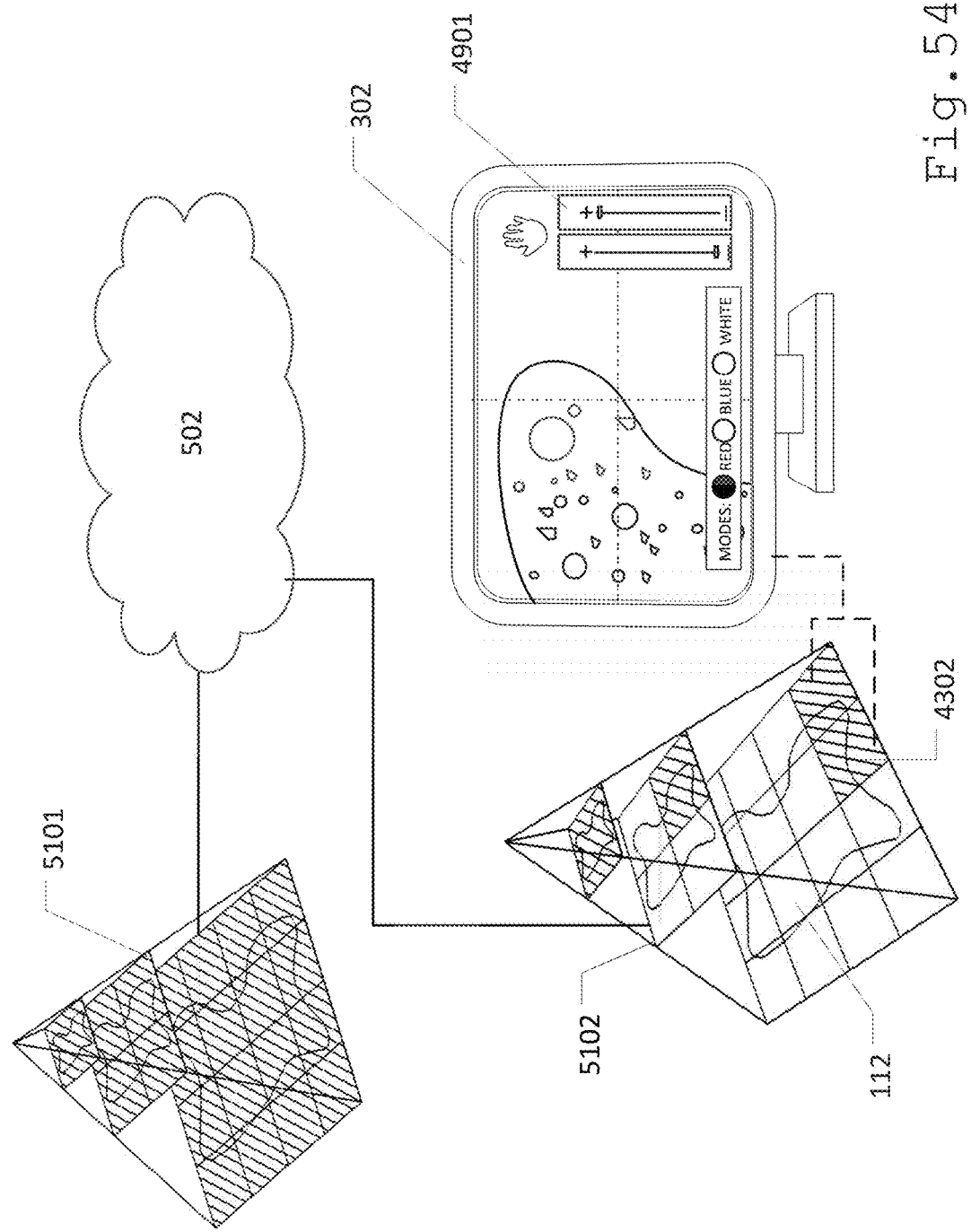

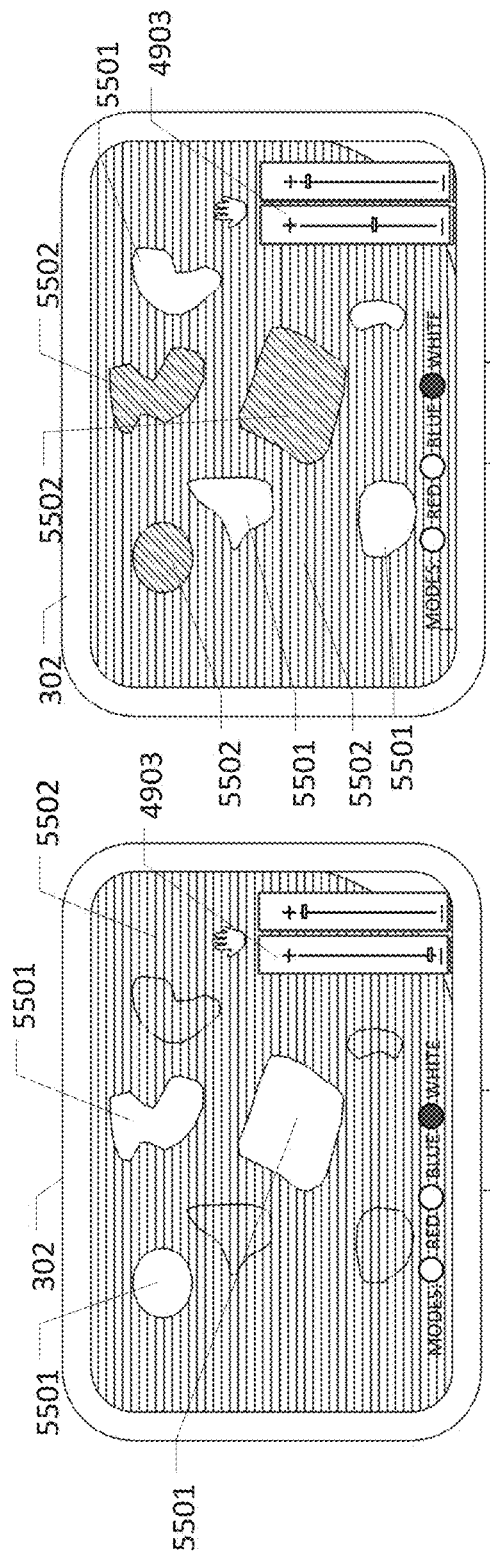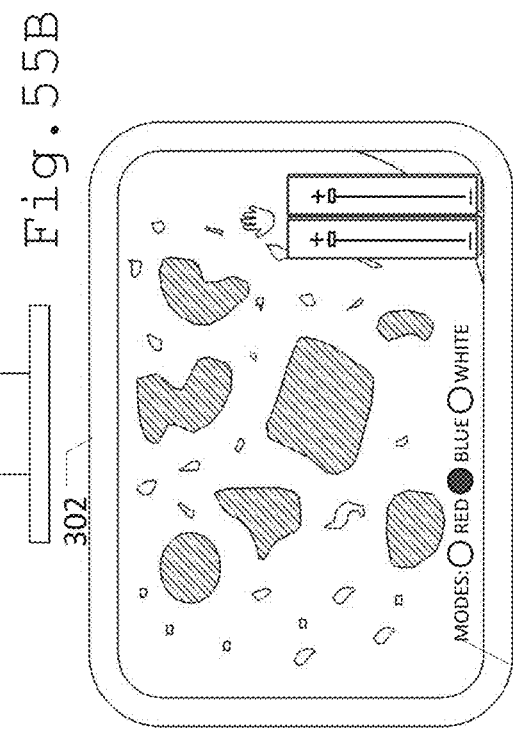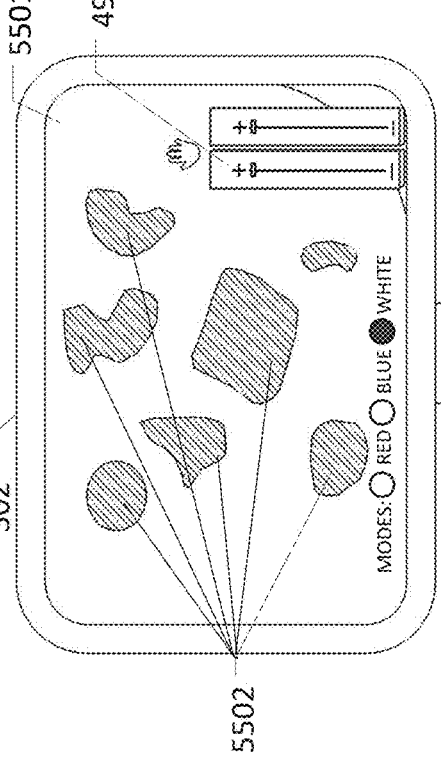

SYSTEM AND METHOD FOR CONTROLLING A SPECIMEN SCANNER REMOTELY

BACKGROUND

This disclosure relates to a system and method for producing reflective light comprising a parabolic mirror, a system and method for producing reflective light comprising a digital light-processing chip, a system and method for producing transmitted light using a digital light processing chip, an improved method for adjusting white balance, a system and method for controlling a specimen scanner remotely, a system and method for scanning a specimen into a focus-stacked scan, a system and method for scanning a specimen into a multi-dimensional scan, and an improved pyramidal file structure and method of use.

During recent years, oil companies have highly benefited in applying micropaleontological studies for petroleum explorations. Furthermore, applying micropaleontological studies to explorations have resulted in better accuracy, less time consumption, and reasonable cost in finding and/or developing oil reserves. Therefore, in association with the high success rate of using micropaleontological studies, demands for micropaleontologists are also increasing. However, at the present there are limited numbers of licensed specialists that can do this work. Further, while it would be quite advantageous for micropaleontologists to perform their tasks remotely, such remote work is not presently being done for a number of reasons. First, there is presently no specimen scanner known or used within the field of paleontology. Second, the components within a traditional microscope, i.e., the objective lens, reflective light source, stage, and transmitted light source, can be quite bulky, and as such make professional microscopes and potential specimen scanners using such parts, difficult to move to offshore environments by a single person. Third, necessary methods for correcting white balance often require cumbersome steps such as removing specimens from a stage. Fourth, if a specimen were to be completely scanned, a resulting file that contained all the information of the specimen could be many gigabytes in size, making it impractical for transfer and viewing. Lastly, creation of a scan often would require input from a paleontologist. However, no system exists for a paleontologist to remotely control a microscope, scanner, or other such device within a drilling environment.

As such it would be useful to have improved reflected and transmitted light systems. a system and method for controlling a specimen scanner remotely. Further, it would be useful to have an improved method for adjusting white balance. Further, it would be useful to have a system and method for scanning a specimen into a focus-stacked scan. Further, it would be useful to have a system and method for scanning a specimen to create a multidimensional scan. Lastly, it would be useful to have an improved pyramidal file structure and method of use thereof.

SUMMARY

This disclosure teaches a system and method for controlling a specimen scanner remotely.

In one embodiment, a method for controlling a specimen scanner remotely can comprise the step of communicating with a specimen scanner to a network. The specimen scanner can comprise a camera, a stage, one or more lenses, and one or more light sources. The method can comprise the additional step of providing a graphical user interface to a remote computer connected to the network. The graphical user interface can be operable to control the camera, choose one of the one or more lenses, and adjust the one or more light sources. The method can further comprise the step of receiving instructions from the remote computer, and controlling the specimen scanner based on those instructions.

In another embodiment, a system for controlling a specimen scanner remotely can comprise a server memory and server processor. The server memory can comprise a server application and a server data store. The server processor can, at the instructions of the server application, communicate with a specimen scanner over a network. The specimen scanner can comprise a camera, a stage, one or more lenses, and one or more light sources. The server application can also provide a graphical user interface to a remote computer connected to the network. The graphical user interface can be operable to control the camera, choose the one or more lenses, and adjust the one or more light sources. The server application can also receive instruction from the remote computer and control the specimen scanner based on the instructions.

In another embodiment, a computer readable storage medium can store a computer readable program code. The computer readable program code can be adapted to be executed to communicate with a specimen scanner over a network. The specimen scanner can comprise a camera, a stage, one or more lenses, and one or more light sources. The code can further be executed to provide a graphical user interface to a remote computer connected to the network. The graphical user interface can be operable to control the camera, choose the one or more lenses, and adjust the one or more light sources. The code can also be adapted to be executed to receive instruction from the remote computer and control the specimen scanner based on the instructions.

This disclosure also teaches a system and method for scanning a specimen into a focus-stacked scan.

In one embodiment, a method for scanning the specimen into a focus-stacked scan can comprise illuminating the specimen with a light. The specimen can comprise a topography. The depths of the topography can be variable along a z-axis. The method can also comprise dividing the specimen into a plurality of regions. Each of the regions can comprise a regional peak in the topography. Additionally, the method can comprise sampling each of the regions at a plurality of focal planes orthogonal to the z-axis by capturing, at each focal plane, an image of the region. The image can be focused on the focal plane. Lastly, the method can comprise focus-stacking, for each of the region the images within the region, into a focus-stacked image, and stitching together the focus-stacked images.

In another embodiment, a system for scanning a specimen into a focus-stacked scan can comprise a specimen scanner. The specimen scanner can comprise a camera, a stage capable of supporting a specimen, a light source capable of illuminating the specimen, a scanner processor, and a scanner memory. The scanner memory can comprise a scanner application. The scanner application can be capable of directing the light source to illuminate said specimen with a light. The specimen can comprise a topography. The depths of the topography can be variable along a z-axis. Furthermore, the scanner application can be capable of dividing the specimen into a plurality of regions. Each of the regions can comprise a regional peak in the topography. The method can also comprise sampling each of the regions at a plurality of focal planes orthogonal to the z-axis by capturing with the camera, at each focal plane, an image of the region. The image can be focused on the focal plane. Moreover, the scanner application can be capable of focus-stacking, for each of the region the images within the region, into a focus-stacked image, and stitching together the focus-stacked images.

In another embodiment, a method for scanning a specimen can comprise the steps of aiming a camera at a plurality of regions of a specimen, one region at a time, and illuminating the specimen with one or more lights. The method can also comprise capturing at each of the regions for each of the lights, at a plurality of focal planes for each focal plane, an image of the region. The image can be focused on the focal plane. Additionally, the method can comprise focus-stacking, for each of the region the images captured with a common light of one or more lights, within the region, into a focus-stacked images. Lastly, method can comprise stitching together the focus-stacked images captured with the common light.

This disclosure also teaches a system and method for scanning a specimen to create a multidimensional scan.

In one embodiment, a method for scanning the specimen to create a multidimensional scan can comprise illuminating a specimen with a light and dividing the specimen into a plurality of regions. The specimen can comprise a topography. The depths of the topography can be variable along a z-axis. Each of the regions can comprise a minimum depth and a maximum depth. The topography is between the minimum depth and the maximum depth. The method can also comprise sampling each of the regions at a plurality of focal planes orthogonal to the z-axis by capturing, at each focal plane, an image of the region. The image can be focused on the focal plane. Lastly, the method can comprise stitching together the images into a dimensional image for each of the focal planes.

In another embodiment, a system for scanning the specimen to create a multidimensional scan can comprise a specimen scanner. The specimen scanner can comprise a camera, a stage capable of supporting the specimen, a light source capable of illuminating the specimen, a scanner processor, and a scanner memory. The scanner memory can comprise a scanner application. The scanner application can be capable of illuminating the specimen with a light, and dividing the specimen into a plurality of regions. The specimen can comprise a topography. The depths of the topography can be variable along a z-axis. Each of the regions can comprise a minimum depth and a maximum depth. The topography is between the minimum depth and the maximum depth. Additionally, the scanner application can be capable of sampling each of the regions at a plurality of focal planes orthogonal to the z-axis by capturing, at each focal plane, an image of the region. The image can be focused on the focal plane. Lastly, the scanner application can be capable of stitching together the images into a dimensional image for each of the focus planes.

In another embodiment, a method for scanning a specimen can comprise the steps of aiming a camera at a plurality of regions of a specimen, one region at a time, and illuminating the specimen with one or more lights. The method can also comprise capturing at each of the regions for each of the lights, at a plurality of focal planes for each focal plane, an image of the region. The image can be focused on the focal plane. Lastly, the method can comprise stitching together the images focused on a common focal plane and captured with a common light.

This disclosure also teaches an improved pyramidal file structure and method of use thereof.

A pyramidal file structure can comprise a body and a header. The body can comprise a plurality of layers. The layers divided into tiles. Each of the tiles can be capable of comprising a plurality of images. The header that can define a layer plan, a tile plan, and an image plan.

A method of storing a scan within a pyramidal file structure can comprise defining in a header of a pyramidal file structure a pyramidal data structure. The header can define a layer plan, a tile plan, and an image plan. The method can also comprise storing in each tile of the pyramidal data structure of the pyramidal file structure a plurality of images. The pyramidal data structure can comprise a plurality of layers, each of the layers comprising one or more of the tiles.

A method of receiving a pyramidal file structure can comprise the step of transmitting a header of a pyramidal file structure. The header can define a layer plan, a tile plan, and an image plan, of a pyramidal data structure of the pyramidal file structure. The method can also comprise the step of building the pyramidal data structure based on the layer plan, tile plan, and the image plan. Additionally, the method can comprise the step of transmitting one or more tiles to store within the pyramidal data structure. Each of the one or more tiles can comprise a plurality of images.

BRIEF DESCRIPTION OF THE DRAWINGS

FIG. 49 illustrates a viewer application allowing user to view scans of a specimen within a pyramidal data structure.

FIG. 54 illustrates selecting a different area to view from a remote access.

FIG. 55A illustrates a viewer application viewing a sub-image focused on a focal plane near a region peak.

FIG. 55B illustrates a viewer application viewing a sub-image focused on a focal plane between a regional peak and a maximum depth.

FIG. 55C illustrates a viewer application viewing a sub-image focused on a focal plane near a maximum depth.

FIG. 55D illustrates a viewer application switching modes using mode selection when viewing a multi-modal multi-dimensional pyramidal file structure on a display.

DETAILED DESCRIPTION

Described herein is a system and method for producing reflective light comprising a parabolic mirror, a system and method for producing reflective light comprising a digital light-processing chip, a system and method for producing transmitted light using a digital light processing chip, an improved method for adjusting white balance, a system and method for controlling a specimen scanner remotely, a system and method for scanning a specimen into a focus-stacked scan, a system and method for scanning a specimen into a multi-dimensional scan, and an improved pyramidal file structure and method of use. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
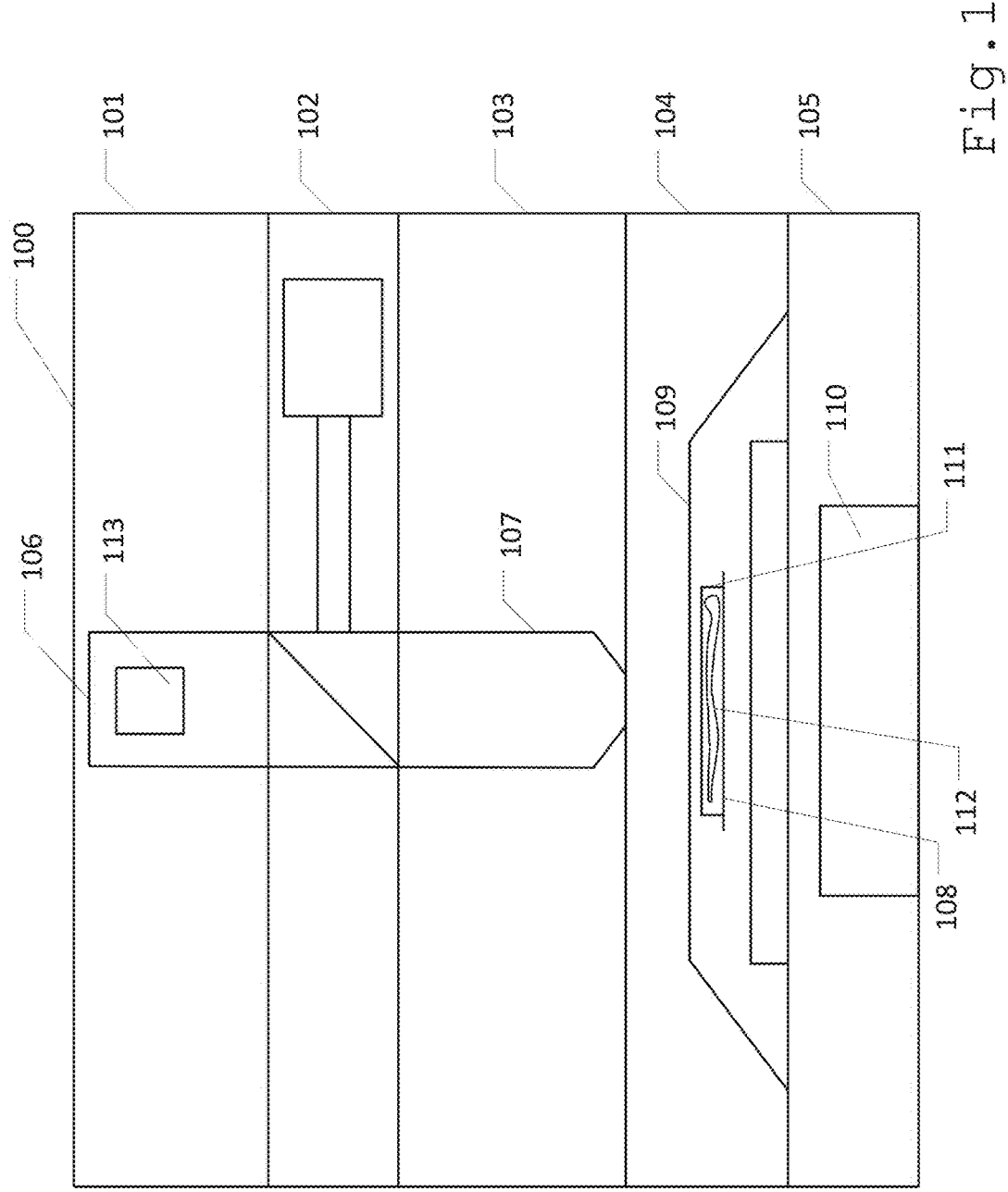
FIG. 1 illustrates a specimen scanner.

FIG. 1 illustrates a specimen scanner 100. Specimen scanner 100 can comprise a camera system 101, a reflective light source system 102, an objective lens system 103, a stage system 104, and/or a transmitted light source system 105. Camera system 101 can comprise a camera 106. Camera 106 can be any optical instrument capable of capturing digital images. In one embodiment, camera 106 can comprise an interferometer 113. Reflective light source system 102 can be one of the systems described further herein. Alternatively, reflective light source system 102 can be any reflective light source known in the art. Reflective light source system 102 can be placed below camera 106. Objective lens system 103 can be positioned below reflective light source system 102. Objective lens system 103 can comprise one or more objective lenses 107 capable of magnifying a specimen. Stage system 104 can comprise a stage 108, and an actuating system 109. Stage 108 can be a platform for specimens, and is in visual alignment with camera 106, and object lens 107. Actuating system 109 can position stage 108. In one embodiment, actuating system 109 can position stage 108 left and right, and forward and backward (XY). In another embodiment, actuating system 109 can position stage 108 left and right, forward and backward, and up and down (XYZ). Transmitted light source system 105 can be one of the systems described further herein. Alternatively, transmitted light source system 105 can be any known in the art. Transmitted light source system 105 can comprise a transmitted light source 110. Further, specimen scanner 100 can mount a glass slide 111 onto stage 108. Glass slide 111 can comprise a specimen 112. One example of glass slide 111 and specimen 112 is a petrographic thin section.

Figure 2:
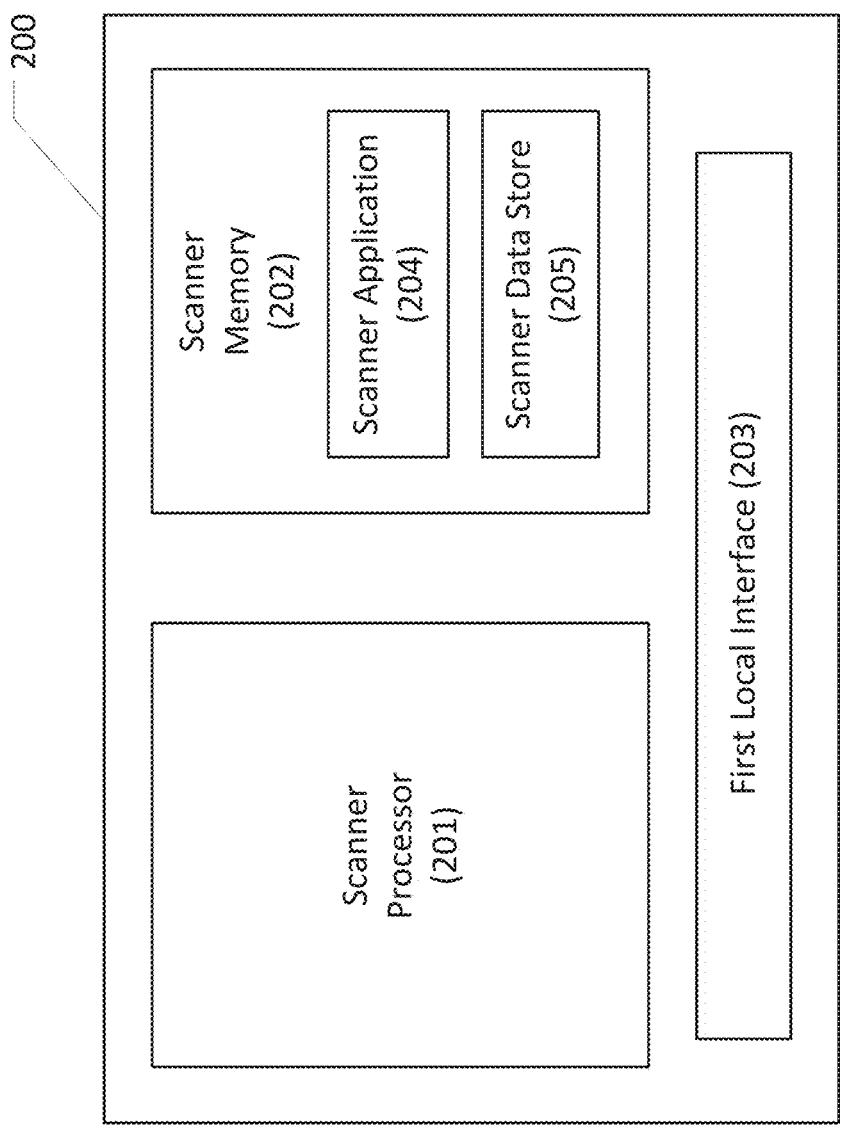
FIG. 2 illustrates a schematic block diagram of a specimen scanner according to an embodiment of the present disclosure.

FIG. 2 illustrates a schematic block diagram of specimen scanner 100 according to an embodiment of the present disclosure. Specimen scanner 100 can include at least one processor circuit, for example, having a scanner processor 201 and a scanner memory 202, both of which can be coupled to a first local interface 203. First local interface 203 can control a display for the user, which can allow user to view and/or interact with specimen scanner 100. First local interface 203 can comprise, for example, a data bus with an accompanying address/control bus or other bus structure as can be appreciated.

Stored in scanner memory 202 described herein above are both data and several components that are executable by scanner processor 201. In particular, stored in scanner memory 202 and executable by scanner processor 201 are scanner application 204, and potentially other applications. Also stored in scanner memory 202 can be a data store 205 and other data. In addition, an operating system can be stored in scanner memory 202 and executable by scanner processor 201.

Figure 3:
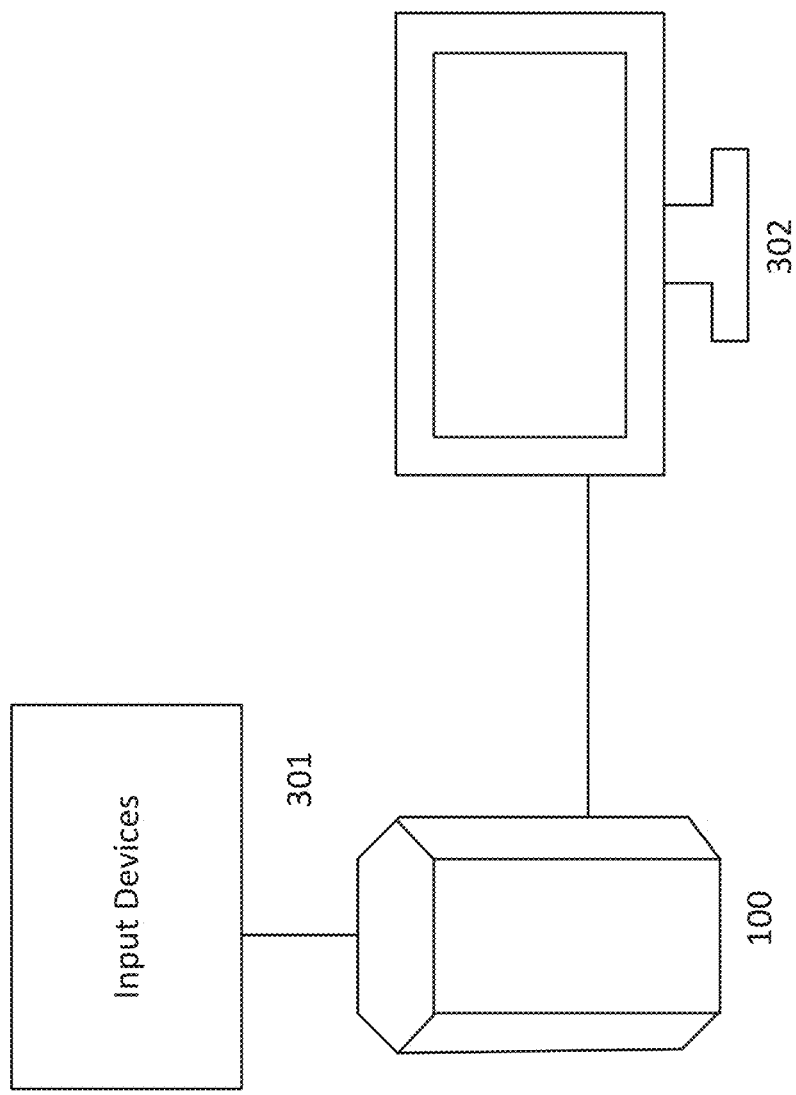
FIG. 3 illustrates an exemplary configuration of a specimen scanner, with a display and one or more input devices.

FIG. 3 illustrates an exemplary configuration of specimen scanner 100, with a display 302 and one or more input devices 301. Display 302 can be any device capable of displaying image data that is processed by specimen scanner 100. In one embodiment, monitor 302 can be a touch screen. In such embodiment, monitor 302 can function as an input device. Input devices 301 can be any peripherals that can convert user's action and/or analog data into digital electronic signals that specimen scanner 100 can process. Input device 301 can include, but is not limited to a mouse, keyboard, and/or track ball. In such configuration, image data that is viewed through display 302 can be selected, controlled, and/or manipulated through input device 301.

Figure 4:
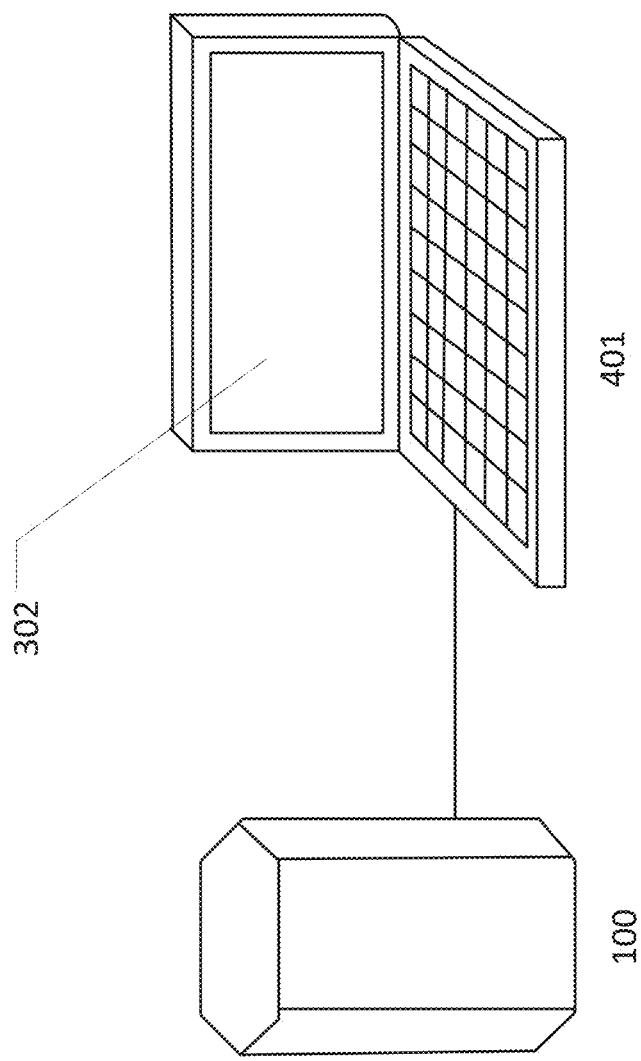
FIG. 4 illustrates another exemplary configuration of a specimen scanner, with a computer.

FIG. 4 illustrates another exemplary configuration of specimen scanner 100, with a computer 401. Computer 401 can comprise drivers or other specialized software to interface with specimen scanner 100. Examples of computers 401 can include, but are not limited to, a desktop computer, laptop, tablet, or smart device. In such embodiment, image data captured by specimen scanner 100 can be viewed, recorded, controlled, and/or stored within computer 401.

Figure 5:
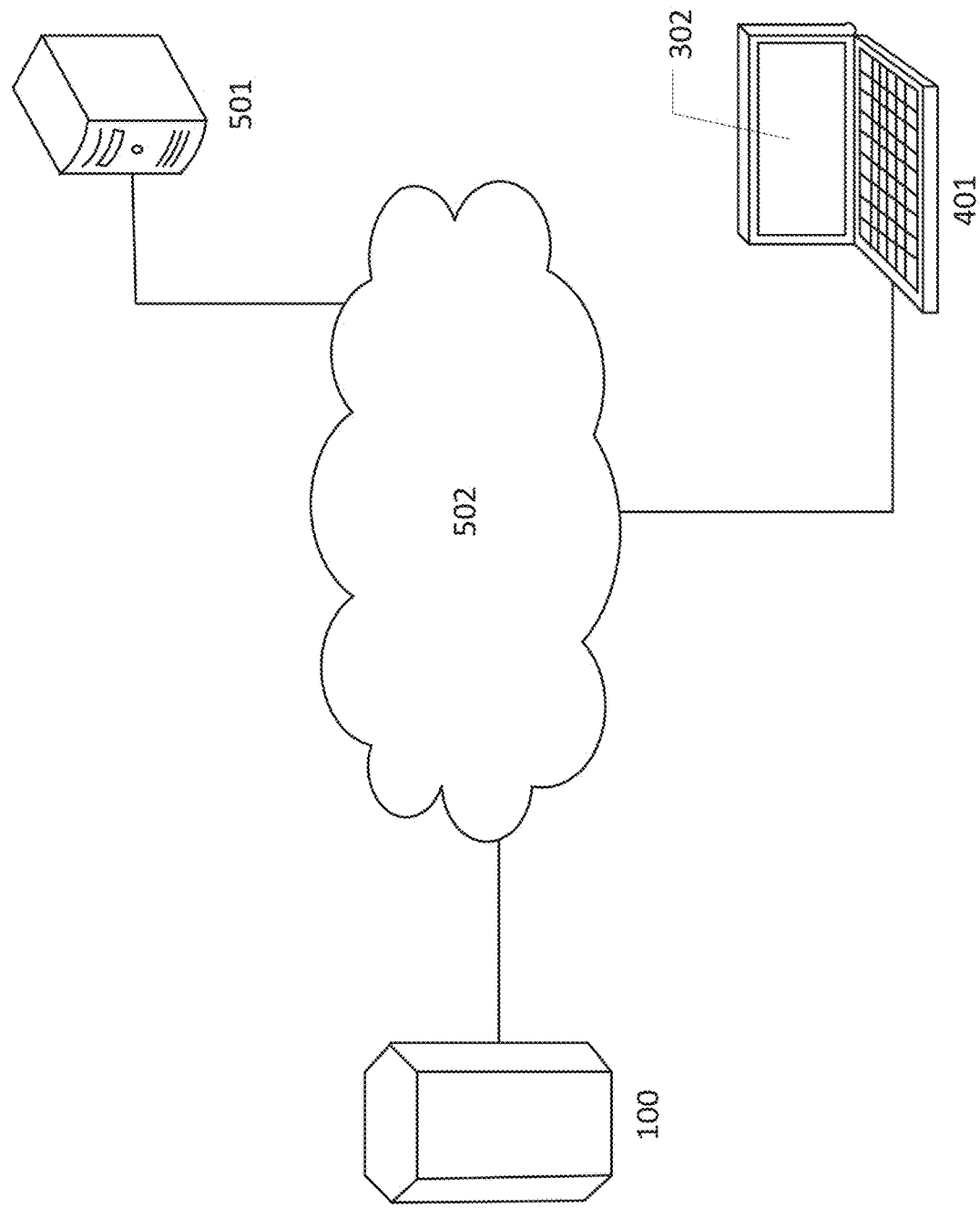
FIG. 5 illustrates another exemplary configuration of a specimen scanner.

FIG. 5 illustrates another exemplary configuration of specimen scanner 100. In this embodiment, specimen scanner 100 can connect to one or more computers 401, and one or more servers 501 through a network 502. Server 501 represents at least one, but can be many servers, each connected to network 502 capable of performing computational tasks, and storing data information. Network 502 can be a local area network (LAN), a wide area network (WAN), a piconet, or a combination of LANs, WANs, and/or piconets. One illustrative LAN is a network within a single business. One illustrative WAN is the Internet. In the preferred embodiment, network 502 will comprise the Internet. In this embodiment, input data that is processed by specimen scanner 100 can be accessible to computers 401 through server 501 that is within network 502.

Figure 6A:
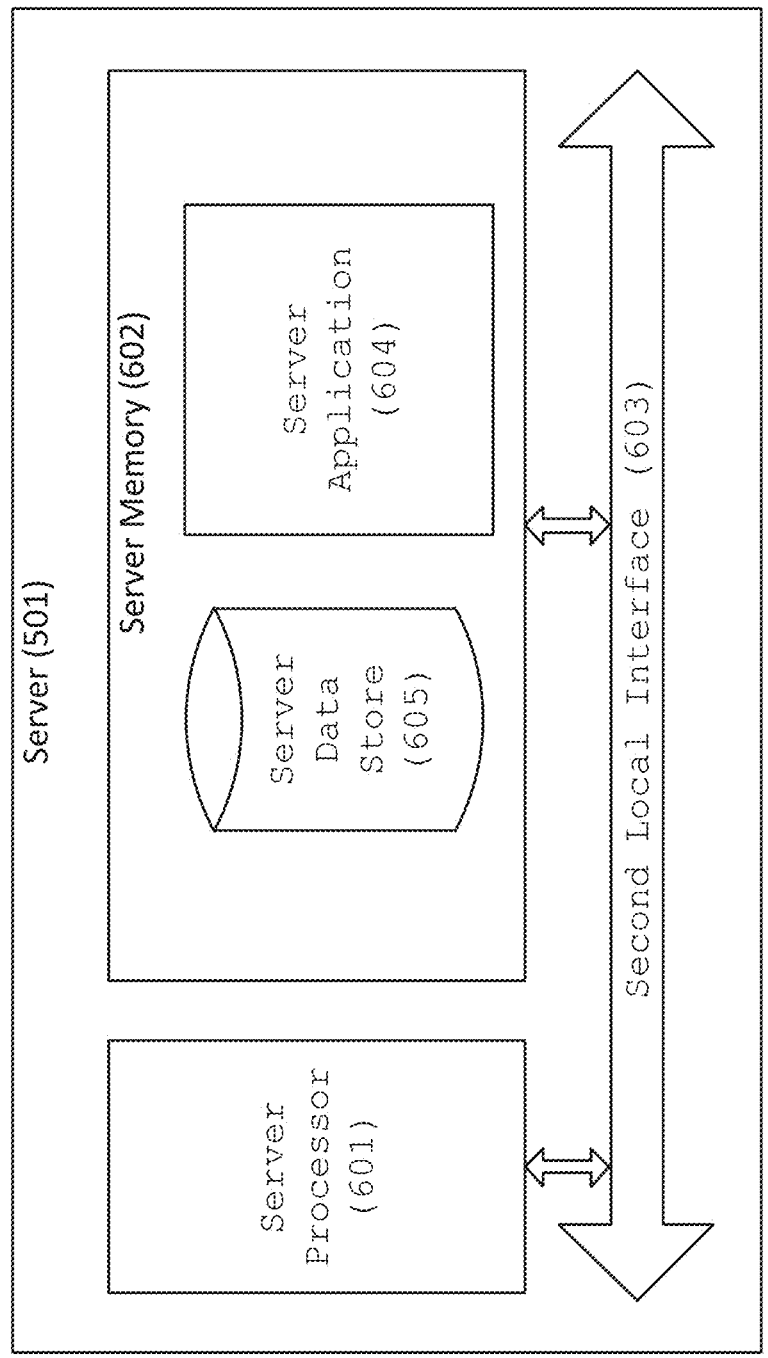
FIG. 6A illustrates a schematic diagram of a server according to an embodiment of the present disclosure.

FIG. 6A illustrates a schematic diagram of server 501 according to an embodiment of the present disclosure. Server 501 includes at least one processor circuit, for example, having a server processor 601 and a server memory 602, both of which can be coupled to a second local interface 603. To this end, server 501 can comprise, for example, at least one server, computer or like device. Server memory can comprise server application 604 and server data store 605. Second local interface 603 can comprise, for example, a data bus with an accompanying address/control bus or other bus structure as can be appreciated. In particular, stored in the server memory 602 and executable by server processor 601 are server application 604, and potentially other applications. Also stored in server memory 602 can be server data store 605 and other data. In addition, an operating system can be stored in server memory 602 and executable by server processor 601.

Figure 6B:
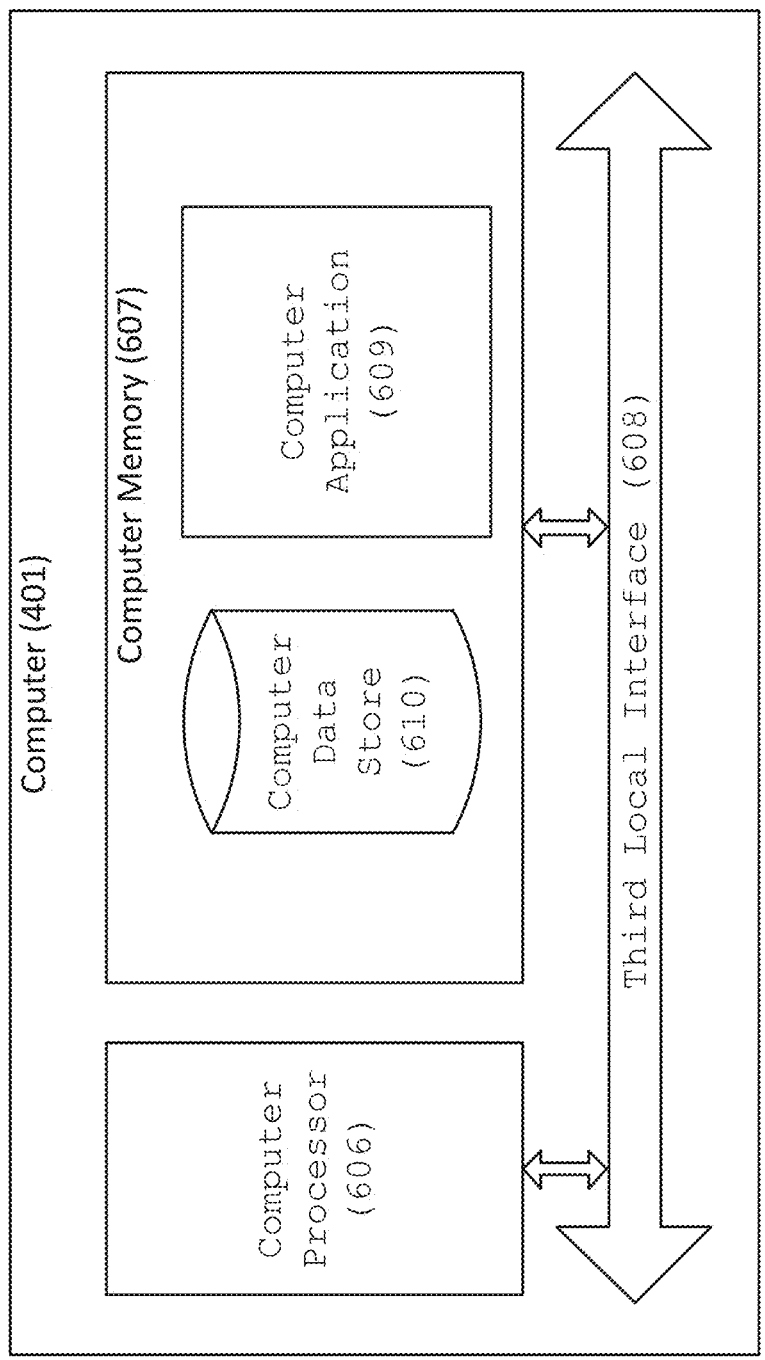
FIG. 6B illustrates a schematic diagram of a computer according to an embodiment of the present disclosure

FIG. 6B illustrates a schematic diagram of computer 401 according to an embodiment of the present disclosure. Computer 401 includes at least one processor circuit, for example, having computer processor 606 and computer memory 607, both of which can be coupled to third local interface 608. Computer memory 607 can comprise computer application 609 and computer data store 610. Third local interface 608 can comprise, for example, a data bus with an accompanying address/control bus or other bus structure as can be appreciated. In particular, stored in the computer memory 607 and executable by computer processor 606 are computer application 609, and potentially other applications. In one embodiment, computer application 609 can be a web browser that gives a user the ability to interface with server application 604 or scanner application 204. Further, in one embodiment, scanner application 204, server application 604 and computer application 209 can have shared responsibilities to complete methods taught in this disclosure. Also stored in computer memory 607 can be computer data store 610 and other data. In addition, an operating system can be stored in computer memory 607 and executable by computer processor 606.

Figure 7:
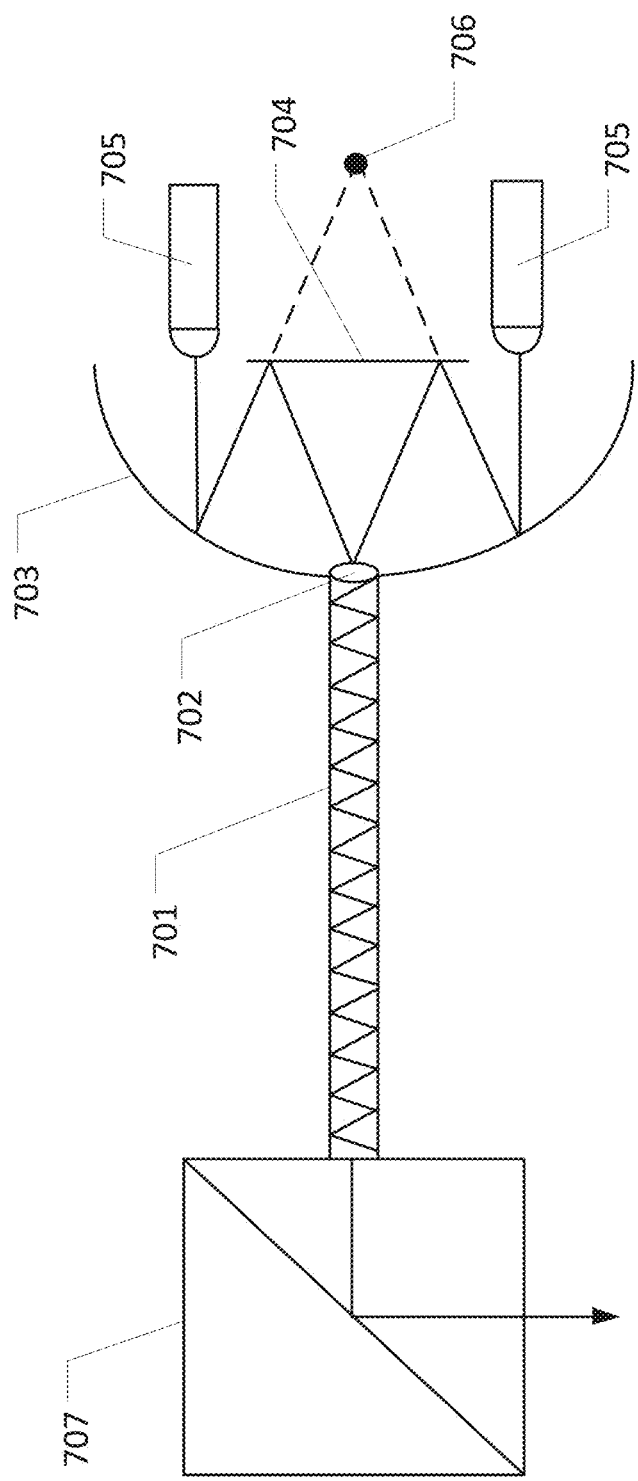
FIG. 7 illustrates a first embodiment of a reflective light source system.

FIG. 7 illustrates a first embodiment of reflective light source system 102. In microscopy, a reflective light source illuminates a specimen by reflecting light off the specimen. In this embodiment, reflective light source system 102 can comprise a parabolic mirror 703, a second mirror 704, and a plurality of light-emitting diodes (LEDs) 705. Light guide 701 can connect a dichroic mirror 707 with an aperture 702. In a preferred embodiment, light guide 701 can be a liquid light guide. Aperture 702 can be positioned at the vertex of parabolic mirror 703. In one embodiment, second mirror 704 can be placed at a point equidistant from both aperture 702 and a parabolic focal point 706. LEDs 705 can be pointed at parabolic mirror 703 in a direction parallel to a line that passes through both the vertex of parabolic mirror 703, and parabolic focal point 706. Thus, when the light on a LED 705 is switched on, the light can travel towards parabolic mirror 703. The light emitted by LEDs 705 can then reflect off parabolic mirror 703 in a direction toward parabolic focal point 706. However, the light will hit second mirror 704 before reaching parabolic focal point 706. In such structure, the light that hits second mirror 704 can reflect off second mirror 704 and travel toward aperture 702. At aperture, the light can enter light guide 701, and then travel through light guide 701 to dichroic mirror 707. From there, light can be redirected to specimen 112.

Figure 8:
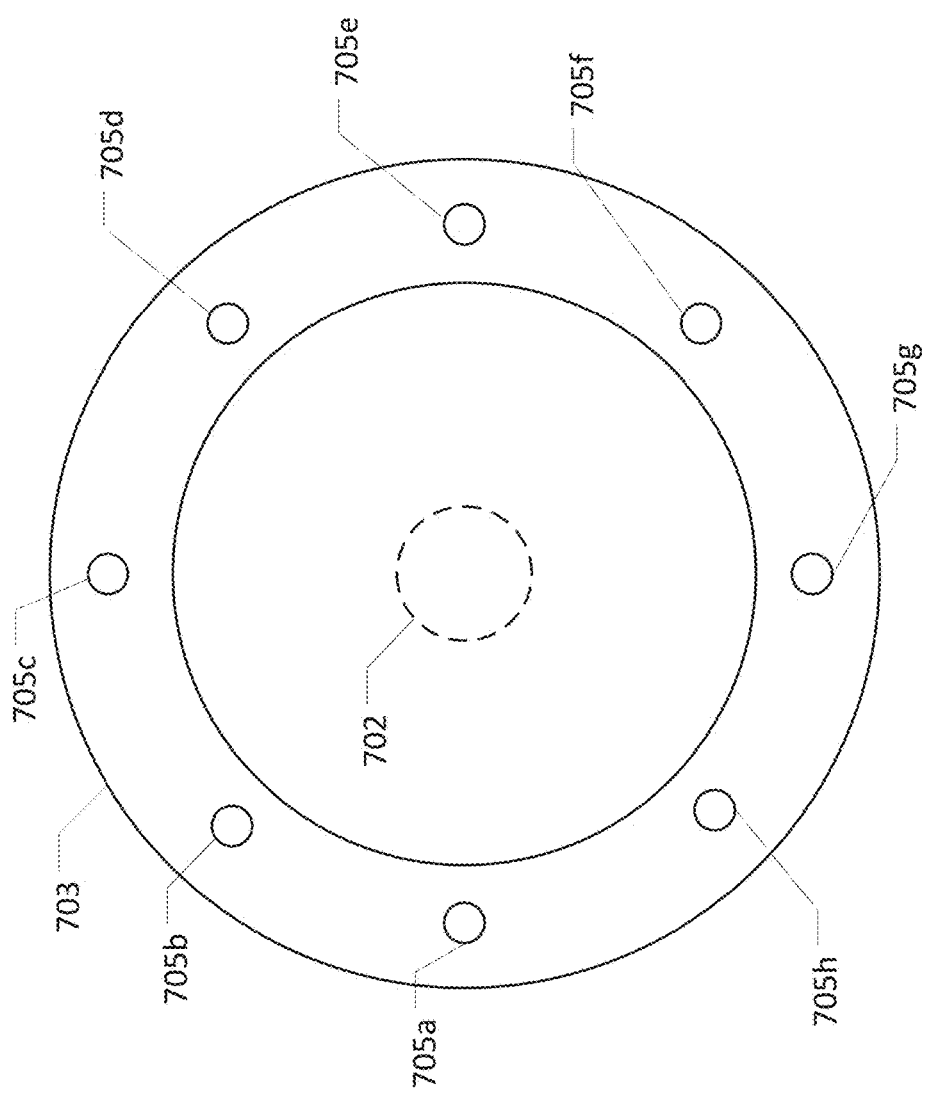
FIG. 8 illustrates a front view of the first disclosed embodiment of reflective light source system.

FIG. 8 illustrates a front view of the first disclosed embodiment of reflective light source system 102. Aperture 702 can be positioned at the vertex of parabolic mirror 703, while each LED 705 can be mounted in front of parabolic mirror 703. In one embodiment, LEDs 705 can be placed in a circular pattern. Additionally, LEDs 705 can be parallel with one another. In one embodiment, one LED 705 can be turned on at a time. In another preferred embodiment, each LED 705 can be one or more LEDs, which can increase the intensity of the light from LED 705. Each LEDs 705 can have different characteristics, such as color, and intensity. As an example, LEDs 705 can comprise of a yellow LED 705*a*, a red LED 705*b*, a white LED 705*c*, a green LED 705*d*, a blue LED 705*e*, a magenta LED 705*f*, a purple LED 705*g*, and an orange LED 705*h*.

In one scenario, the user can select LED 205, comprising a certain characteristic such as a color. In this example, the user can select "yellow" through computer 401. Scanner processor 201 can receive the color that the user selected and then send an instruction to specimen scanner 100 to switch ON a first LED 705*a*. First LED 705*a* is switched on, which produces yellow light to reflect off parabolic mirror 703. Yellow light is then reflected towards aperture 702 and travels through light guide 701. The light reflects of dichroic mirror 707 and illuminates the specimen with yellow light. To illuminate the specimen in a different color, the user can again select a different color through computer 401. In this case, the user selects color the "white". Scanner processor 201 can receive the color selected, and then sends a signal to switch OFF yellow LED 705*a*, and then turns on white LED 705*c*.

Figure 9:
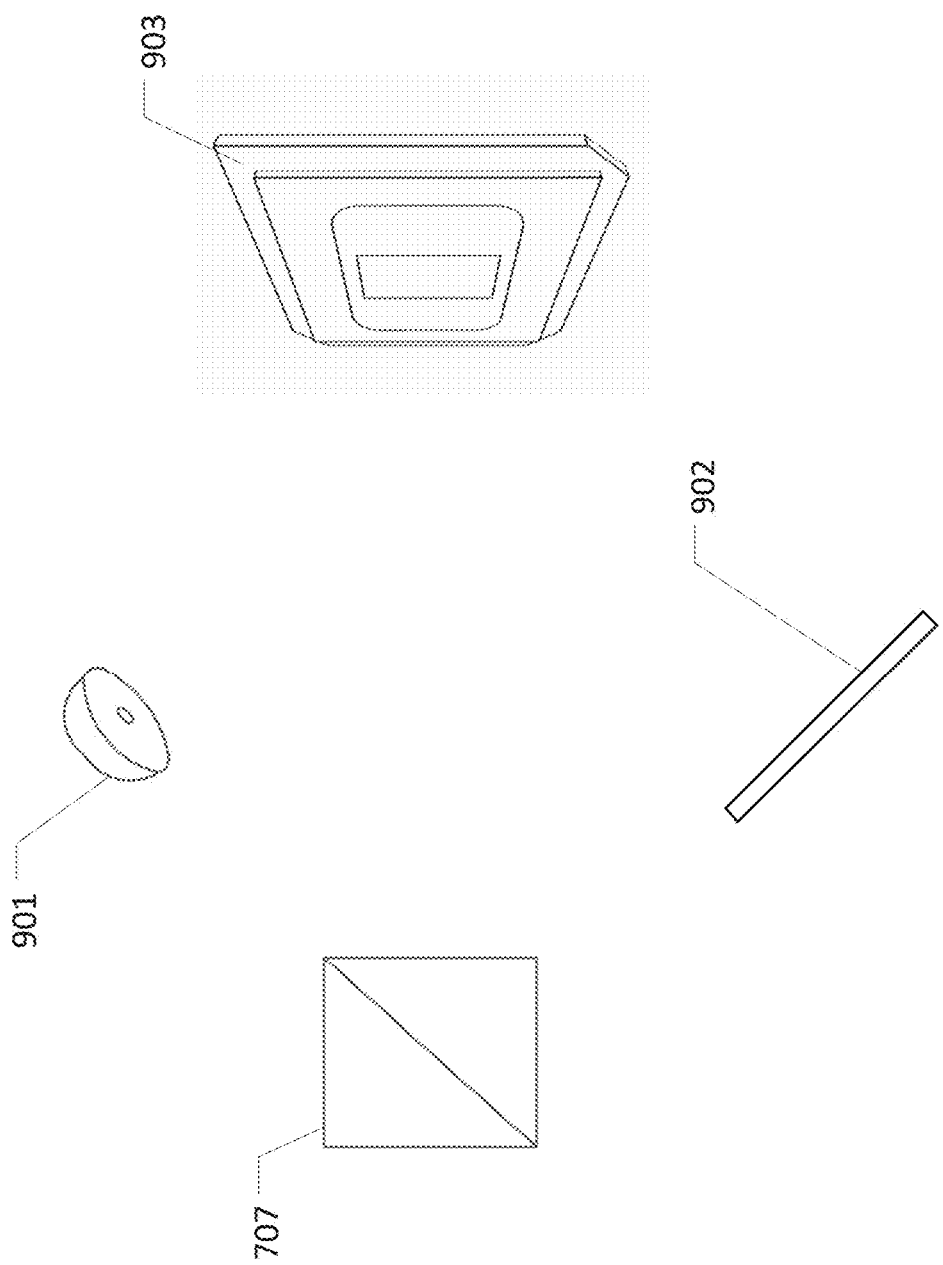
FIG. 9 illustrates a second embodiment of a reflective light source system.

FIG. 9 illustrates a second embodiment of reflective light source system 102. In this embodiment, reflective light source system 102 can comprise a reflective light source 901, a reflective light absorber 902, and a first digital light-processing (DLP) chip 903. Reflective light source 901 can be a device capable of emitting light, which can include but is not limited to a LED, a laser, and/or a fluorescent light. Reflective light absorber 902 can be any device capable of absorbing the light emitted from reflective light source 901. An example of DLP chip 903 is the DLP700 produced and marketed by the company Texas Instruments®. In a preferred embodiment, first DLP chip 903 can be placed in front of dichroic mirror 707, while reflective light absorber 902 and reflective light source 901 are positioned at an angle away from first DLP chip 903.

Figure 10:
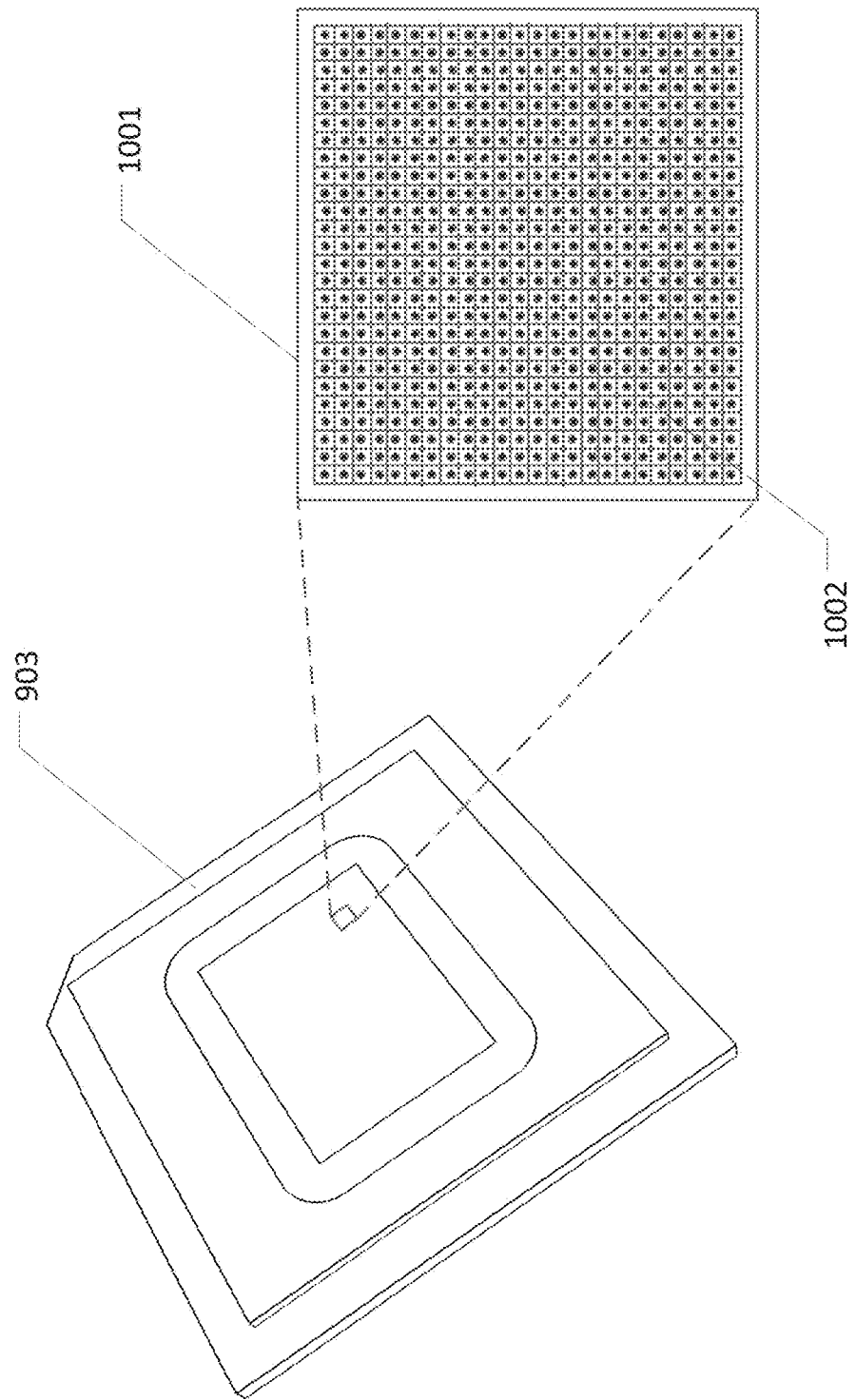
FIG. 10 illustrates a first digital light-processing (DLP) chip as well as an exploded view of a reflective digital microscopic mirror (DMM) array.

FIG. 10 illustrates first DLP chip 903 as well as an exploded view of a reflective digital microscopic mirror (DMM) array 1001. Reflective DMM array 1001 comprises a plurality of reflective digital microscopic mirrors DMMs 1002 that are arranged side by side to form rows and columns.

Figure 11:
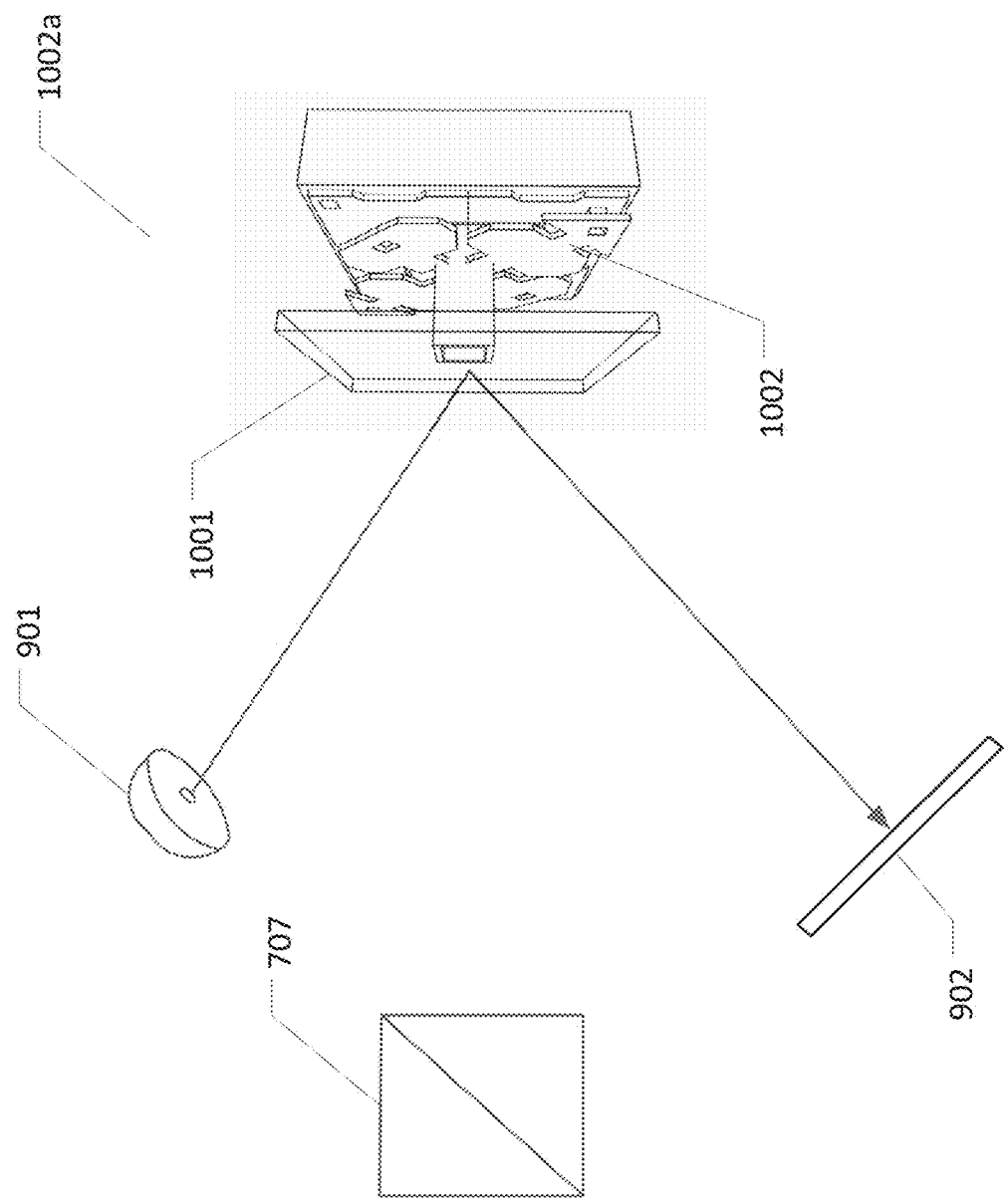
FIG. 11 illustrates a representation of reflective DMMs at an "OFF" state.

FIG. 11 illustrates a representation of reflective DMM 1002 at an "OFF" state 1002*a*. At this state, reflective DMM 1002 is laying flat to reflect off light towards the direction of reflective light absorber 902. Thus, the light reflected off reflective DMM 1002 in an "OFF" state 1002*a* can make the pixel appear dark.

Figure 12:
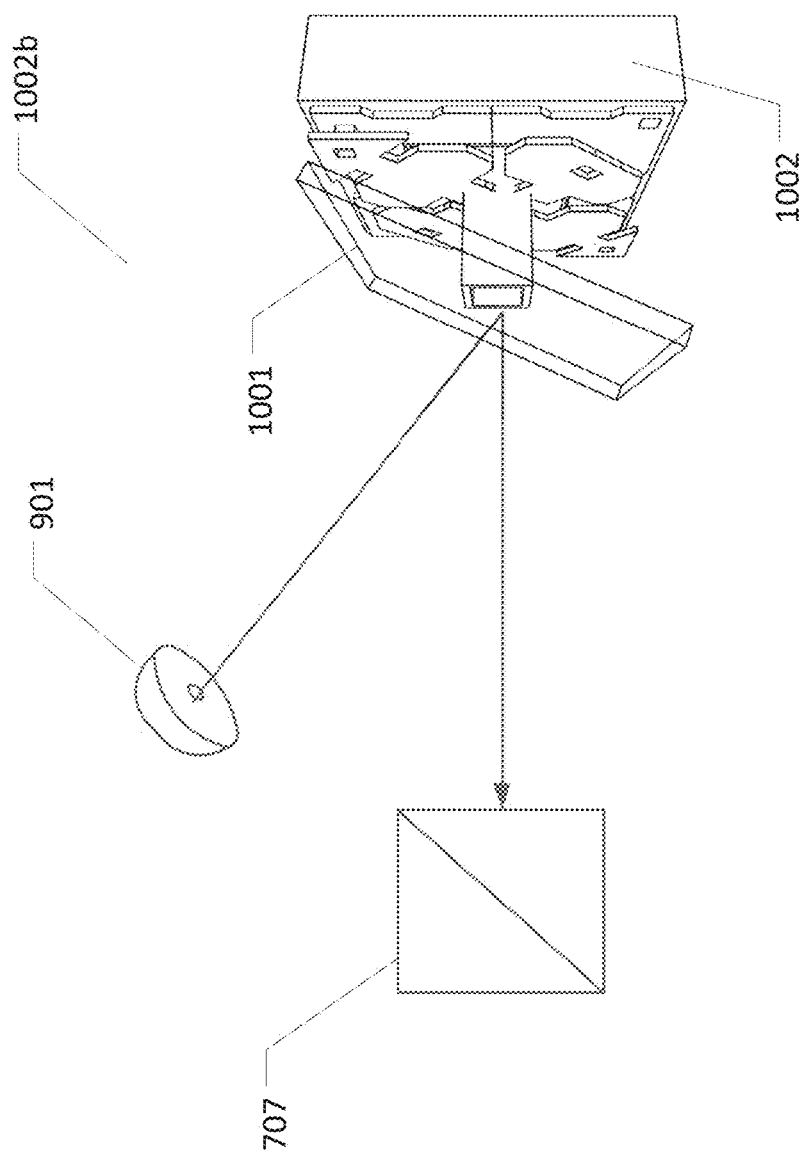
FIG. 12 illustrates a representation of reflective DMMs in an "ON" state.

FIG. 12 illustrates a representation of reflective DMM 1002 in an "ON" state 1002*b*. By tilting or by lying flat, reflective DMM 1002 can reflect off light from reflective light source 901 to either the direction of reflective light absorber 902 or the direction towards dichroic mirror 707. In ON state 1002*b*, the reflected light from reflective DMM 1002 can make the pixel appear illuminated. In FIG. 12, reflective DMM 1002 is tilted to reflect light toward dichroic mirror 707. Together, DMMs 1002 in an ON state 1002*b* transmit light through dichroic mirror 707 and onto the surface of specimen 112. Depending on which DMMs 1002 are illuminated, all or a portion of specimen 112 can be illuminated. First DLP chip 903 can give reflective light source system 102 great flexibility and control regarding what specific portions of specimen 112 are illuminated and at what intensity.

Figure 13:
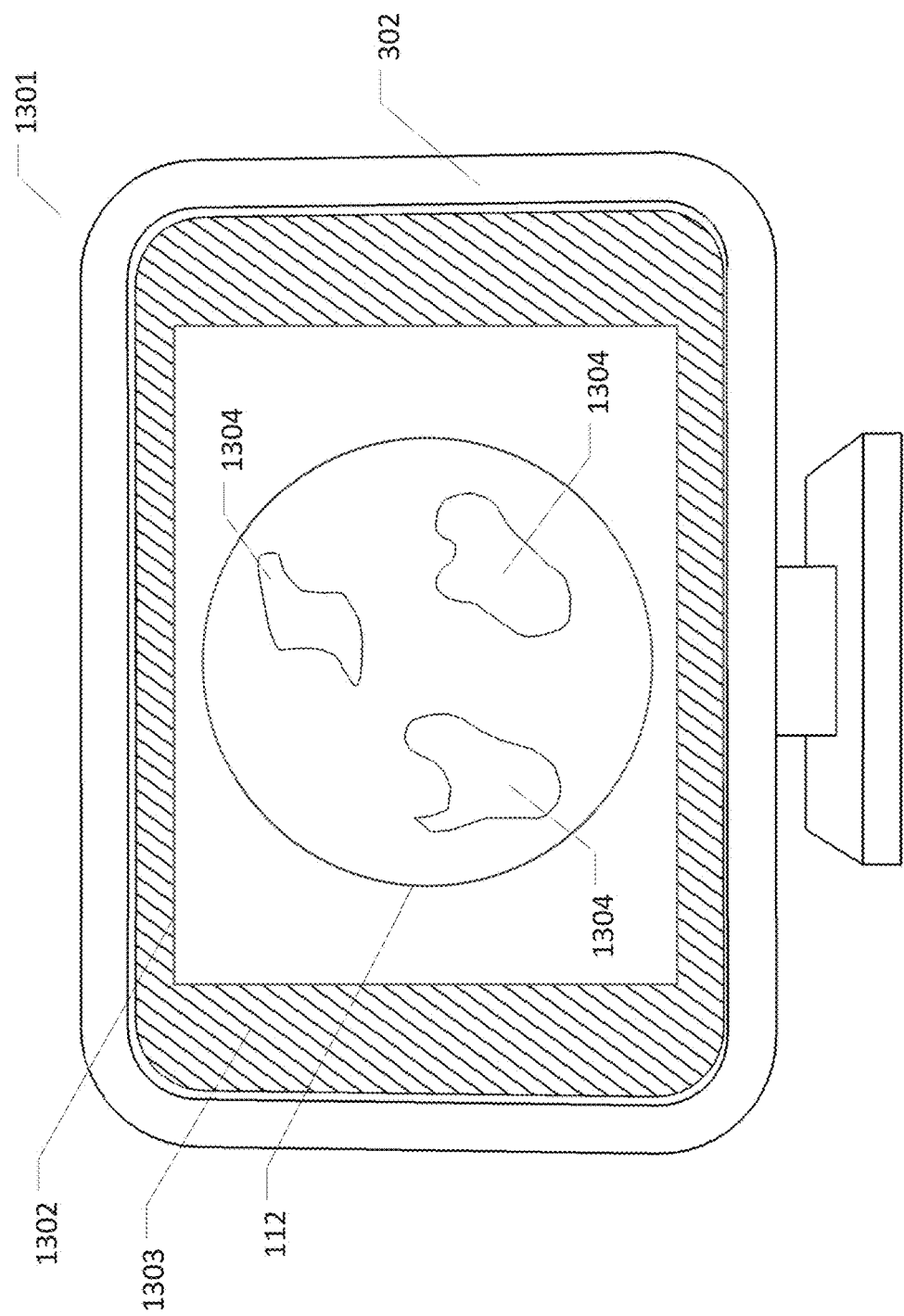
FIG. 13 illustrates a display showing a specimen illuminated by an initial light pattern from a reflective light source system comprising a first DLP chip.

FIG. 13 illustrates display 302 showing specimen 112 illuminated by an initial light pattern 1301 from reflective light source system 102 comprising first DLP chip 903. In some situations, it may be advantageous for a user to illuminate specific areas of interest in a specimen, while not illuminating other areas. In one exemplary method, a user can choose which areas are illuminated, illuminated areas 1302 and which areas are not illuminated, non-illuminated areas 1303. In such method, a user can mount glass slide 111 on stage 108 to view specimen 112. Camera 106 can capture glass slide 111 in real time. Initially, all or a significant portion of specimen 112 or the presently viewed portion of specimen 112 can be illuminated by reflective light source system 102.

Next, the user can select which portions of specimen 112 are to be illuminated. The user can make such selections using local input devices 301, as shown in FIG. 3, a local computer as shown in FIG. 4, or a remote computer 401 as shown in FIG. 5. In one embodiment, such selection can be completely manual. In another embodiment, scanner application 204 can automate all or portions of the selection process. In an example manual embodiment, a user can select to illuminate one or more areas of interest 1304 in specimen 112 by defining areas of interest 1304 using input devices 301 attached to specimen scanner 100 or a computer 401. One exemplary way to define an area is to trace an area. In an example of an automated embodiment, a user may select a particular object, and scanner application 204, using color information, edge detection techniques, and/or shape recognition methods, can determine particular areas of illumination. In another embodiment, scanner application 204 can predict, without user selection, areas of interest for illumination, using edge detection, color recognition, shape recognition, and/or intelligent predictions based on previous illumination requests by a user.

Once areas of interest 1304 are selected, scanner processor 201 can send signal to first DLP chip 903 to produce the desired illumination. Scanner application 204 can determine which reflective DMMs 1002 need to be turned on and which reflective DMMs 1002 need to be turned off. One particular issue with determining which DMMs need to be turned on to illuminate a particular area of glass slide 111, is that each objective lens 107 disperses light differently. In one embodiment, dispersion patterns for different objective lens 107 can be stored in scanner memory 202. Using dispersion patterns, scanner application 204 can calculate which reflective DMMs 1002 can be turned on to illuminate areas of interest 1304 on display 302. In another embodiment, scanner application 204 can determine which DMMs 1002 need to be turned on using feedback techniques, as described below and shown in FIGS. 14-17

Figure 14:
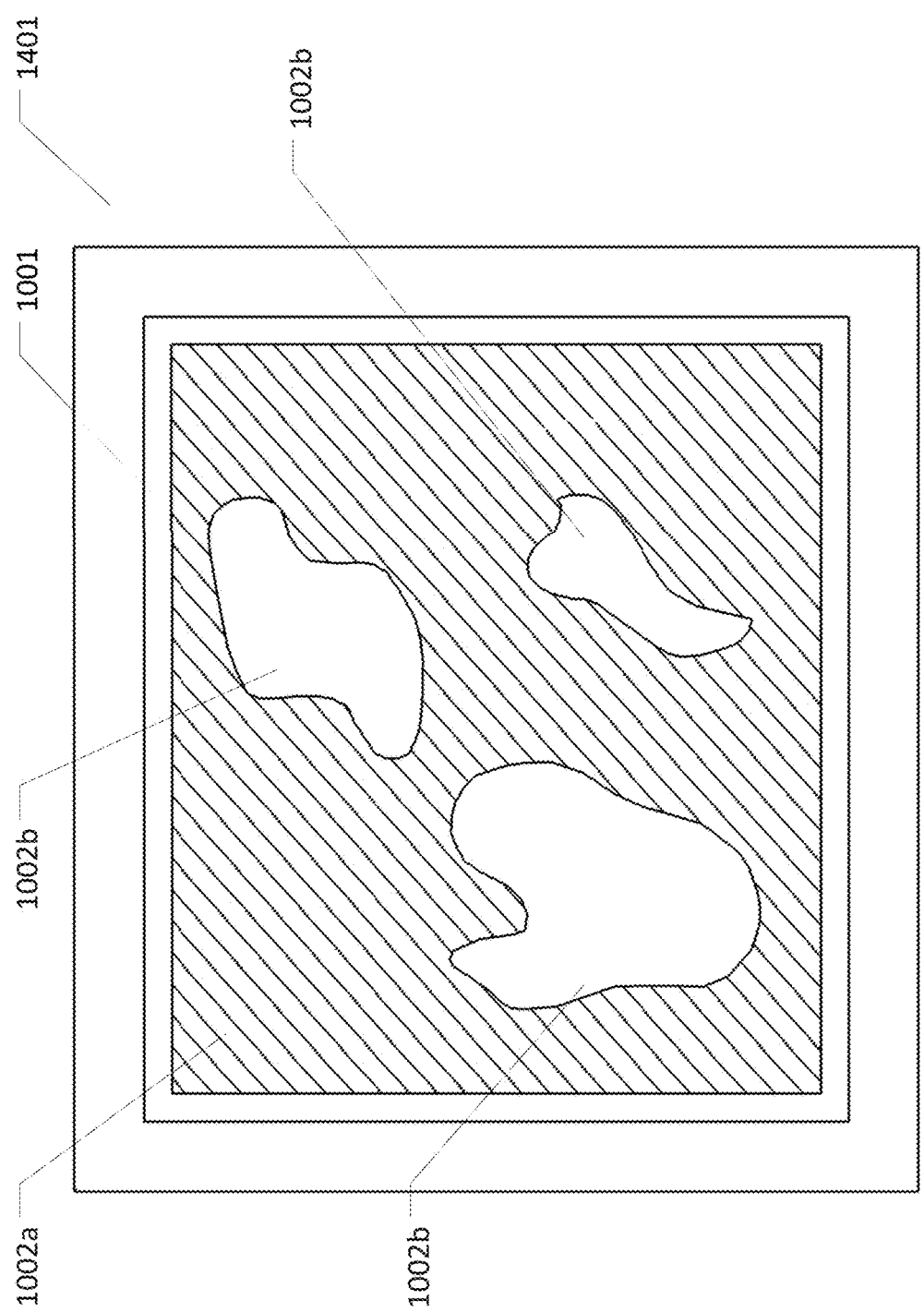
FIG. 14 illustrates a reflective DMM array comprising a reflective ON DMMs and OFF DMMs set to produce a subsequent illumination pattern.

FIG. 14 illustrates reflective DMM array 1001 comprising reflective ON DMMs 1002*a* and OFF DMMs 1002*b* set to produce a subsequent illumination pattern 1401. In one embodiment, such subsequent illumination pattern can be based on mapping to display 302 to first DLP chip 903. Once scanner application 204 creates subsequent illumination pattern 1401, first DLP chip 903 can project such illumination pattern on to specimen 112.

Figure 15:
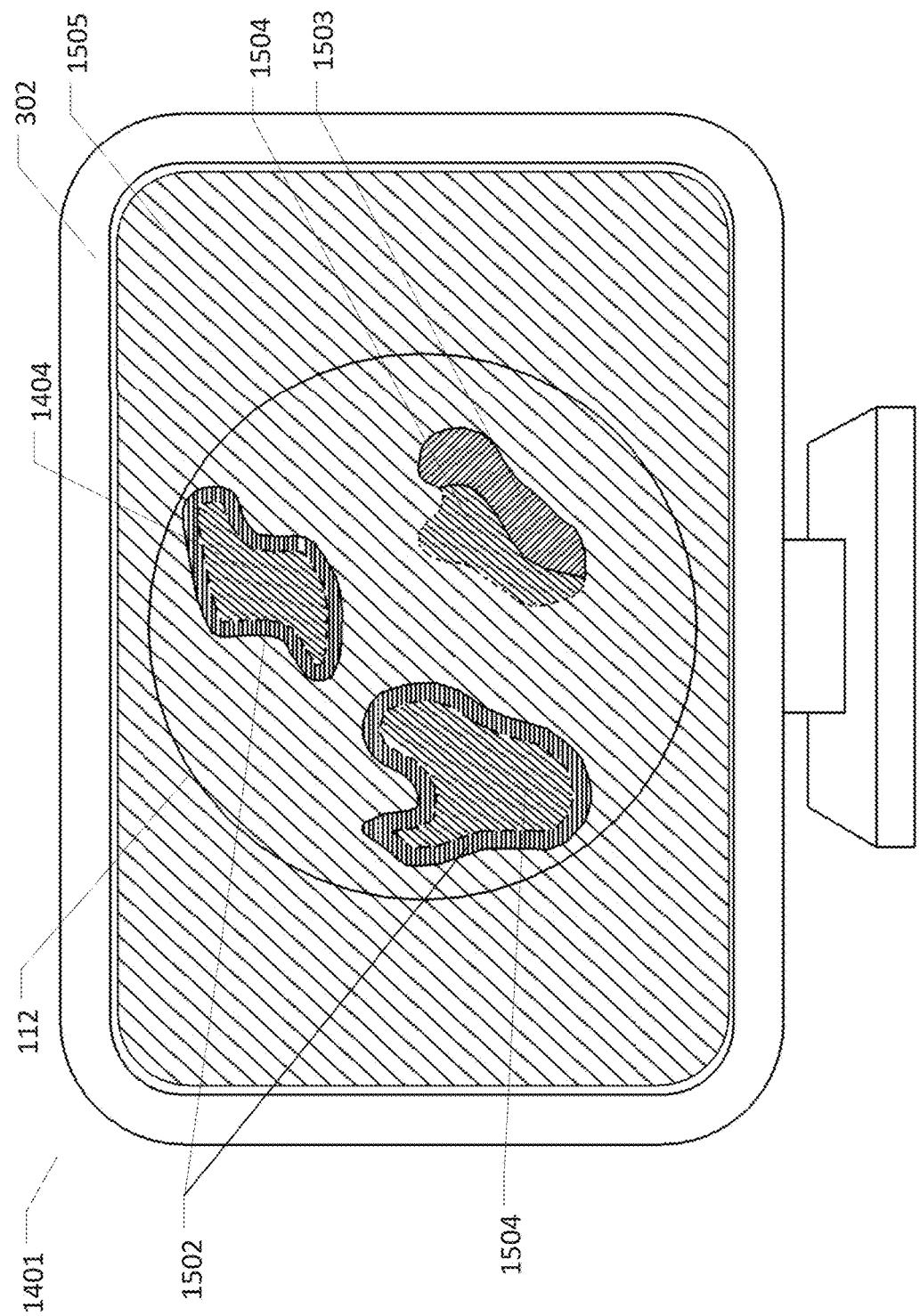
FIG. 15 illustrates a display showing areas of interest illuminated by a subsequent illumination pattern from a reflective light source system.

FIG. 15 illustrates display 302 showing areas of interest 1304 illuminated by subsequent illumination pattern 1401 from reflective light source system 102. Subsequent illumination pattern 1401 can have one or more over-illuminated areas 1502, one or more under-illuminated areas 1503, one or more correctly illuminated areas 1504, and one or more correctly non-illuminated areas 1505. Over-illuminated areas 1502 can be caused by some reflective DMMs 1002 incorrectly in an ON state. Under-illuminated areas 1503 can be caused by some reflective DMMs 1002 incorrectly in an OFF state. In such scenario, scanner application 204 can compare the light pattern on display 302 from subsequent illumination pattern 1401 to the light pattern on display 302 from initial illumination pattern 1301. By comparing the two light patterns in relation to the location of areas of interest 1304, scanner application 204 can determine over-illuminated areas 1502 and under-illuminated areas 1503. Scanner application 204 can then adjust reflective DMMs 1002 to produce an updated subsequent illumination pattern.

Figure 16:
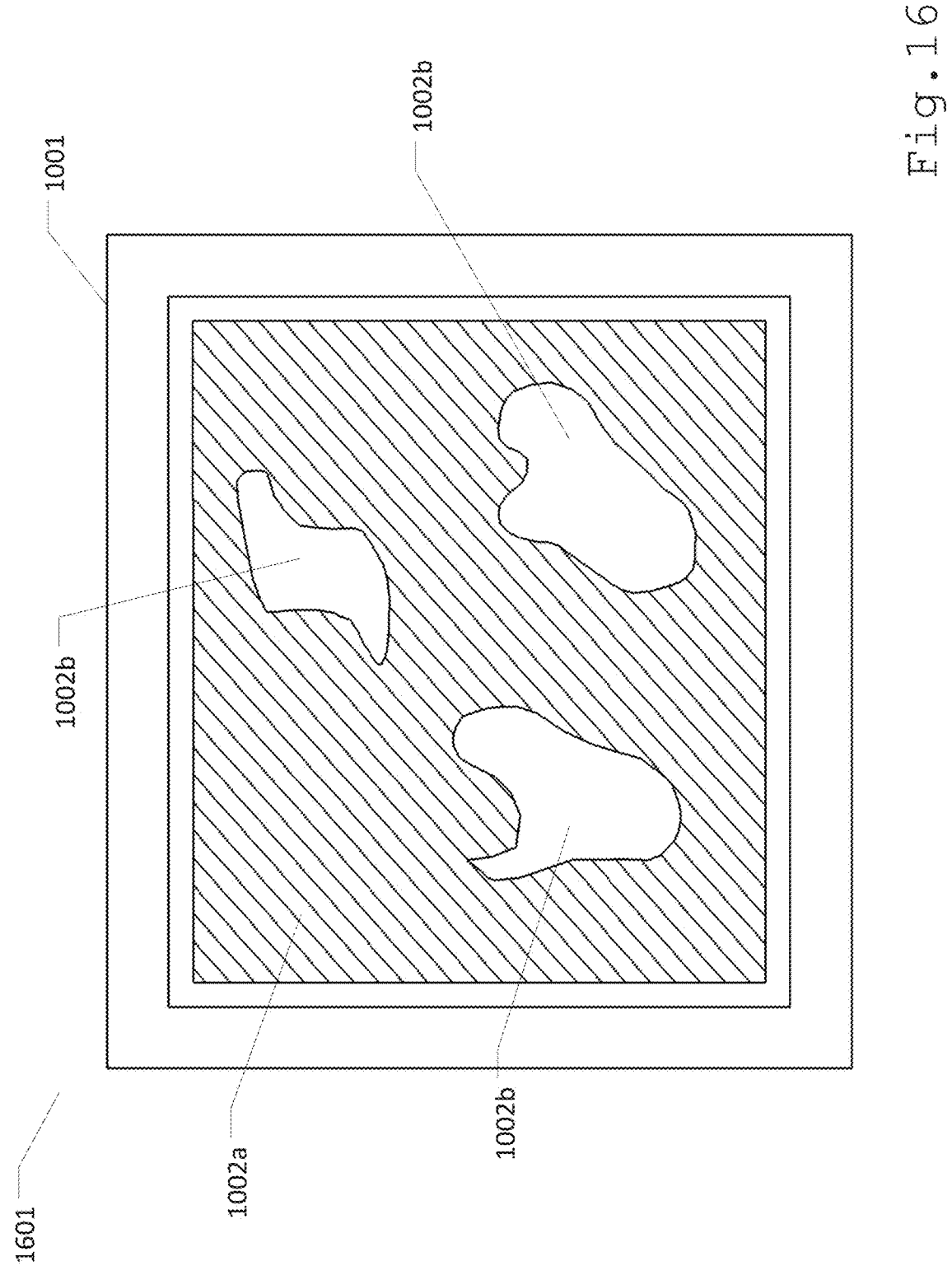
FIG. 16 illustrates a reflective DMM array arranged to produce an updated subsequent lighting pattern.

FIG. 16 illustrates reflective DMM array 1001 arranged to produce an updated subsequent lighting pattern 1601. The signals sent by scanner processor 201 to reflective DMM array 1001 can be based from updated subsequent illumination pattern 1601 that is determined by scanner application 204. The updated illumination pattern can be projected by first DLP chip 903 to specimen 112.

Figure 17:
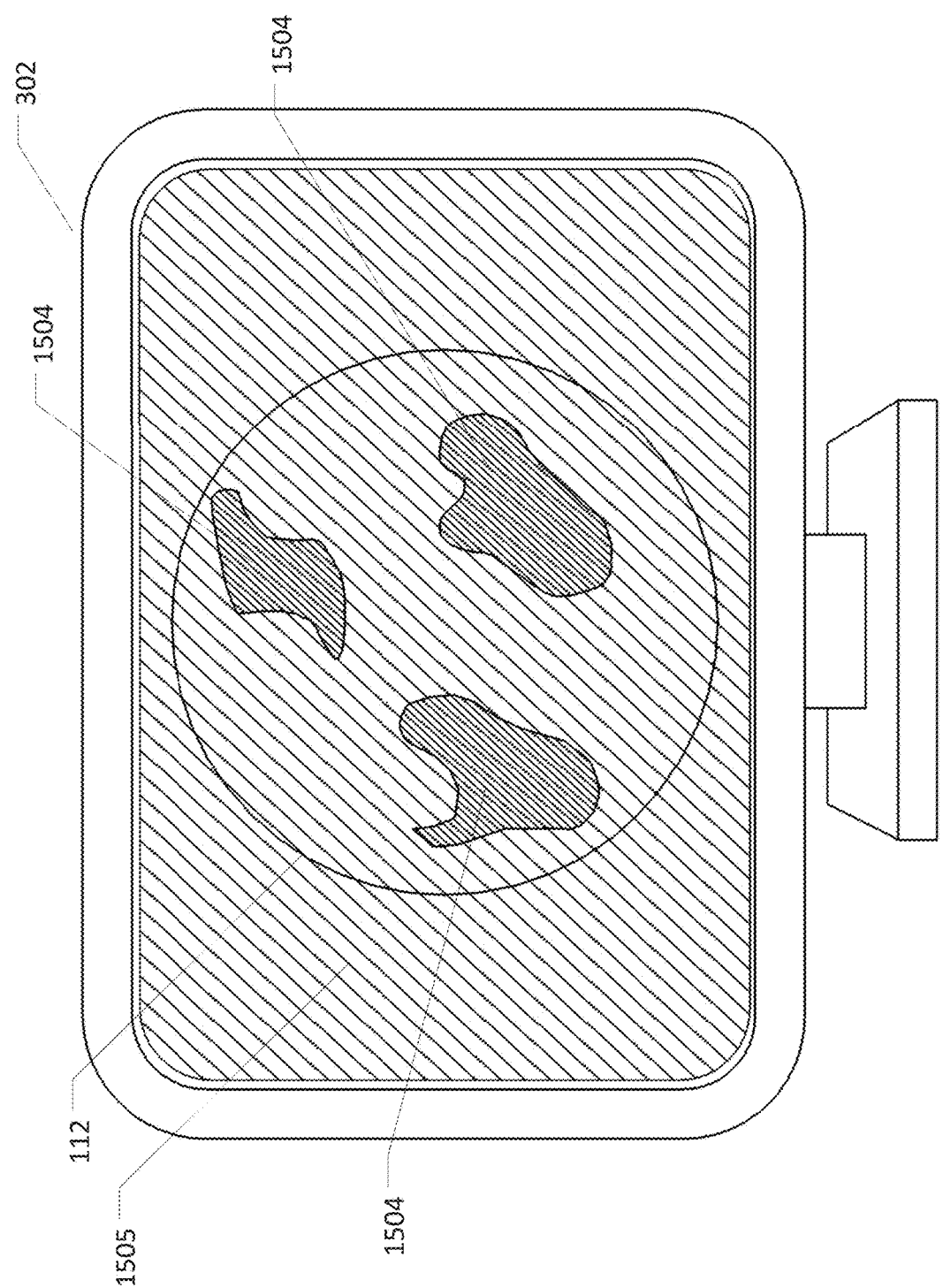
FIG. 17 illustrates a display showing areas of interest illuminated by an updated subsequent pattern from a reflective light source system.

FIG. 17 illustrates display 302 showing areas of interest 1304 illuminated by updated subsequent pattern 1601 from reflective light source system 102. In this scenario, the illuminated light pattern from updated subsequent pattern 1601 can be projected onto specimen 112. Such iterative techniques can be performed by scanner application 204 until the existence of over-illuminated areas 1502 and/or under illuminated areas 1503 are within a predetermined acceptable threshold.

Figure 18:
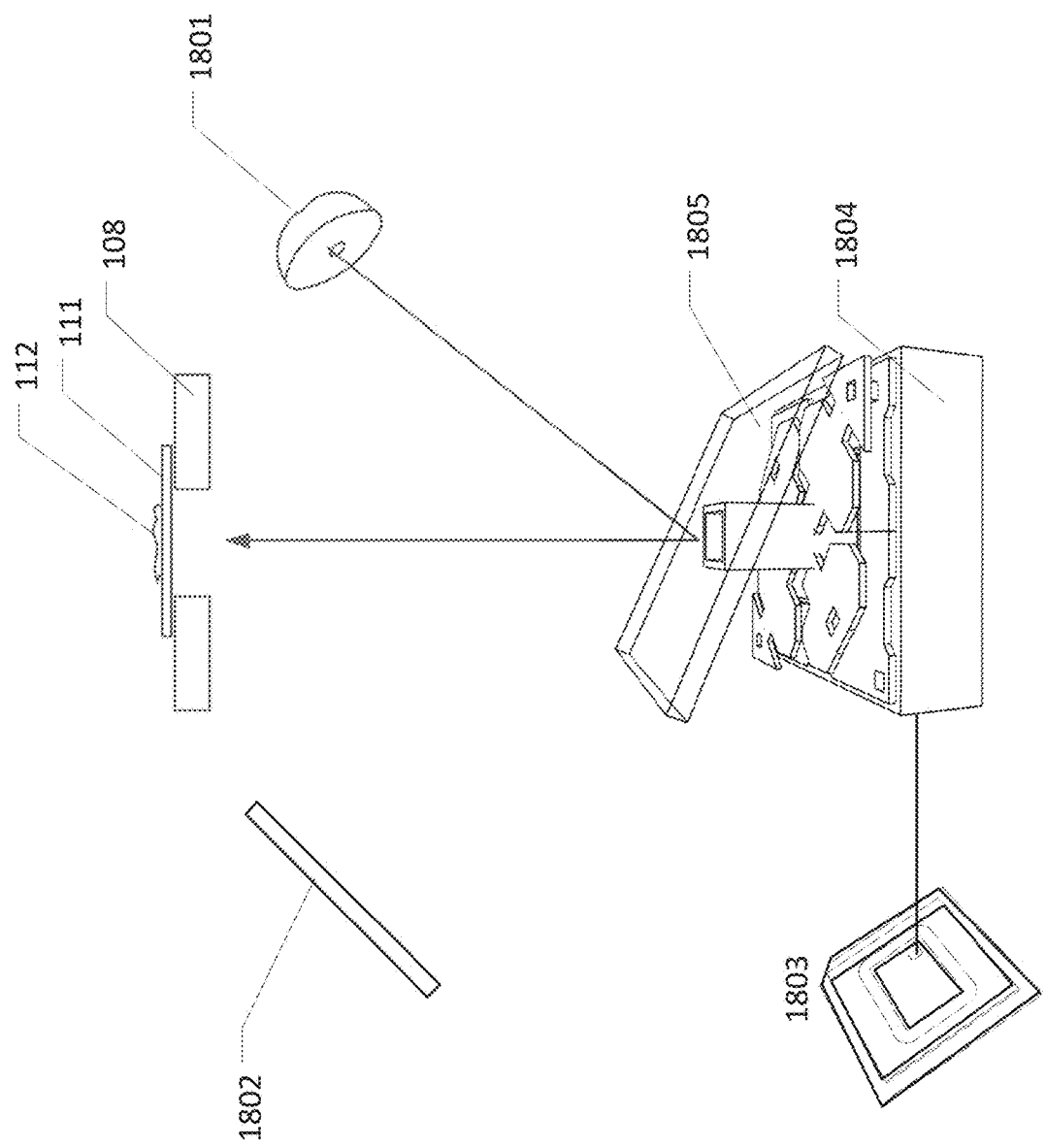
FIG. 18 illustrates an embodiment of a transmitted light source system that uses a digital light-processing (DLP) chip.

FIG. 18 illustrates an embodiment of transmitted light source system 105 that uses a digital light-processing (DLP) chip. Transmitted light source system 105 can comprise a transmitted light source 1801, a transmitted light absorber 1802, and a second digital light-processing (DLP) chip 1803. In a preferred embodiment, second DLP chip 1803 can be placed below stage 108, while transmitted light source 1801, and transmitted light absorber 1802 can be positioned at an angle away from second DLP chip 1803. Further, second DLP chip 1803 can comprise a transmitted light DMM array 1804. Transmitted light DMM array 1804 can comprise a plurality of transmitted light DMMs 1805 that are arranged side by side to form rows and columns. By tilting or by lying flat, transmitted light DMMs 1805 can reflect off light from transmitted light source 1801 and transmit light to either the direction of transmitted light absorber 1802 or the direction towards stage 108. In FIG. 18, transmitted light DMM 1805 is tilted to transmit light towards stage 108. At this state, DMMs 1805 in an ON state can transmit light towards stage 108 and through the surface of specimen 112. In this state, the light is focused towards specimen 112 to provide controlled illumination.

Figure 19:
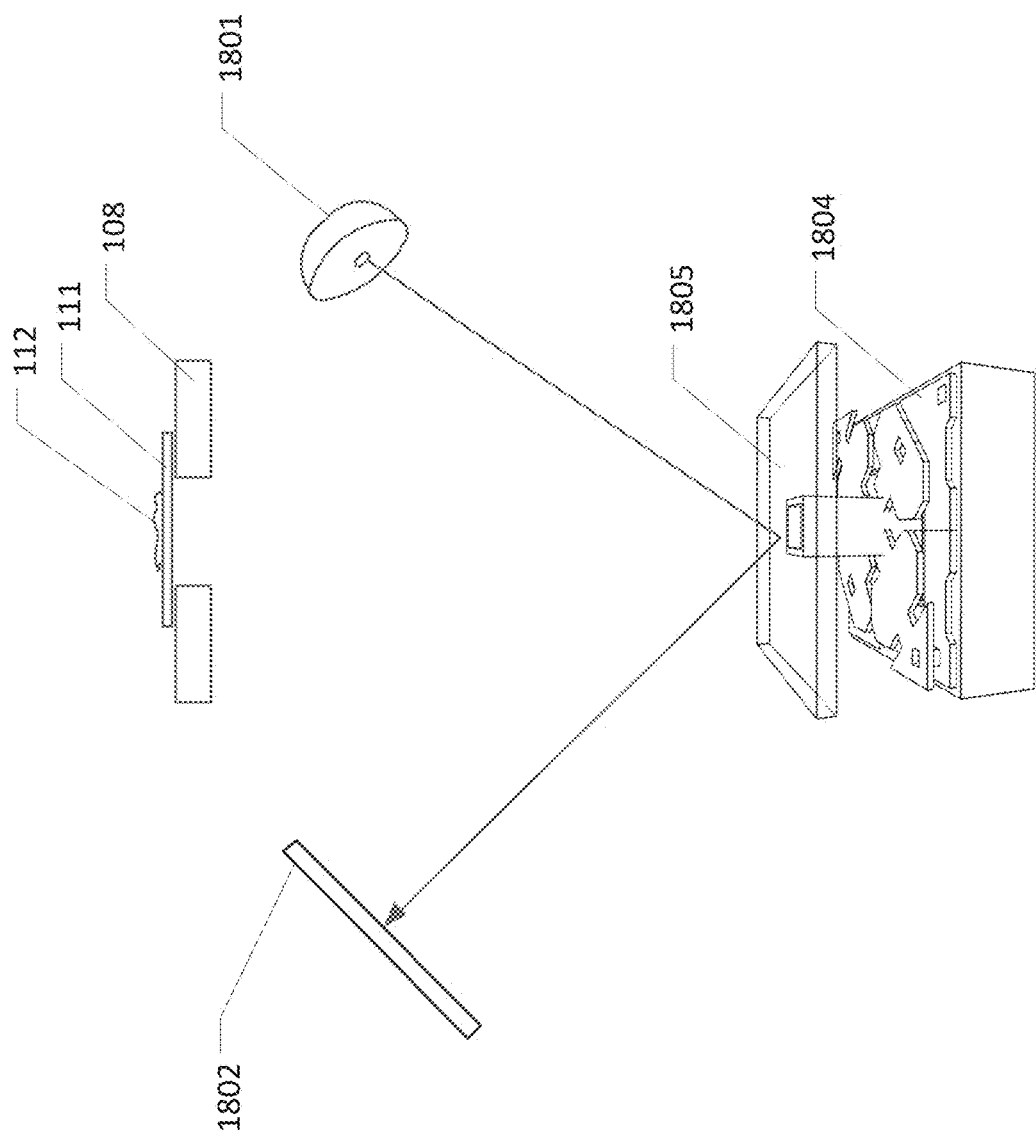
FIG. 19 illustrates a representation of one of transmitted light DMMs at an "OFF" state.

FIG. 19 illustrates a representation of one of transmitted light DMM 1805 at an "OFF" state. In this state, transmitted light DMM 1805 is lying flat to transmit light towards the direction of transmitted light absorber 1802. The light transmitted from transmitted light DMMs 1805 at an OFF state can make the pixel appear dark.

Figure 20:
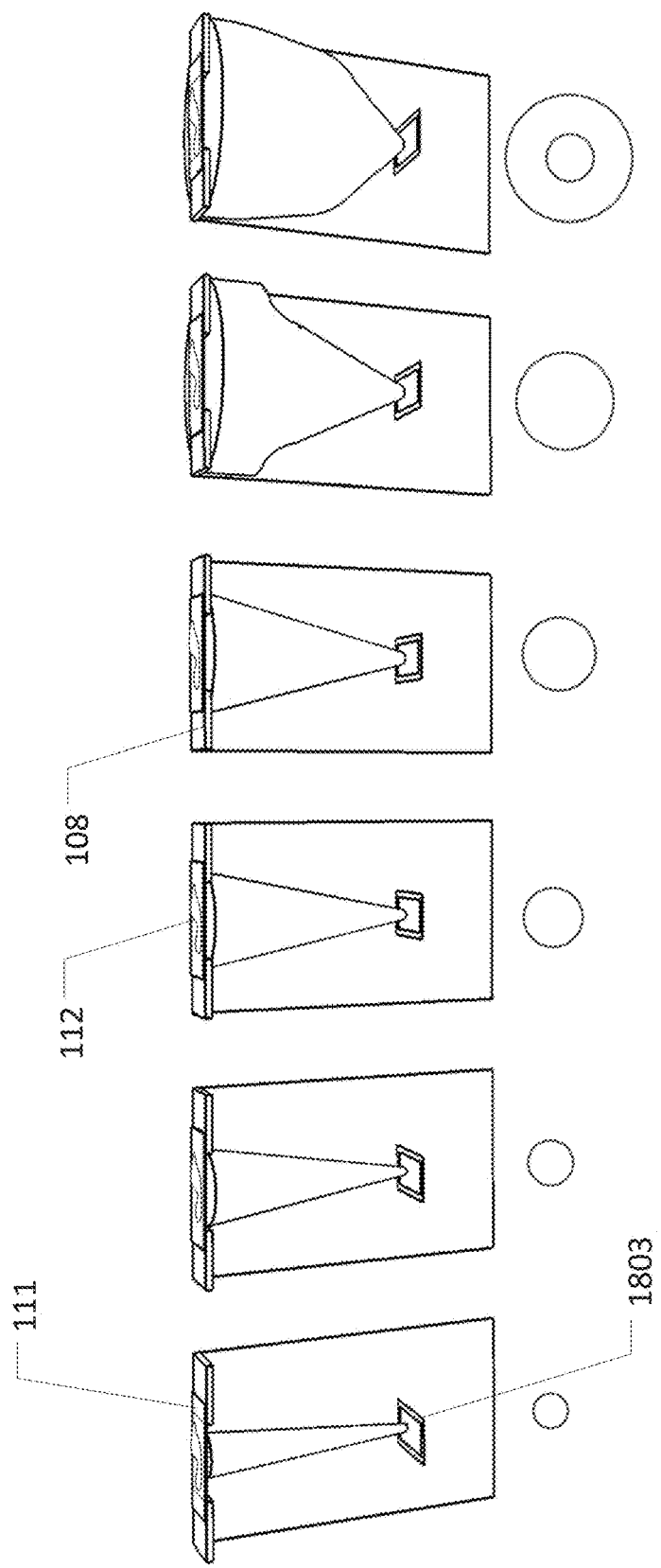
FIG. 20 illustrates a second DLP chip producing various lighting patterns to imitate a condenser.

FIG. 20 illustrates second DLP chip 1803 producing various lighting patterns to imitate a condenser. In a preferred embodiment, transmitted light DMM array 1804 can produce illuminations that are based from preset patterns that are stored within DMM settings. In such embodiment, light produced from transmitted light DMM array 1804 can imitate light produced from various condenser settings of a microscope. In one embodiment, input device 301 or computer 401 can be used to select a desired lighting pattern. Once the desired lighting pattern is selected, scanner processor 201 can send signal to transmitted light DMMs array 1804, which can allow transmitted light DMMs 1805 to produce an illumination according to one of the stored DMM settings associated with such lighting pattern. The pre-determined illumination for each lighting pattern that is stored within scanner memory 202 can allow scanner application 204 to determine, which transmitted light DMM's 1805 can be at an "ON" state or at an "OFF" state. The light produced from transmitted light DMMs 1805 can be transmitted towards the direction of stage 108. The transmitted light can then pass through glass slide 111 and illuminate specimen 112.

Figure 21:
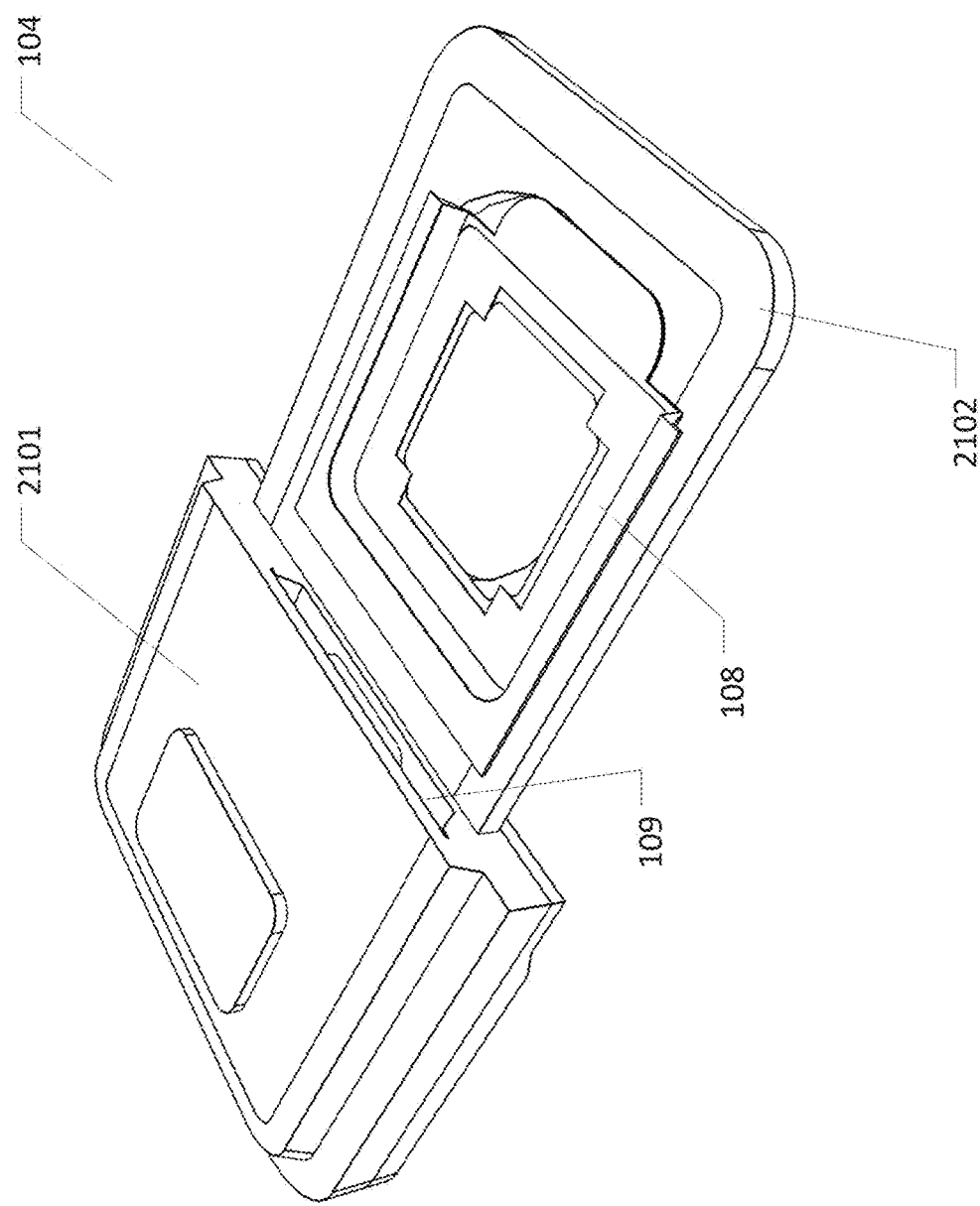
FIG. 21 illustrates an embodiment of a stage system.

FIG. 21 illustrates an embodiment of stage system 104. Stage system 104 can comprise stage 108, actuating system 109, a stage-housing 2101, and a mounting structure 2102. Stage-housing 2101 can enclose actuating system 109. Actuating system 109 can control position of stage 108 along X-axis, Y-axis, and Z-axis. In one embodiment, XY-positioner can use a piezo motor while Z-positioner can use a voice coil motor. This can allow actuating system 109 to provide better precision and speed. Further, mounting structure 2102 can be connected to stage-housing 2101 and can be positioned below stage 108. Additionally, mounting structure 2102 can comprise an opening that allows light to pass through. The opening in mounting structure 2102 can allow light from transmitted light source 110 be transmitted towards stage 108.

Figure 22:
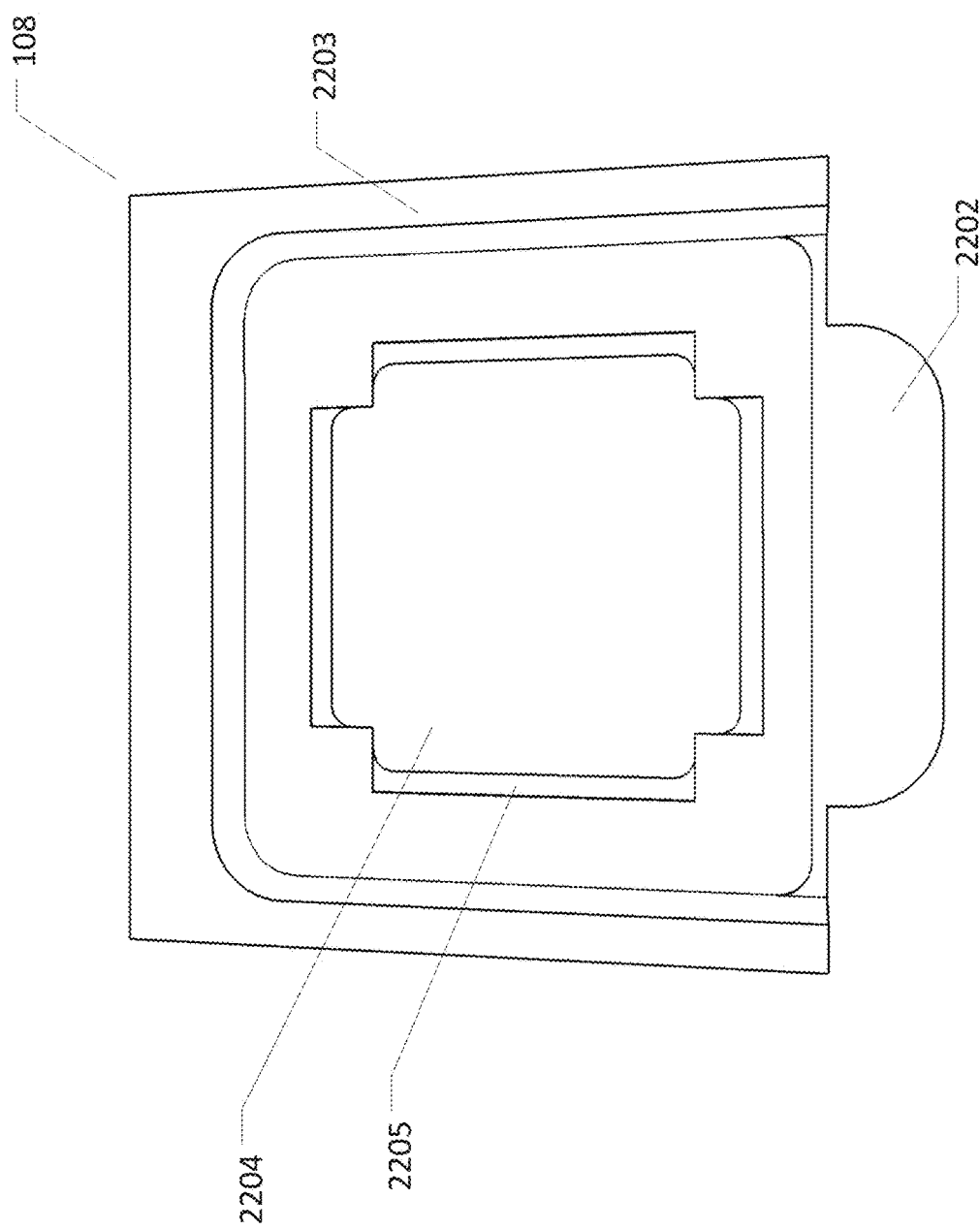
FIG. 22 illustrates a top view of a stage.

FIG. 22 illustrates a top view of stage 108. Stage 108 can comprise a grasp point 2202 and a connection point 2203. Stage 108 can comprise a stage opening 2204. In one embodiment, stage opening 2204 can be a cross-shaped orifice that is placed at the center of stage 108. In such structure, glass slide 111 can be mounted horizontally or vertically within stage opening 2204. Each opposite ends of stage opening 2204 can comprise slide supports 2205. Slide supports 2205 can secure glass slide 111 in place. Grasp point 2202 can be a portion for a user to manually manipulate. Connection point 2203 can be placed at one side of stage 108, and can connect stage 108 to actuating system 109.

Figure 23:
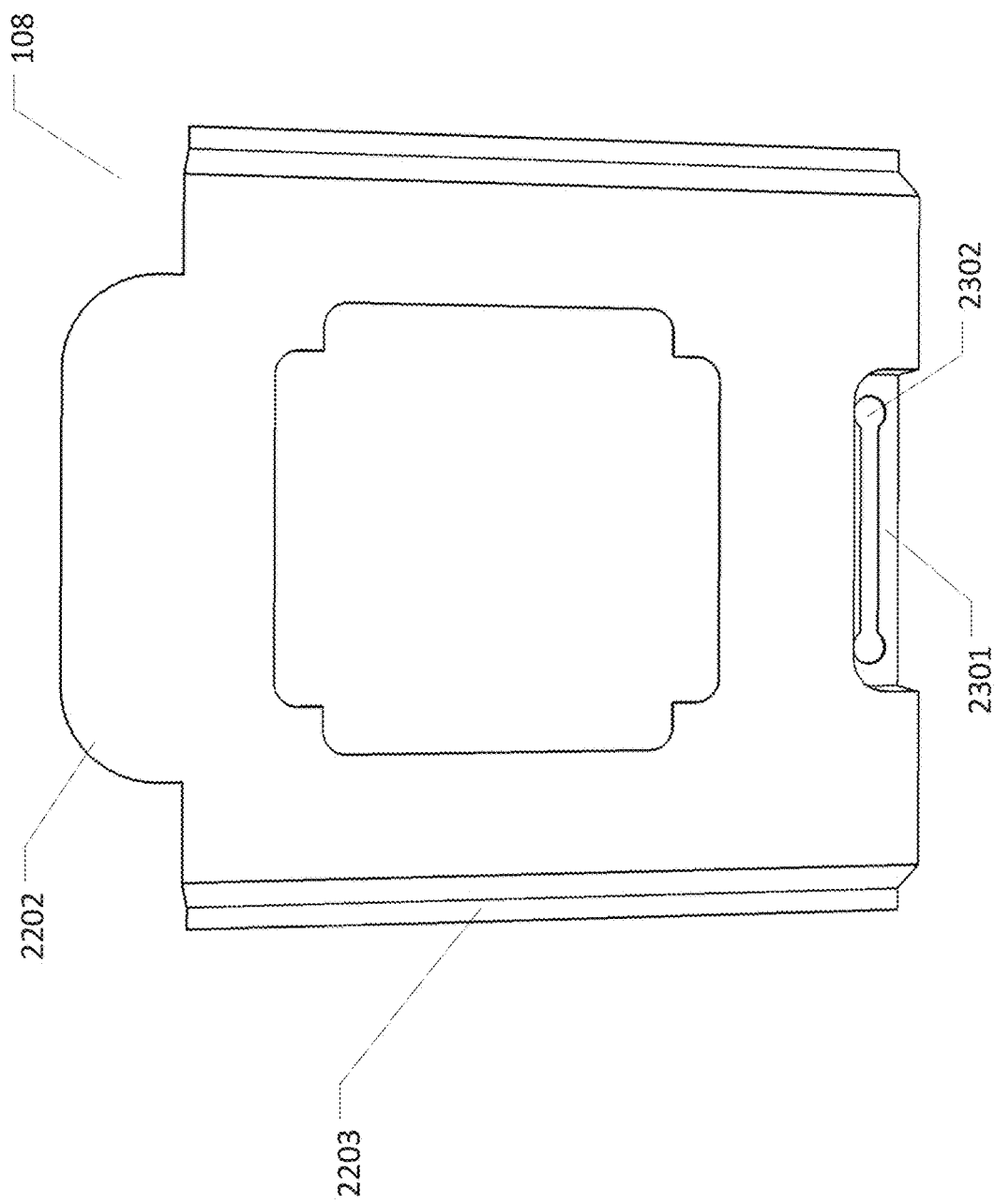
FIG. 23 illustrates a bottom view of a stage.

FIG. 23 illustrates a bottom view of stage 108. In one embodiment, connection point 2203 can comprise magnets 2302. Magnets 2302 can affix stage 108 to actuating system 109. In one embodiment, magnets can be fixed into a recess 2301 at connection point 2203.

Figure 24:
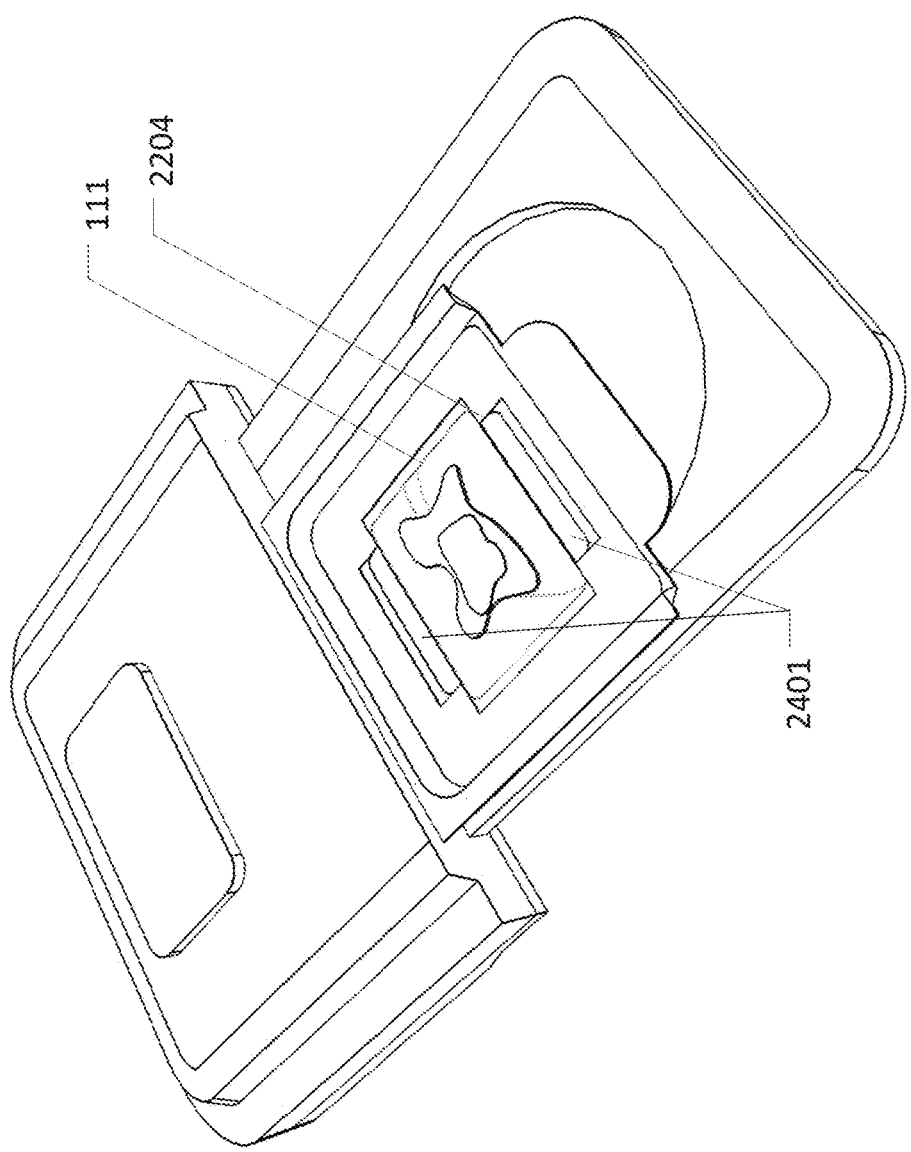
FIG. 24 illustrates a glass slide mounted within a stage.

FIG. 24 illustrates glass slide 111 mounted within stage 108. Glass slide 111 can be mounted over stage opening 2204. Because of the cross-shaped form of stage opening 2204, placing glass slide 111 onto stage opening 2204 can leave spaces 2401 at opposite sides of stage opening 2204. In FIG. 24, placing glass slide 111 onto stage opening 2204 in a horizontal position can leave spaces 2401 at the top and at the bottom of glass slide 111. Spaces 2401 can then allow transmitted light to pass by glass slide 111. Sometimes, such as in petrographic scenarios, it is necessary to view slides in both a horizontal and vertical orientation.

Figure 25:
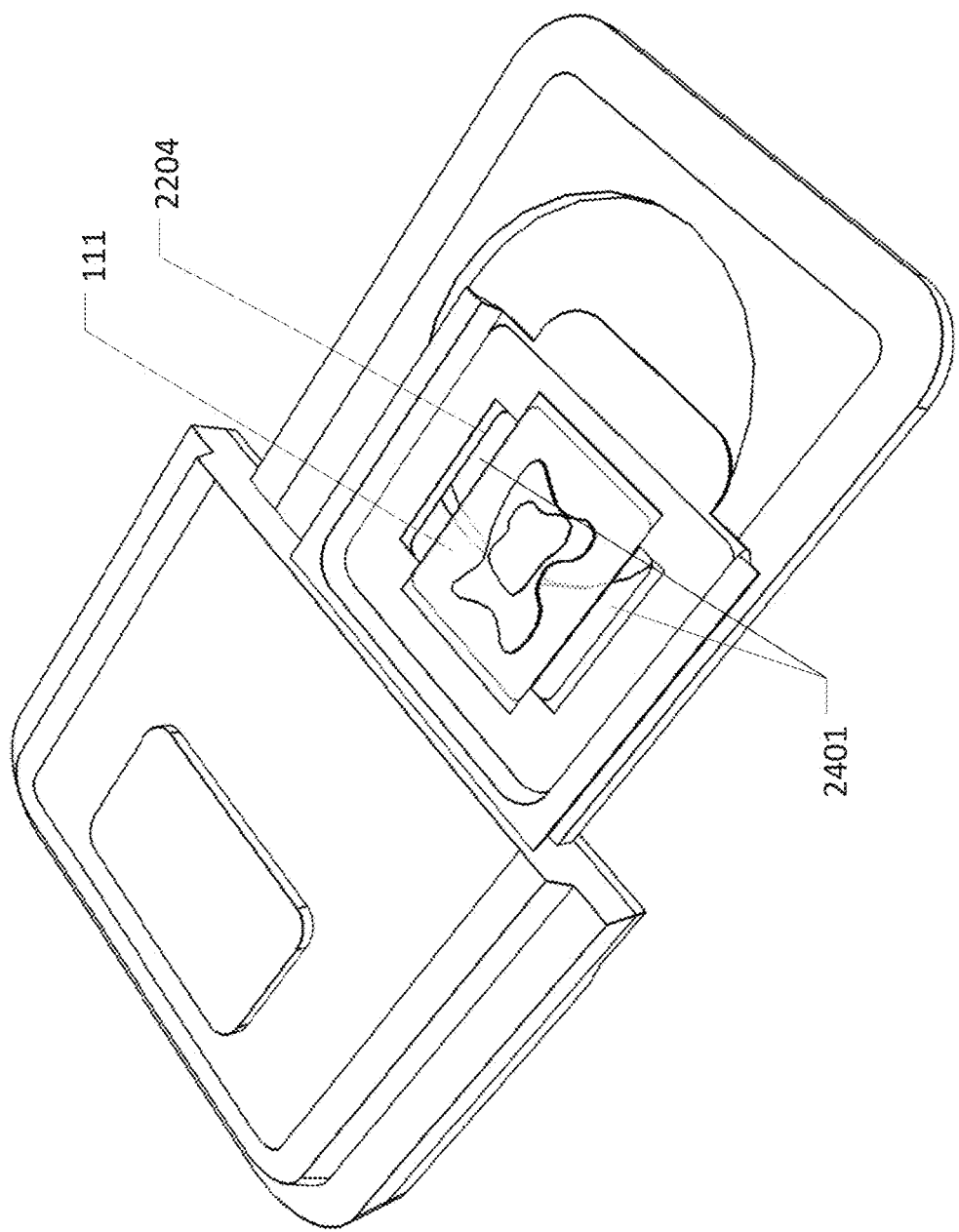
FIG. 25 illustrates a glass slide mounted onto a stage at a vertical position.

FIG. 25 illustrates glass slide 111 mounted onto stage 108 at a vertical position. In this orientation, glass slide 111 can be placed onto stage opening 2204 in a vertical position leaving spaces 2401 at the sides of glass slide 111, which can allow transmitted light to pass by glass slide 111.

Figure 26:
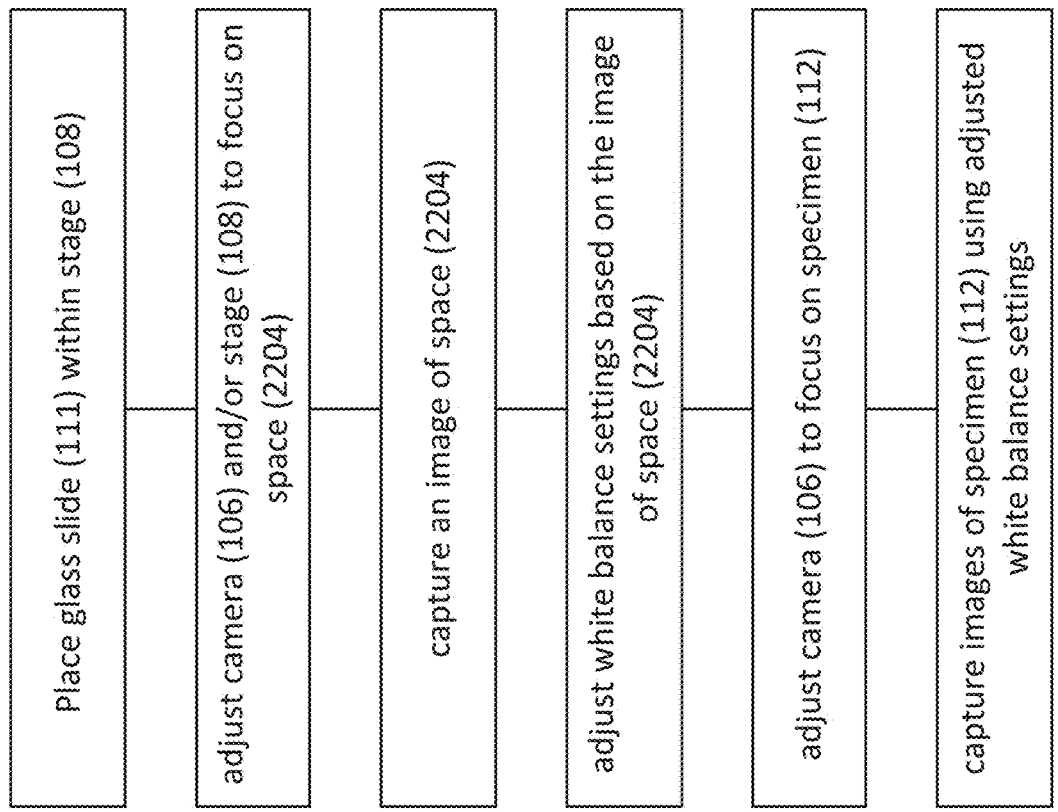
FIG. 26 illustrates a preferred method of setting white balance using a stage.

FIG. 26 illustrates a preferred method of setting white balance using stage 108. In the method, a user can place glass slide 111 within stage 108. Stage 108 can comprise space 2401 along at least one side of glass slide 111. Light from transmitted light source 1801 can pass through space 2401. In one embodiment, transmitted light source 1801 can use a white LED light. Next, scanner application 204 can adjust camera 106 and/or stage 108 so that camera 106 can focus on space 2401. Image of space 2401 can then be captured through camera 106, which can produce a white image. Using known methods, scanner application 204 can calculate the correction factors based from the white image. Once white balance is set, the scanner application 204 can adjust camera 106 and/or stage 108 to focus camera 106 on specimen 112. Scanner application 204 can then adjust white balance on specimen 112 using the correction factors. Lastly, the user can capture images of specimen 112 using the adjusted white balance settings.

Figure 27:
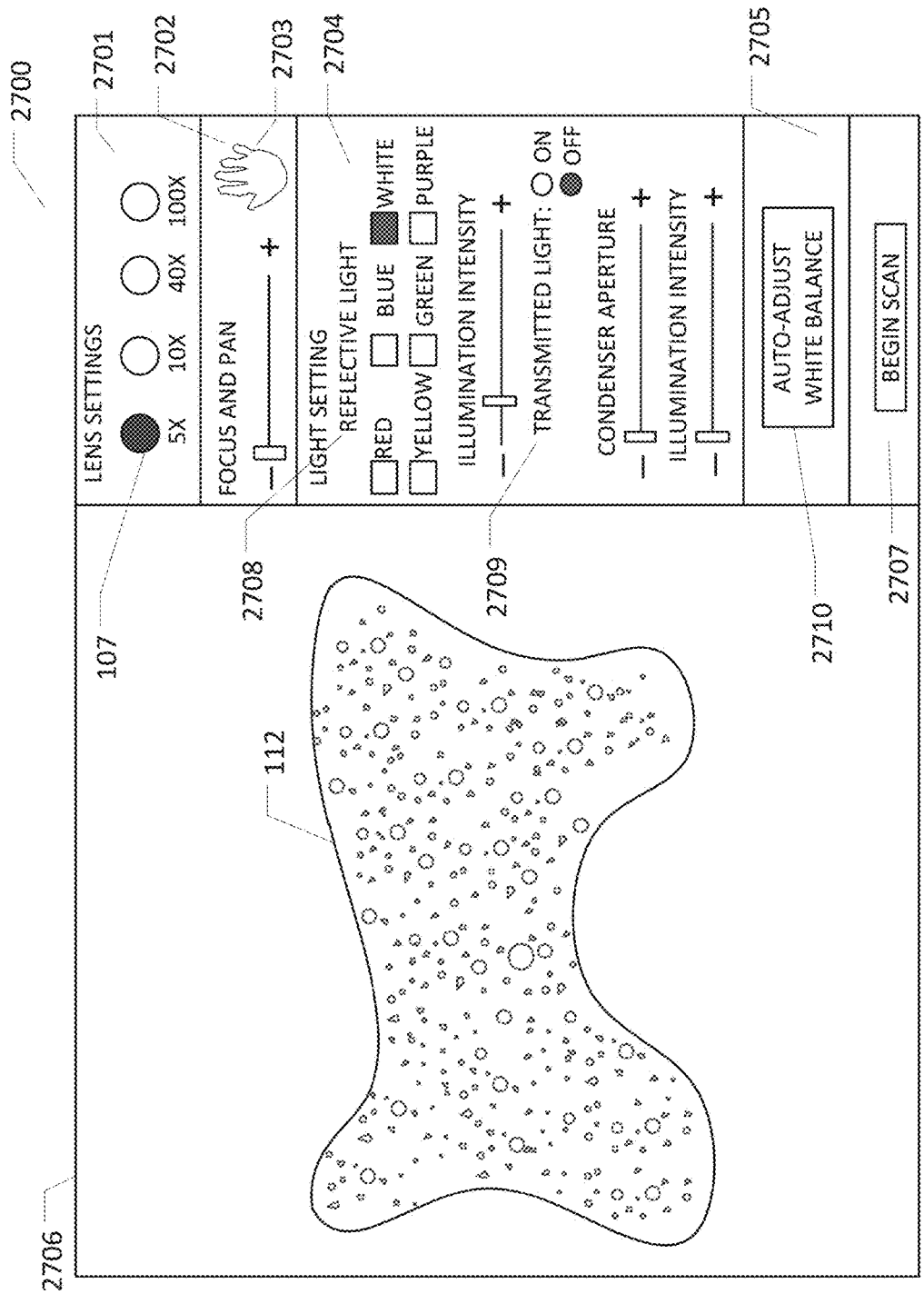
FIG. 27 illustrates a graphical user interface configured to control a specimen scanner during a real-time image data display of a specimen.

FIG. 27 illustrates a graphical user interface 2700 configured to control specimen scanner 100 during a real-time image data display of specimen 112. Graphical user interface 2700 can be a part of scanner application 204, server application 604, or computer application 609. In this embodiment, specimen scanner 100 can be controlled from another computer 401. In one embodiment, computer 401 and scanner 100 can communicate directly. In another embodiment, communication between computer 401 and scanner 100 can be managed by server application 604. By controlling specimen scanner 100, the user at a local or remote location can view image data of specimen 112 in real time. Further in one embodiment, real-time image data of specimen 112 can be a video. In another embodiment, real-time image data of specimen can be an image.

In one embodiment, graphical user interface 2700 can comprise a lens setting 2701, a focus control 2702, a panning control 2703, a light settings 2704, a white balance control 2705, a viewing area 2706, and a begin-scan button 2707. Lens setting 2701 can allow user to select magnification of the image of specimen 112. In one embodiment, magnifying specimen 112 can result in choosing a particular objective lens 107. Focus control 2702 can allow user to adjust the focus of scanner 100 on specimen 112. In one embodiment, focus control can result in moving stage 108 along its z-axis. In another embodiment, camera 106 can move instead of stage 108. Panning control 2703 can allow user to move image of specimen 112. In one embodiment panning specimen 112 can result in moving stage 108 along its x-axis and y-axis. In another embodiment, panning specimen 112 can result in moving camera 106.

In one embodiment light settings 2704 can further comprise a reflective light controller 2708, and a transmitted light controller 2709. Reflective light controller 2708 can allow user to control reflective light source system 102, such as by selecting a color of light to use to illuminate specimen 112. Further in one embodiment reflective light controller 2708 can allow a user to control the illumination intensity of the reflected light.

Transmitted light controller 2709 can allow user to control transmitted light source 110, such as by turning transmitted light source system 105 on or off. In other embodiments, transmitted light controller 2709 can provide more controls such as condenser controls, or light shaping to imitate condenser settings.

White balance control 2705 can comprise an auto-adjust control 2710. In one embodiment, auto-adjust control 2710 can be a button. In such embodiment, pressing auto-adjust control 2710 can automatically apply color balance to specimen 112 according the method described earlier in this disclosure or by any other method known in the art.

Viewing area 2706 can allow user to view specimen 112 in real-time using the settings selected by the user. As an example shown in FIG. 27, the user can choose to view specimen 112 using the following settings: select lens setting 2701 at 5× magnification, select reflective light white checkbox, and select transmitted light ON. Viewing area 2706 can then show specimen 112 using the selections made on control settings. This can allow the user to inspect image of specimen 112 before a scan. One reason a user may want to view specimen in real time is to prepare to scan specimen 112, as described further in this disclosure. Once a user has made certain determinations regarding specimen 112, the user can begin the scanning process, in one embodiment by clicking a "Begin scan" button 2707, which can allow user to start setting up various scan settings to use in scanning a selected portion or an entire portion of specimen 112.

Figure 28:
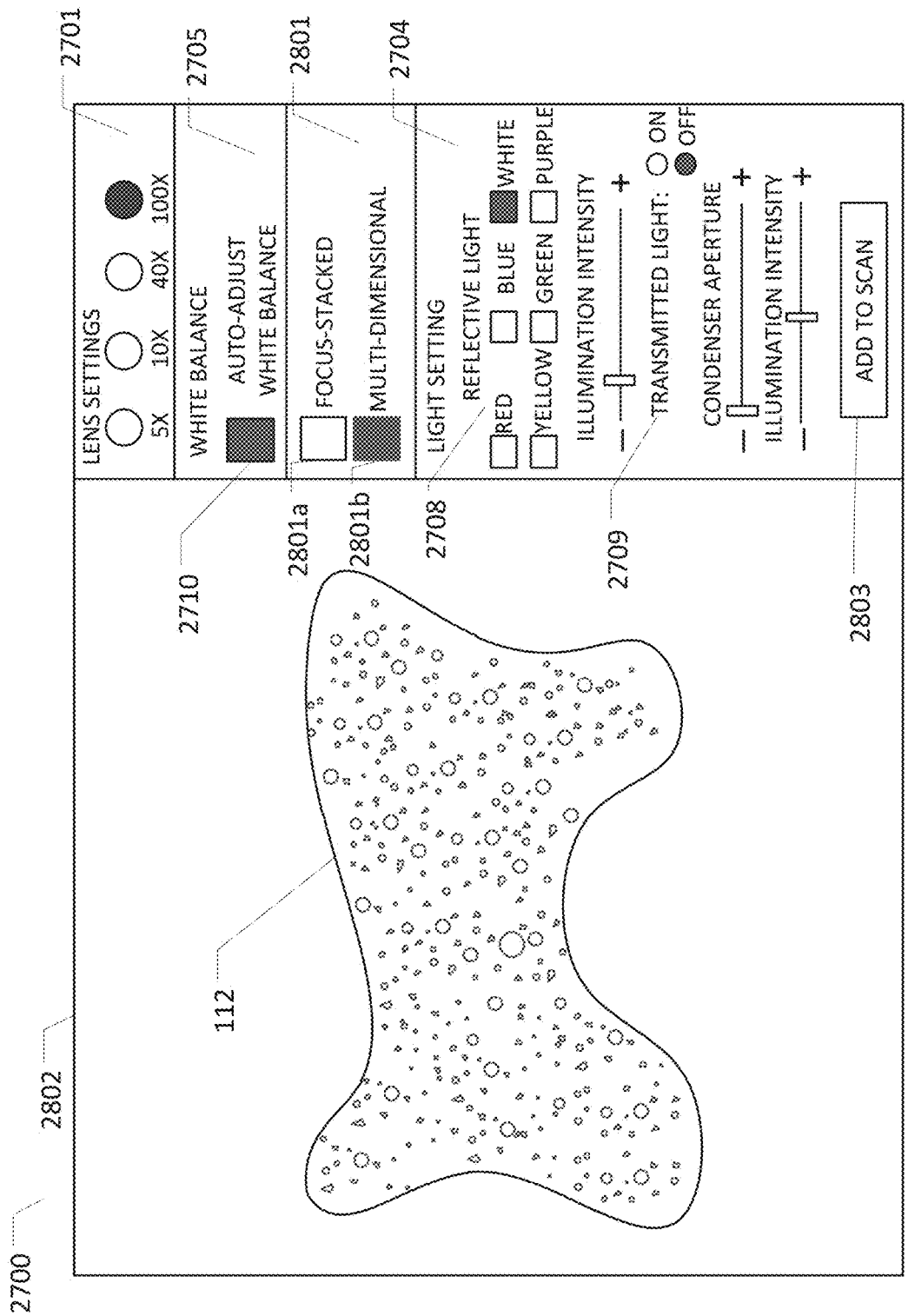
FIG. 28 illustrates a graphical user interface configured to allow user to setup scanning of a specimen.

FIG. 28 illustrates graphical user interface 2700 configured to allow user to setup scanning of specimen 112. In one embodiment, graphical user interface 2700 can comprise a scan-type selection 2801, lens setting 2701, light settings 2704, white balance control 2705, a scanning area 2802 and an add-to-scan button 2803.

To perform a scan or set of scans, a user can select which objective lens 107 can be used for the scan. A user may additionally select whether or not scanner 100 will perform a white balance adjustment before scanning. In one embodiment, such selections can be global. If global, such decisions will be implemented for each scan in a set of scans. Graphical user interface 2700 can allow for additional configurations. Scan-type selection 2801 can allow user to select how specimen 112 can be scanned. In one embodiment, user can either select a focus-stacked selection 2801a, or a multi-dimensional selection 2801b. If the user selects focus-stacked selection 2801a, a focus-stacked scan can be performed when scanning specimen 112, as described further in this disclosure. If the user selects multi-dimensional selection 2801b, a multi-dimensional scan can be performed, as described further in this disclosure. In one embodiment, user can select both. In such instance, scanner application 204 can create both scan types from a single scan of specimen 112 or from two scans. Light settings 2704 can allow user to select the color of light to use when illuminating specimen 112. As such, user can select reflective light controller 2708 and/or transmitted light controller 2709. Under reflective light controller 2708, a user can choose from a plurality of light colors. Under transmitted light controller 2709 and reflective light controller 2708, in one embodiment, user can also make changes to light shape and/or intensity.

In one embodiment, an image of specimen 112 can be shown on scanning area 2802 according to the settings selected by the user. As such, scanning area 2802 can allow user to view an image of specimen 112 before scan. After selecting the settings for a scan, the user can click on add-to-scan button 2803 to add a scan setting to use in scanning specimen 112. In one embodiment, the user can repeat this process to create a set of scans of specimen 112 for specimen scanner 100 to perform in one session.

Figure 29:
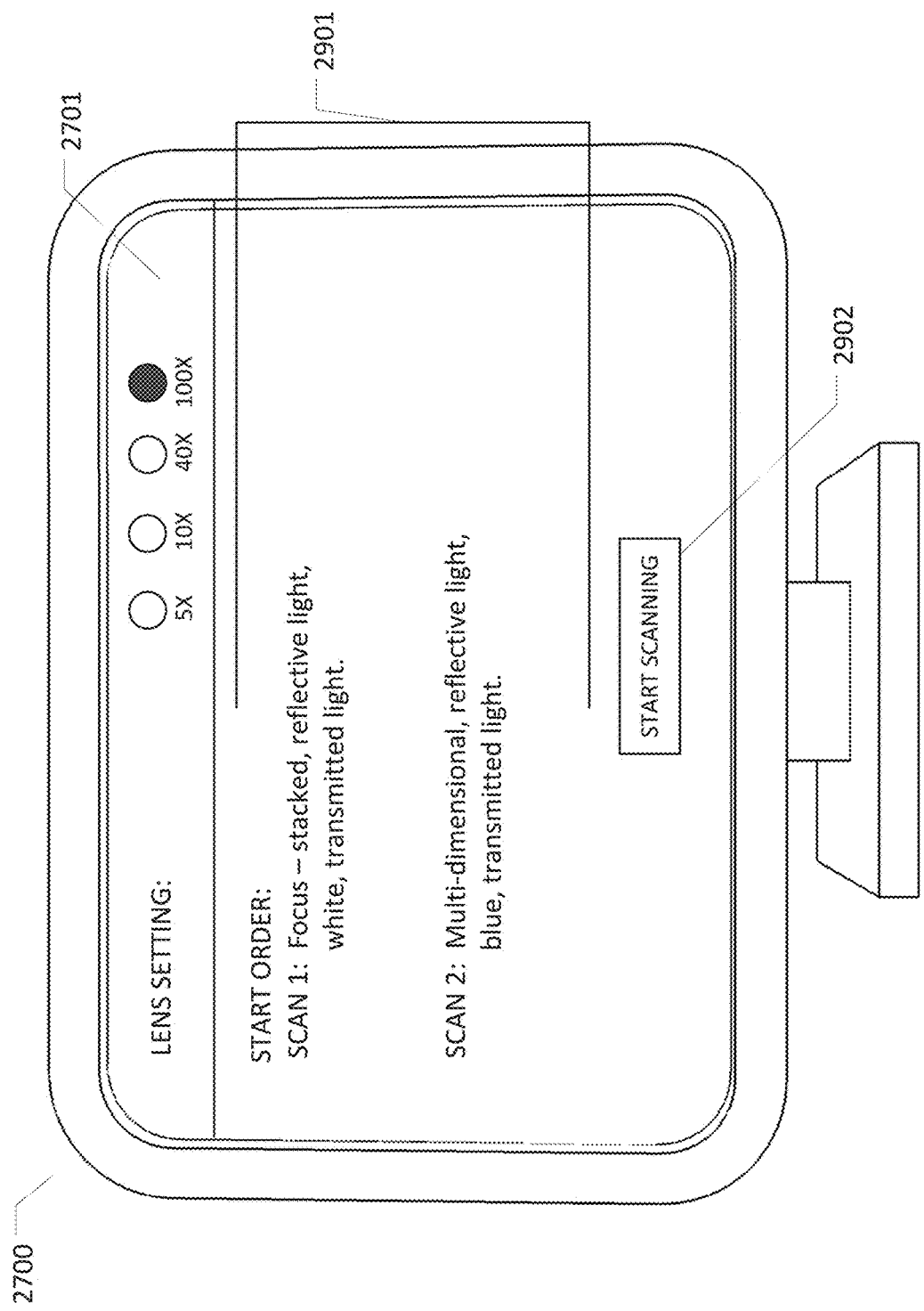
FIG. 29 illustrates a graphical user interface displaying a scan order.

FIG. 29 illustrates graphical user interface 2700 displaying a scan order 2901. Scan order 2901 can comprise a summary of scans about to be performed by specimen scanner 100. If the user is satisfied, then he or she can initiate scanning by, in one embodiment, clicking a start-scanning button 2902.

FIGS. 30-42 illustrate various systems and methods for scanning specimen 112.

Figure 30:
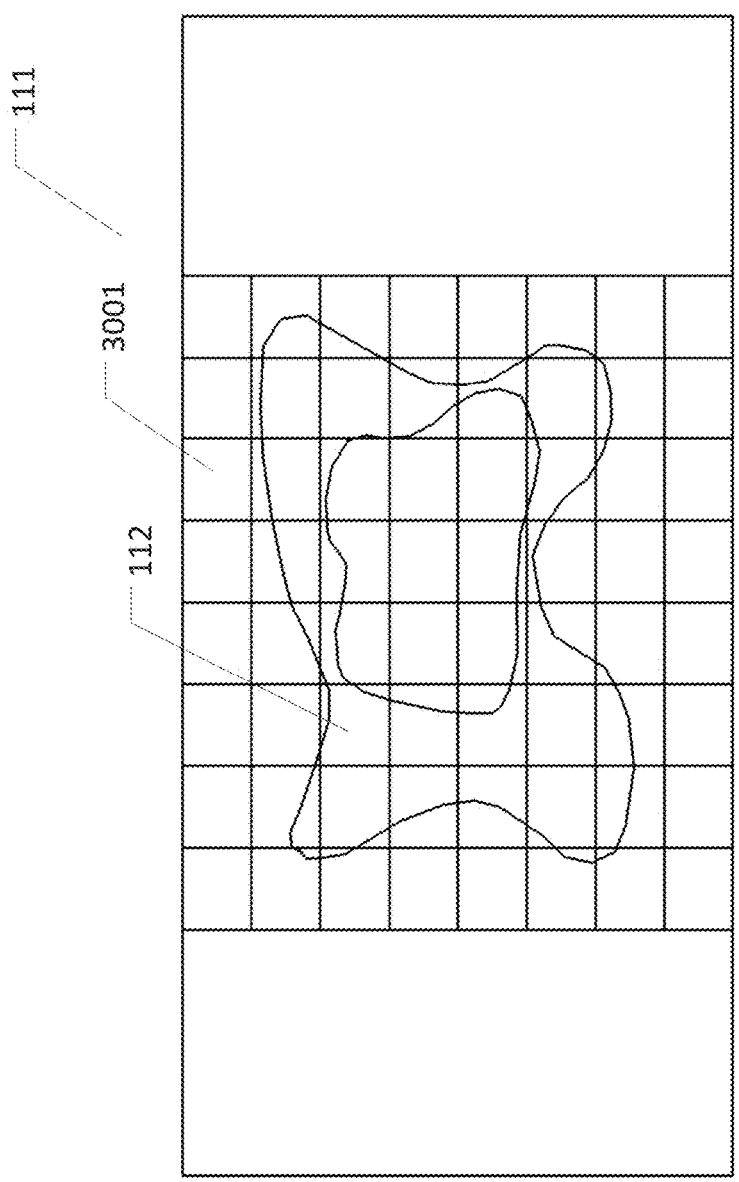
FIG. 30 illustrates a glass slide.

FIG. 30 illustrates glass slide 111. To capture entire specimen 112, scanner application 204 can divide specimen 112 into a plurality of regions 3001 based on lens settings 2701. Camera 106 can then capture image/s of each region 3001 according to the methods described below.

FIGS. 31-37 illustrate methods for producing a focus-stacked scan. In a focus-stacked scan embodiment, images of selected region 3001 can be captured by camera 106 at different focal planes. These images captured at different focal planes can be combined to create a single focus-stacked image with greater depth of focus using a novel focus-stacking technique.

Figure 31:
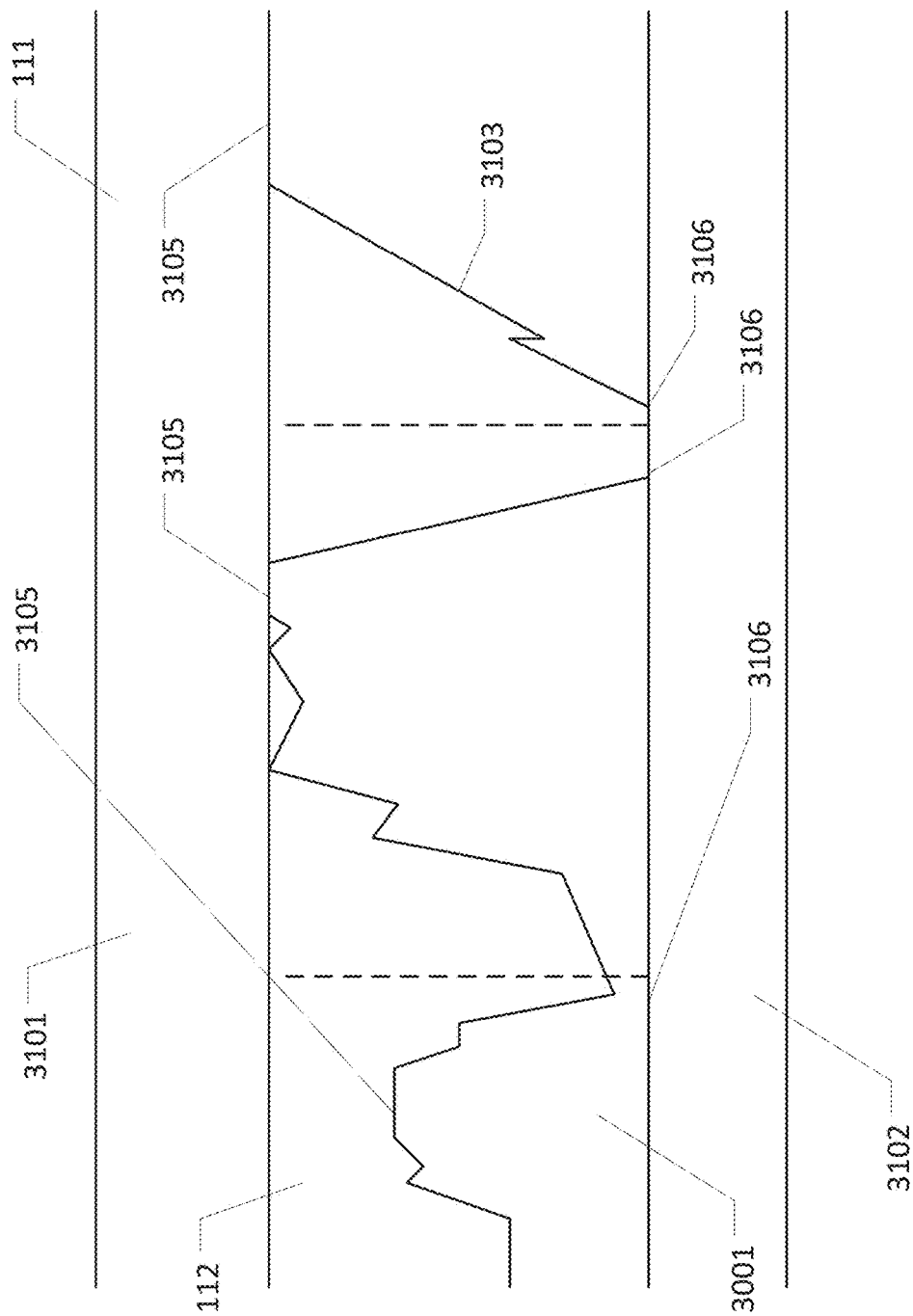
FIG. 31 illustrates a side view of a glass slide.

FIG. 31 illustrates a side view of glass slide 111 and specimen 112. Glass slide 111 can comprise specimen 112 mounted between a top glass slide 3101, and a bottom glass slide 3102. Specimen 112 can comprise topography 3103. Each region 3001 can comprise a regional peak 3105, and maximum depth 3106. In each region 3001, regional peak 3105 can be the highest point in topography 3103 in that particular region 3001. Maximum depth 3106 can be the lowest sampling position. In one embodiment, maximum depth 3106 can be predetermined. In one embodiment, maximum depth 3106 can be the top of bottom glass slide 3102. During the scanning process, interferometer 113 can shoot a laser at each region 3001 and measure the time it takes before interferometer 113 can receive a reflection of the laser. The first reflections interferometer 113 can receive can come from regional peak 3105 of selected region 3001. Based from interferometer 113's measurement result, scanner application 204 can determine the highest point camera 106 needs to focus on when capturing images along the z-axis of each region 3001. This can ensure that the entire topography 3103 captured by camera 106 is in focus in the final focus-stacked image.

Figure 32:
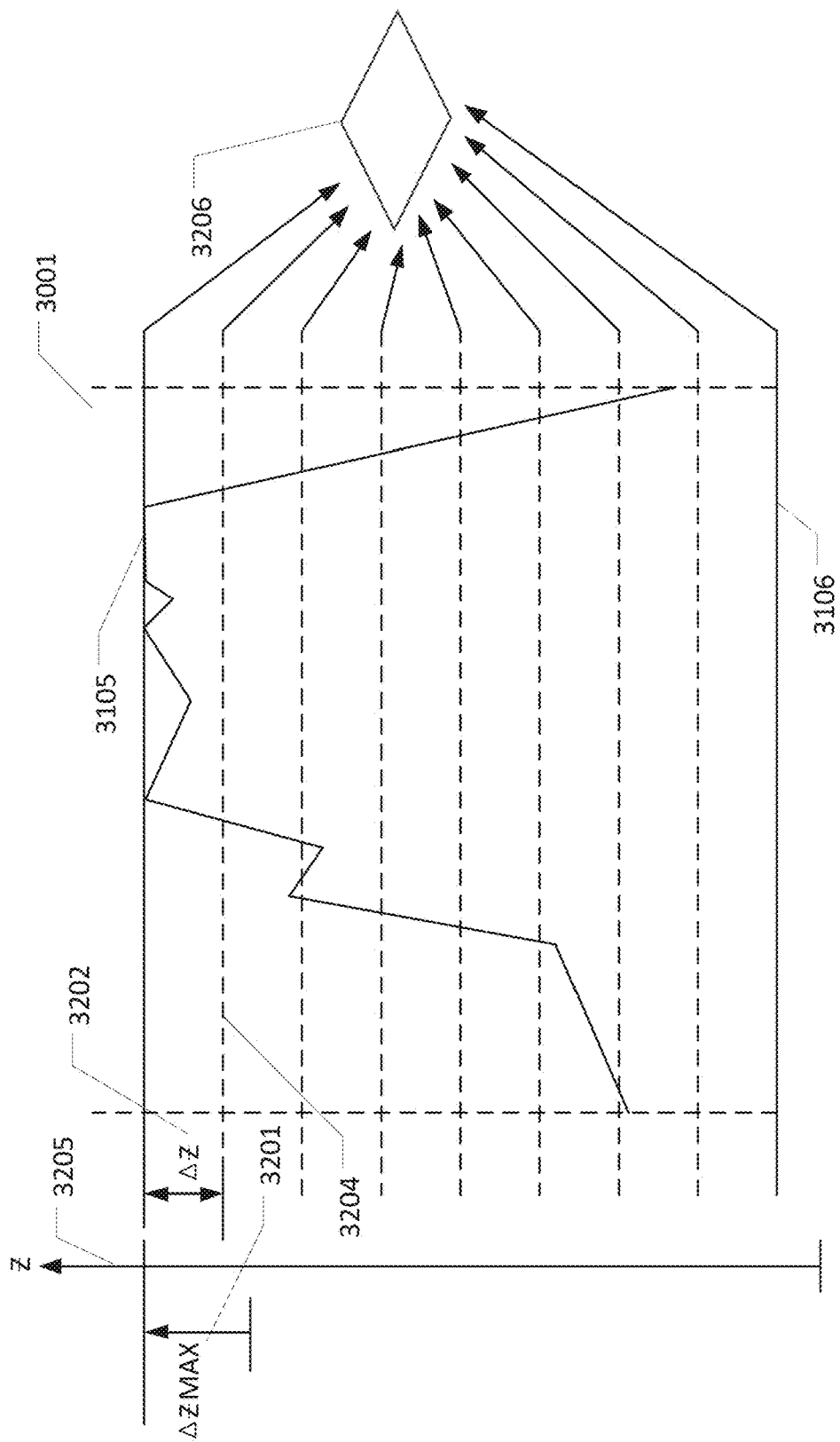
FIG. 32 illustrates a region that is sampled by a scanner application.

FIG. 32 illustrates region 3001 sampled by scanner application 204. The depths of topography 3103 of specimen 112 can vary along a z-axis 3205. Such variance can create focusing issues. For example, when camera 106 is focused on regional peak 3105 of region 3001, other lower areas of region 3001 may be out of focus. Conversely, when camera 106 is focused at maximum depth 3106, then the higher planes in that region can be out of focus. Thus, all image information along z-axis cannot be captured clearly and accurately in one image by camera.

To address this problem, scanner application 204 can take a plurality of images, each at a series of focal planes 3204 orthogonal to z-axis 3205. A sampling distance 3202 can affect both the efficiency and quality of a scan; if sampling distance 3202 is too long, some areas may be out of focus, and if sampling distance 3202 is too short, the scanning will take an unnecessary amount of time to complete. To determine a preferred sampling distance 3202, scanner application 204 can use various calculative methods such as those based on Nyquist sampling frequency formulas to determine focus planes 3204 along z-axis at which images can be captured by camera 106. Using Nyquist and one or more characteristics of light and/or objective lens 107 such as frequency, wavelength, or numerical aperture. scanner application 204 can calculate a maximum sampling distance ($\Delta z_{max}$) 3201. An example formula for determining maximum sampling distance 3201 is $$\Delta z = \frac{\lambda}{(NA)^2},$$

wherein "$\lambda$" is wavelength, and "NA" is the numerical aperture. Similarly, scanner application 204 can calculate maximum sampling distance 3201 using frequency of the light source as well. In one scenario, user can select one or more light settings 2704 to illuminate specimen 112. In one embodiment, scanner application 204 can sample focal planes 3204 each separated from nearest adjacent focal plane 3204 by sampling distance 3202. In a preferred embodiment, sampling distance 3202 of each region can be less than or equal to maximum sampling distance 3201. Doing so ensures that images in between regional peak 3105 and maximum depth 3106 of selected region 3001 can be captured without informational loss from specimen 112. However, sampling distance 3202 can be greater than maximum sampling distance 3201 in some embodiments, however such embodiment may have areas that are not completely in focus.

In one embodiment, if a user wishes to create and combine multiple scans, each with a different light setting 2704, using varying sampling distances 3202 for each light setting 2704 can cause each scan to have a different number of focal planes 3204 at varying positions along the z-axis. In another embodiment, scanner application 204 can sample each focal plane 3204 using sampling distance 3202 of light setting 2704 that has the shortest wavelength. In such embodiment, each light setting 2704 can have the same number of focal planes 3204 at the same positions along z-axis 3205.

To perform a scan, scanner processor 201 can send signal to camera 106 to capture images at each focal plane 3204. To do so, in one embodiment, scanner application 204 can find regional peak 3105 using interferometer 113. Next, camera 106 can focus on focal plane 3204 nearest regional peak 3105, by adjusting camera 106, objective lens 107, and/or stage 108. Such focal plane 3204 can be chosen such that it is a common focal plane 3204 with adjacent regions 3001. Then camera 106 can shift focus by sampling distance 3202 and capture images of the next lower focal planes 3204 of selected region 3001. The process of shifting focus and capturing images on focal plane 3204 at every sampling distance 3202 interval can be done repeatedly until reaching focal plane 3204 at or substantially near maximum depth 3106 of selected region 3001. Once all figures in region 3001 are captured, scanner application 204 can focus-stack images within selected region 3001 into a focus-stacked scan 3206.

Figure 33:
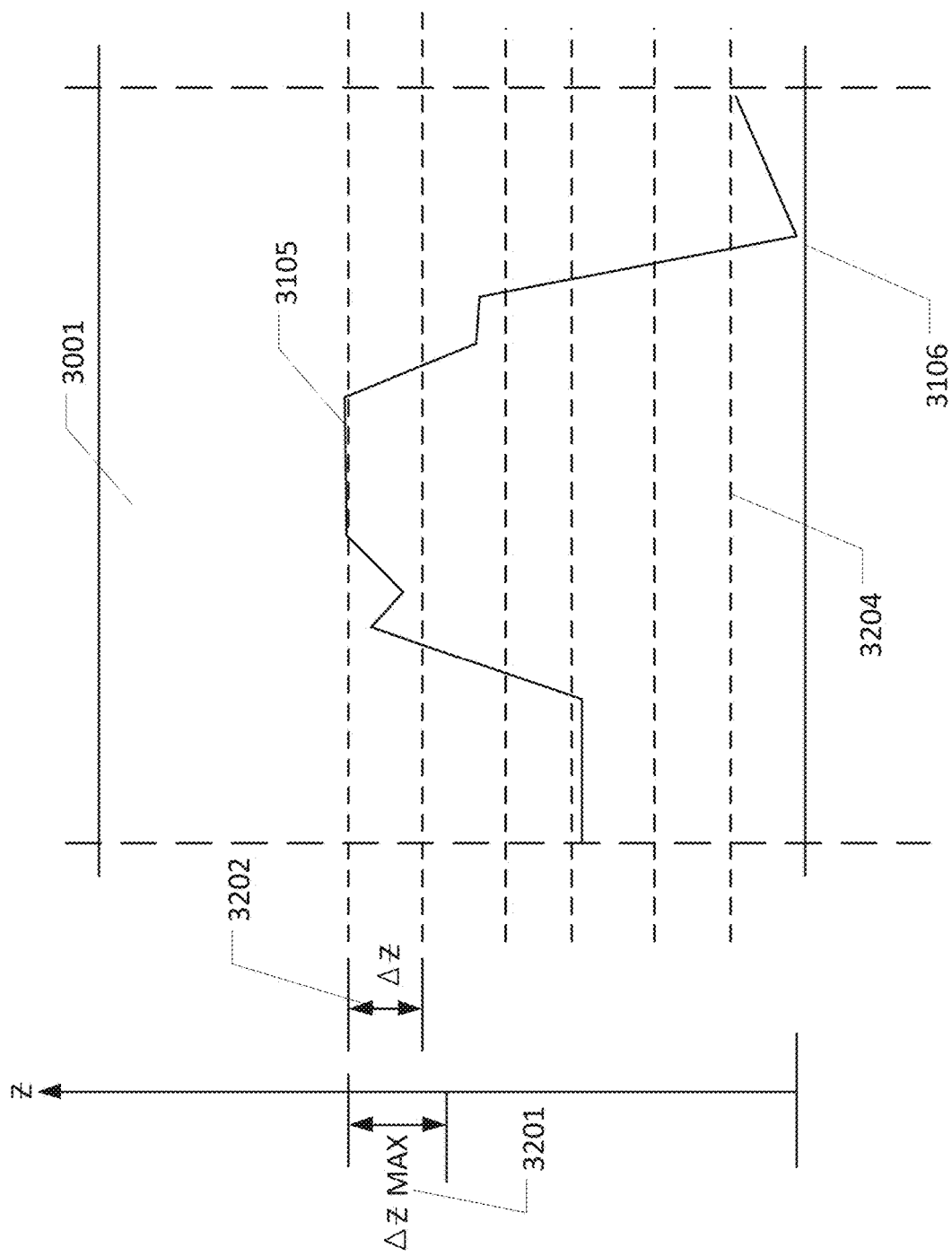
FIG. 33 illustrates another region that is sampled by a scanner application.

FIG. 33 illustrates another region 3001 that is sampled by scanner application 204. Scanner application 204 can select next region 3001. In this region, as interferometer 113 directs a laser down on region 3001, the first reflected signal interferometer 113 receives first can come from regional peak 3105, which, in FIG. 33 is lower than top glass slide 3101. Next, scanner application 204 can determine focal planes 3204 that are between regional peak 3105 and maximum depth 3106. Each focal plane 3204 can be separated by sampling distance 3202 and can be on common planes with focal planes 3204 of FIG. 32. In region 3001 of this figure, scanner processor 201 can send signal to camera 106 to capture images in the same manner as described in FIG. 32. After images of region 3001 of this figure are captured, scanner application 204 can focus-stack the plurality of images into a focus-stacked image. Next, scanner application 204 can stitch the focus-stacked image taken from this selected region 3001 with previously captured images from other regions to create a complete focus-stacked scan 3206.

Figure 34:
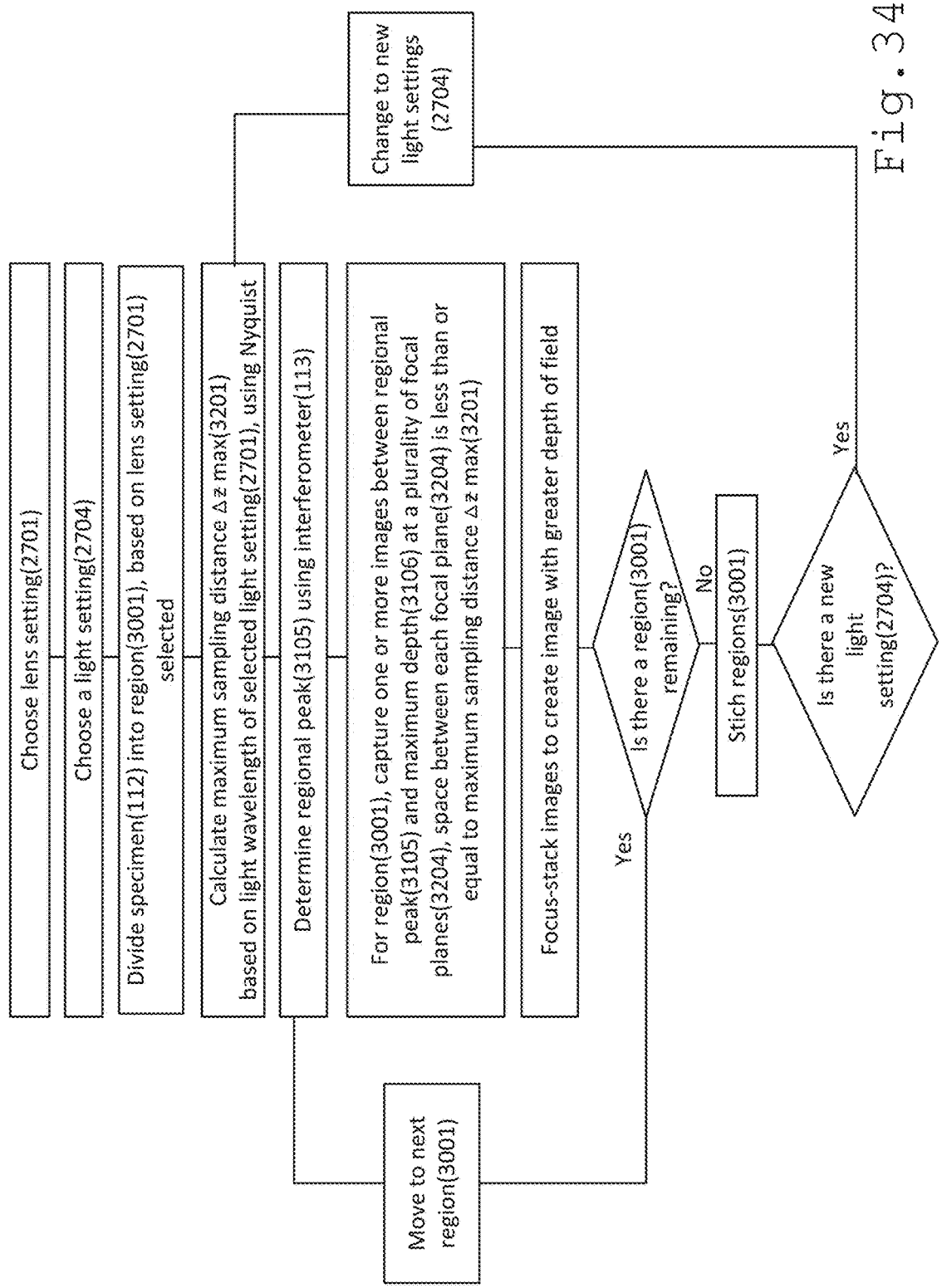
FIG. 34 illustrates an exemplary method for scanning a specimen for creating a focus-stacked scan.

FIG. 34 illustrates an exemplary method for scanning specimen 112 for creating focus-stacked scan 3206. In a preferred method, lens setting 2701 can be selected. Next, reflective and/or transmitted light to use on specimen 112 can be chosen. Based on characteristics of the light, maximum sampling distance 3201 can be calculated. In one embodiment, sampling distance 3202 less than or equal to maximum sampling distance 3201 can then be chosen. Then, specimen 112 can be divided into regions 3001 based on lens setting 2701 selected. For example, a lens with greater magnification will make visible smaller sections of specimen 112. As such, regions 3001 must be smaller. Regional peak 3105 of selected region 3001 can then be determined using interferometer 113. Next, focal planes 3204 can be determined for selected region 3001. Then, for region 3001, images can be captured between regional peak 3105 and maximum depth 3106 at each focal plane 3204. The captured images can be focus-stacked to create a focus-stacked image. This process can be completed for each region 3001. Then, focus-stacked images from each region 3001 can be stitched to make focus-stacked scan 3206. The above-mentioned steps can be repeated for each light setting 2704.

Figure 35:
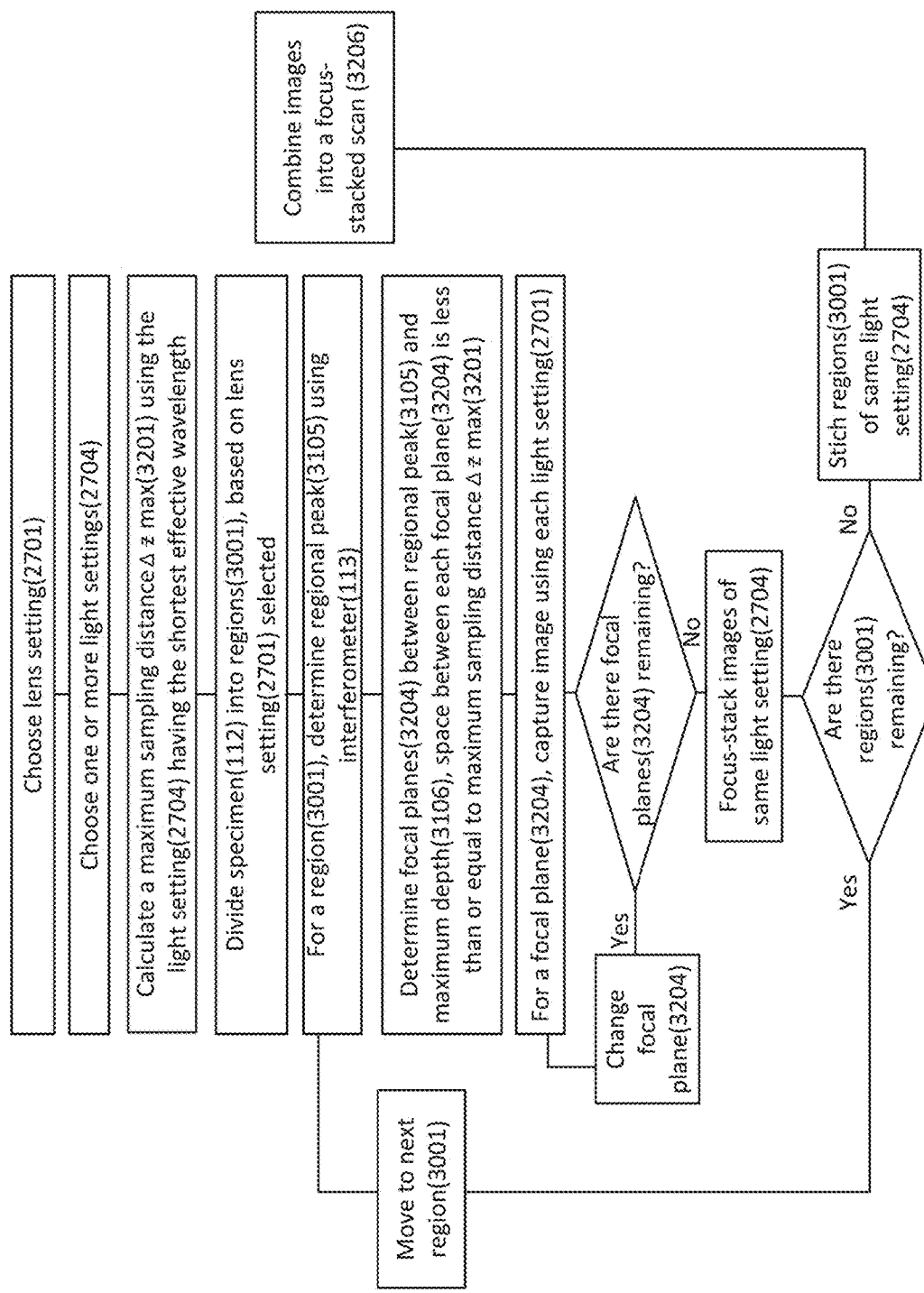
FIG. 35 illustrates another exemplary method for scanning a specimen for creating a focus-stacked scan.

FIG. 35 illustrates another exemplary method for scanning specimen 112 for creating focus-stacked scan 3206. In a preferred method, lens setting 2701 can be selected. Next, one or more light settings 2704, such as reflective and/or transmitted light can be chosen to use on specimen 112. Based on characteristics of each light, maximum sampling distance 3201 of the light having the shortest effective wavelength can be calculated. In one embodiment, sampling distance 3202 less than or equal to maximum sampling distance 3201 can then be chosen. Then, specimen 112 can be divided into regions 3001 based on lens setting 2701 selected. For selected region 3001, regional peak 3105 can be determined using interferometer 113. Next, each focal plane 3204 between regional peak 3105 and maximum depth 3106 can be determined. The space between each focal plane 3204 is less than or equal to maximum sampling distance 3201. For focal plane 3204, images can be captured using each light setting 2704. This process can be completed for each focal plane 3204 of selected region 3001. The captured images can be focus-stacked to create a focus-stacked image. The above-mentioned steps can be repeated for each region 3001 remaining. Then, created focus-stacked images of each region 3001 of same light setting 2704 can be stitched into focus-stacked scans 3206. Lastly, focus-stacked scans, in one embodiment, can be combined into multi-modal focus-stacked scan 3206.

Figure 36:
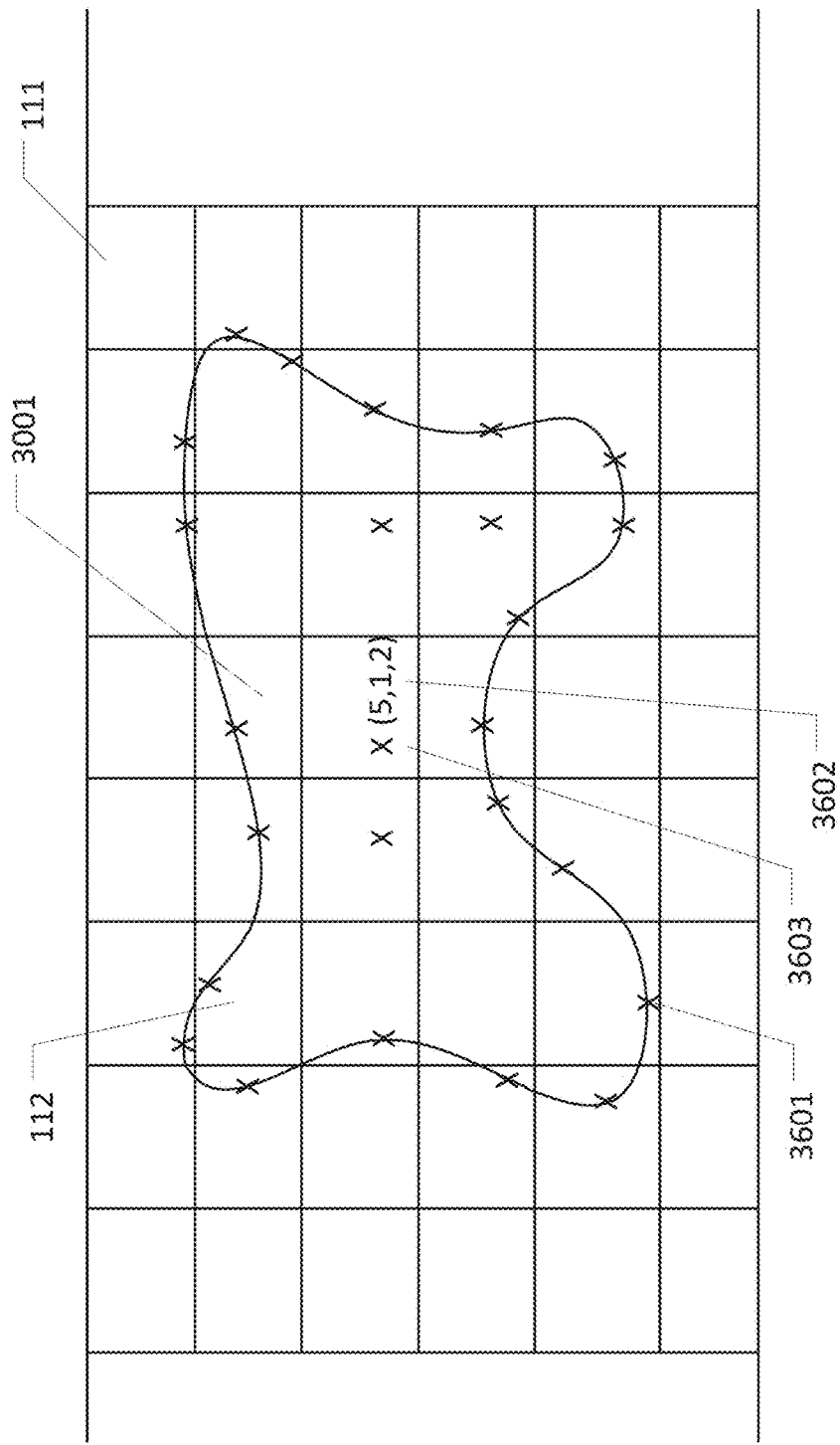
FIG. 36 illustrates a glass slide.

FIG. 36 illustrates glass slide 111. In this embodiment, specimen 112 can be captured and/or defined through a set of focal points 3601. In one embodiment, a user can select focal points 3601 on specimen 112. In this embodiment, the user can manually select each focal point 3601 based on the shape and/or region of specimen 112. In another embodiment, scanner application 204 can automatically select focal points 3601 of specimen 112. In such embodiment, scanner application 204 can use edge-detection techniques to determine focal points 3601. Further in one embodiment, focal point 3601 can relate to regional peak 3105. Using interferometer 113, scanner application 204 can determine a regional peak position 3602 along z-axis 3205 of each focal point 3601 within a subset of regions 3001. Regional peak position 3602 can be the z-coordinate that corresponds to the location of each regional peak 3105. Using numerical methods, scanner application 204 can interpolate regional peak positions 3602 of remaining regions 3603 for entire specimen 112. Numerical methods can include, but are not limited to triangulation, multi-dimensional curve fitting, linear methods and non-linear methods, parametric and non-parametric methods, as well as regressive techniques.

Scanner application 204 can then direct camera 106 to capture images at regions 3001. During this process, scanner application 204 can ensure that sampling distance 3202 is less than or equal to maximum sampling distance 3201 of the selected region 3001. At each light setting 2704, camera 106 can focus on and capture images at focal plane 3204 nearest regional peak 3105 of selected region 3001. Next, camera 106 can focus on a lower focal plane 3204 that is sampling distance ($\Delta z$) 3202 away from the interpolated regional peak position 3602. Camera 106 can capture the images at each focal plane 3204 until camera 106 reaches maximum depth 3106 on the selected region 3001. In one embodiment, as described here, focal planes 3204 can extend substantially from regional peak 3105 to maximum depth 3106 of the selected region 3001. Next, scanner application 204 can determine if there are other regions 3001 remaining to be scanned. If there are other regions 3001 left, scanner application 204 can move to next region 3001 remaining and begin the same process of capturing images at various focal planes 3204 between interpolated regional peaks 3105 and maximum depth 3106. After capturing images at focal planes 3204 for each region 3001 of entire specimen 112, scanner application 204 can focus-stack images of focal planes 3204 with the same light setting 2704 to create a single focus-stacked image. Next, scanner application 204 can stitch the focus-stacked images taken from each region 3001 to create complete focus-stacked scan 3206.

Figure 37:
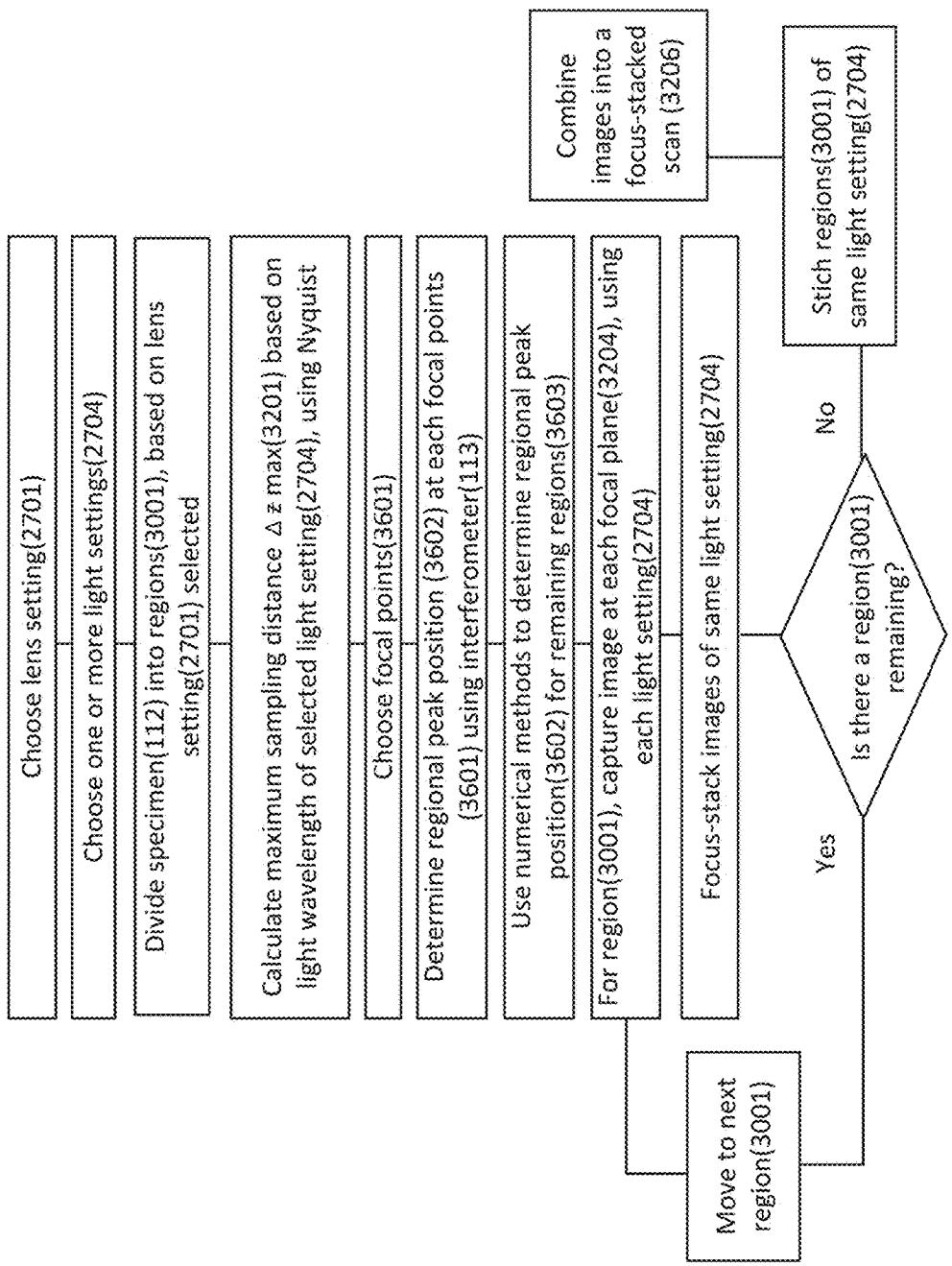
FIG. 37 illustrates another exemplary method for scanning a specimen for creating a focus-stacked scan.

FIG. 37 illustrates another exemplary method for scanning specimen 112 for creating focus-stacked scan 3206. In a preferred method, lens setting 2701 can be selected. Next, light settings 2704 to use on specimen 112 can be chosen. Then, specimen 112 can be divided into regions 3001 based on lens setting 2701 selected. Based on characteristics of the light, maximum sampling distance 3201 can be calculated. In one embodiment, sampling distance 3202 less than or equal to maximum sampling distance 3201 can then be chosen. Next, focal points 3601 can be selected. Regional peak position 3602 at each focal point 3601 can be determined using interferometer 113. Then using numerical methods, regional peaks 3105 can be determined for remaining regions 3603. For region 3001, images can be captured at each focal plane 3204 from regional peak position 3602 to maximum depth 3106. Captured images can be focus-stacked to create a focus-stacked image. This process can be completed for each region 3001. Then, focus-stacked images of each region 3001 of same light setting 2704 can be stitched into one or more focus-stacked scans 3206.

FIG. 38-42 illustrates multi-dimensional scanning. In a multi-dimensional scan embodiment, images of selected region 3001 can be captured by camera 106 at different focal planes 3204. Images captured on common focal planes 3204 can then be stitched together, which can produce a series of dimensional images at a series of focal planes 3204.

Figure 38:
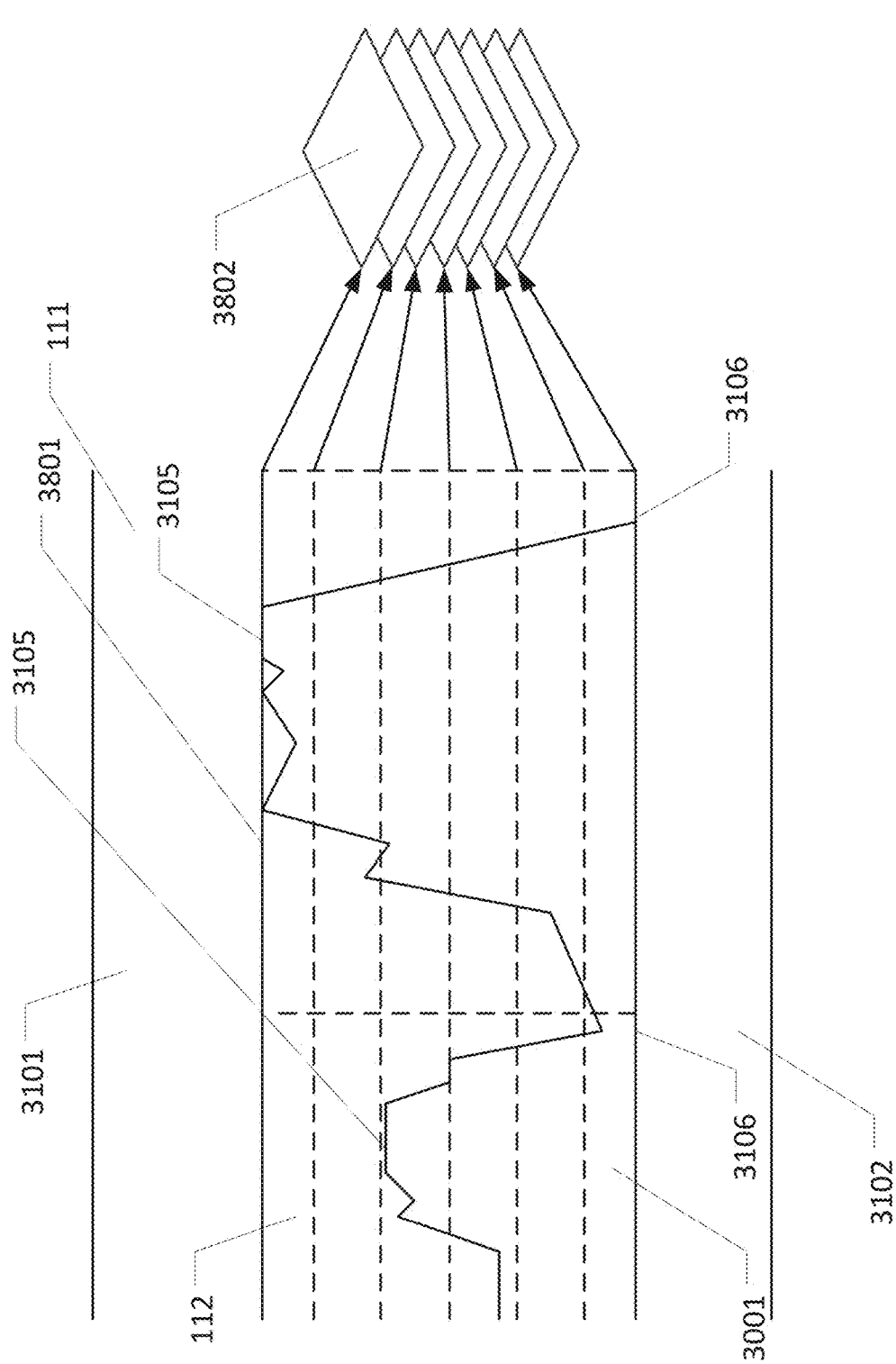
FIG. 38 illustrates focus planes within a specimen.

FIG. 38 illustrates focus planes 3204 within specimen 112. In this embodiment, each region 3001 of entire specimen 112 can be captured from a minimum depth 3801 to maximum depth 3106. Minimum depth 3801 can be the bottom of top glass slide 3101, in one embodiment. In another embodiment, scanner application 204 can determine minimum depth 3801 of specimen 112 using interferometer 113 by finding the absolute peak of specimen 112. The absolute peak is the portion of specimen 112 closest to camera. Scanner application 204 can then calculate maximum sampling distance 3201 and a sampling distance 3202 based from light settings 2704 used in illuminating selected region 3001. This can ensure images in between minimum depth 3801 and maximum depth 3106 of each region 3001 can be captured without informational loss from specimen. Specimen 112 can be sampled at each focal plane 3204 using camera 106., Each focal plane 3204 can be separated from each adjacent focal plane 3204 by sampling distance 3202. To sample, camera 106 can capture images at each focal plane 3204 of the selected region 3001. In one embodiment, camera 106 can focus and capture one or more images on focal plane 3204 at or near minimum depth 3801. Then camera 106 can shift focus and capture images of the next lower focal plane 3204 of selected region 3001. The process of shifting focus and capturing images on focal plane 3204 at every sampling distance 3202 interval can be done repeatedly until reaching focal plane 3204 at or substantially near maximum depth 3106 of selected region 3001. This process can be repeated for each region 3001 of entire specimen 112. In this embodiment, images captured at each region 3001 that has same light setting 2704 and same focal plane 3204 can be stitched together into one or multi-dimensional scans 3802.

Figure 39:
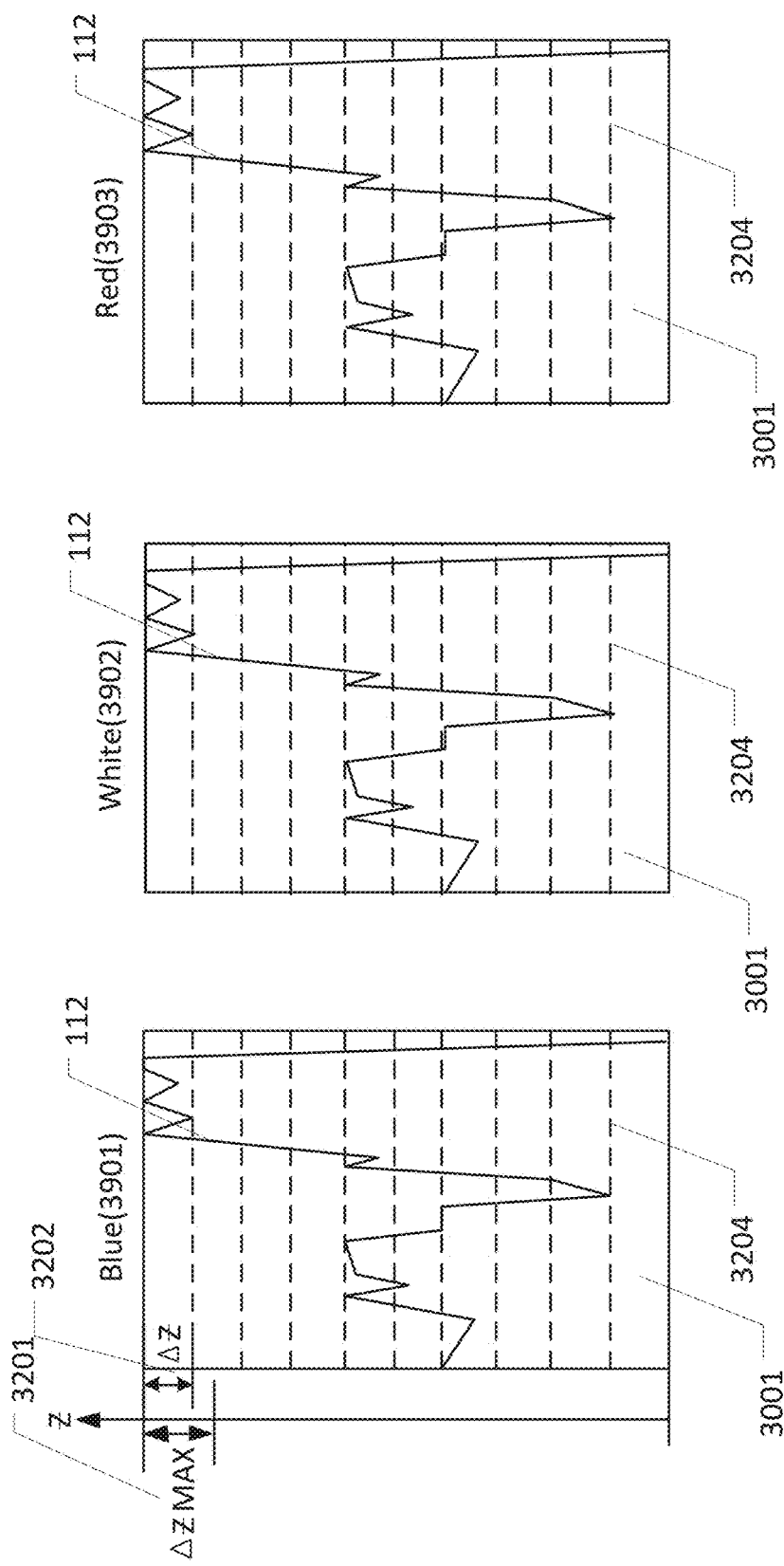
FIG. 39 illustrates an exemplary region illuminated at various light settings, sampled with a sampling distance (Δz) using light setting with shortest wavelength.

FIG. 39 illustrates an exemplary region illuminated at various light settings 2704, sampled with sampling distance 3202 using light setting 2704 with shortest wavelength. A user can choose to illuminate specimen 112 using multiple light settings 2704. In an example shown in FIG. 39, specimen 112 in region 3001 can be illuminated using multiple light settings: a blue light 3901, a white light 3902, and a red light 3903. Scanner application 204 can calculate maximum sampling distance 3201 based from each frequency produced by each light setting 2704, or only from the known highest frequency light. Based from the calculations made, scanner application 204 can determine which light source produces the shortest maximum sampling distance ($\Delta z$) 3201. In this example, blue light 3901 can have the highest frequency followed by the white light 3902, and red light 3903 can have the lowest frequency. As such, blue light 3901 can have the shortest wavelength between the other two light settings. Scanner application 204 can then choose sampling distance ($\Delta z$) 3202 based on maximum sampling distance 3201 of blue light 3901 to determine focal planes 3204 of the selected region 3001. Therefore, when selected region 3001 is sampled in red light 3903 and white light 3902, each focal plane 3204 on the selected region 3001 can still use sampling distance 3202 of blue light 3901, as shown in FIG. 39. A benefit to this embodiment is that there will be no focal variations when a user viewing a specific region in specimen 112 switches from viewing a scan in one light setting 2704 to a second light setting 2704. Additionally, less mechanical movement can be required from stage 108 during scanning since images of specimen 112 are taken at similar z-positions. However, using this embodiment can cause over-sampling of a lower frequency light setting, which while has no effect on image quality, can cause a scan to take more time.

Figure 40:
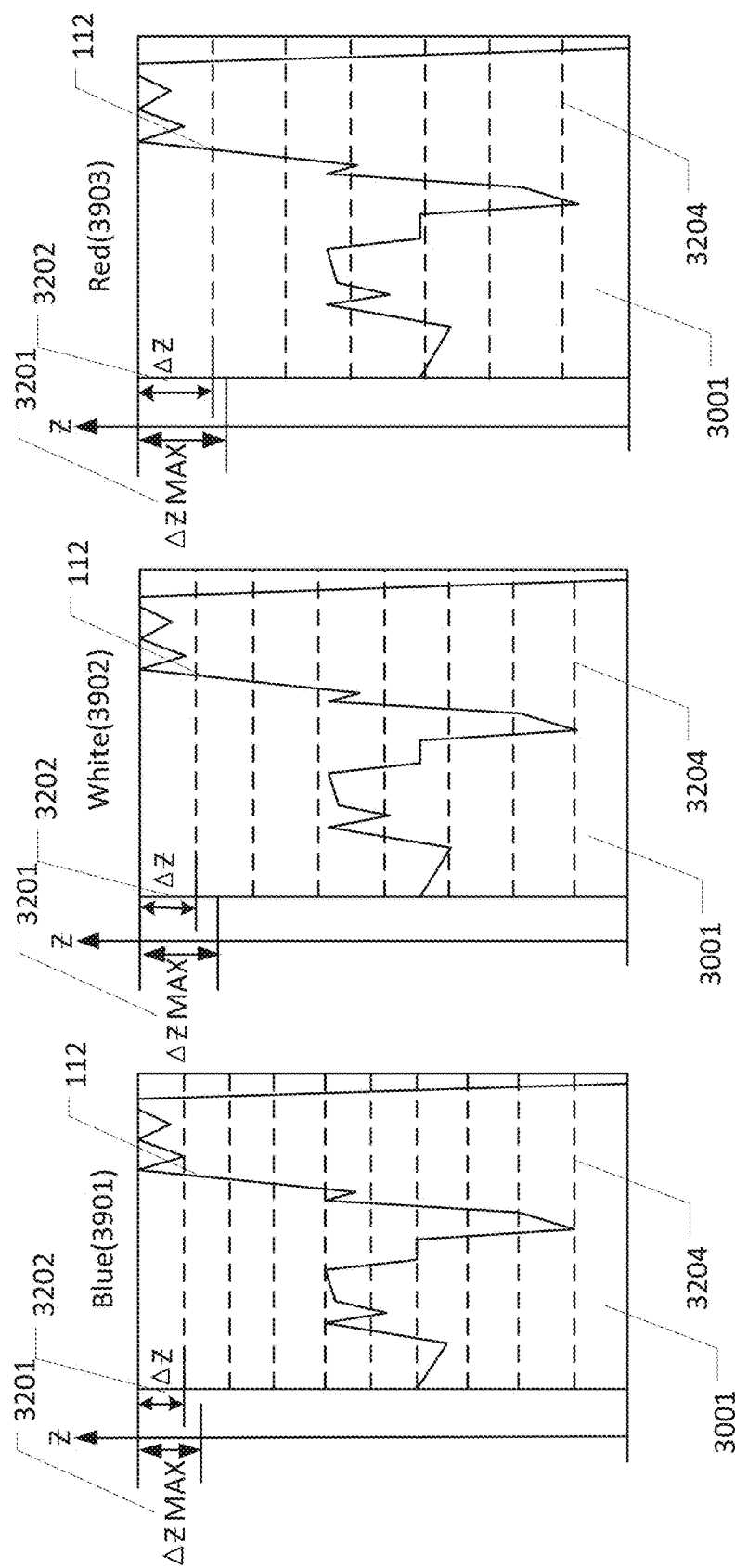
FIG. 40 illustrates an exemplary region illuminated at various light setting, sampled with various sampling distance (Δz) relative to each light setting.

FIG. 40 illustrates an exemplary region illuminated at various light settings 2704, sampled with various sampling distances 3202 relative to each light setting 2704. In this embodiment, scanner application 204 can calculate maximum sampling distance 3201 based on each light setting 2704 selected. Based from the calculations made, scanner application 204 can determine focal planes 3204 to use for each light setting 2704 selected. As an example shown in FIG. 40, blue light 3901 that has the highest frequency can have the shortest wavelength. Thus, when illuminating region 3001 using blue light 3901, sampling distance 3202 between each focal plane 3204 can be shorter. Furthermore, white light 3902 having a lower frequency can have longer wavelength than blue light 3901. Therefore, when illuminating region 3001 using white light 3902, sampling distance 3202 between each focal plane 3204 can be longer. Lastly, red light 3903 that has the lowest frequency can have the longest wavelength. As such, when red light 3903 is used in illuminating region 3001, sampling distance 3202 between each focal plane 3204 can be longest compared to other two light settings 2704. One of the advantages in using this embodiment is that it minimizes or eliminates oversampling. However, in this embodiment, there can be small variations in focus when a user viewing a specific region in specimen 112 switches from one light setting 2704 to another.

Figure 41:
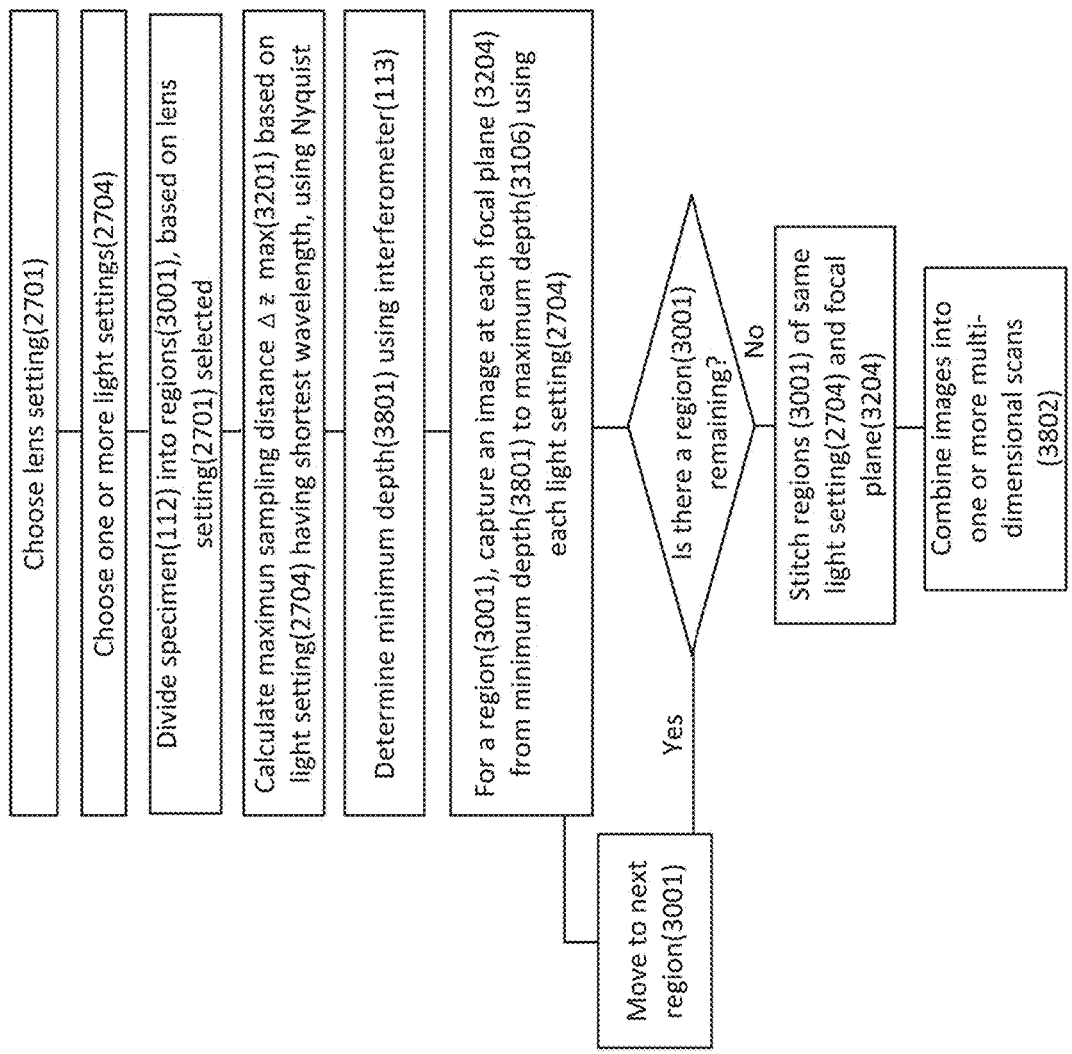
FIG. 41 illustrates an exemplary method for scanning a specimen using a multi-dimensional scanning.

FIG. 41 illustrates an exemplary method for scanning specimen 112 using multi-dimensional scanning. In a preferred method, a lens setting 2701 can be selected. Next, reflective and/or transmitted light to use on specimen 112 can be chosen. Then, specimen 112 can be divided into regions 3001 based on the lens setting 2701 selected. Based on characteristics of the light, maximum sampling distance ($\Delta z max$) 3201 can be calculated. In one embodiment, sampling distance 3202 less than or equal to maximum sampling distance 3201 can then be chosen. For region 3001, images can be captured at each focal plane 3204 from minimum depth 3801 to maximum depth 3106 using each light setting 2704 selected. This process can be repeated for each region 3001 of entire specimen 112. Then, images from regions 3001 of the same light setting 2704 and focal plane 3204 can be stitched together into one or more multi-dimensional scans 3802.

Figure 42:
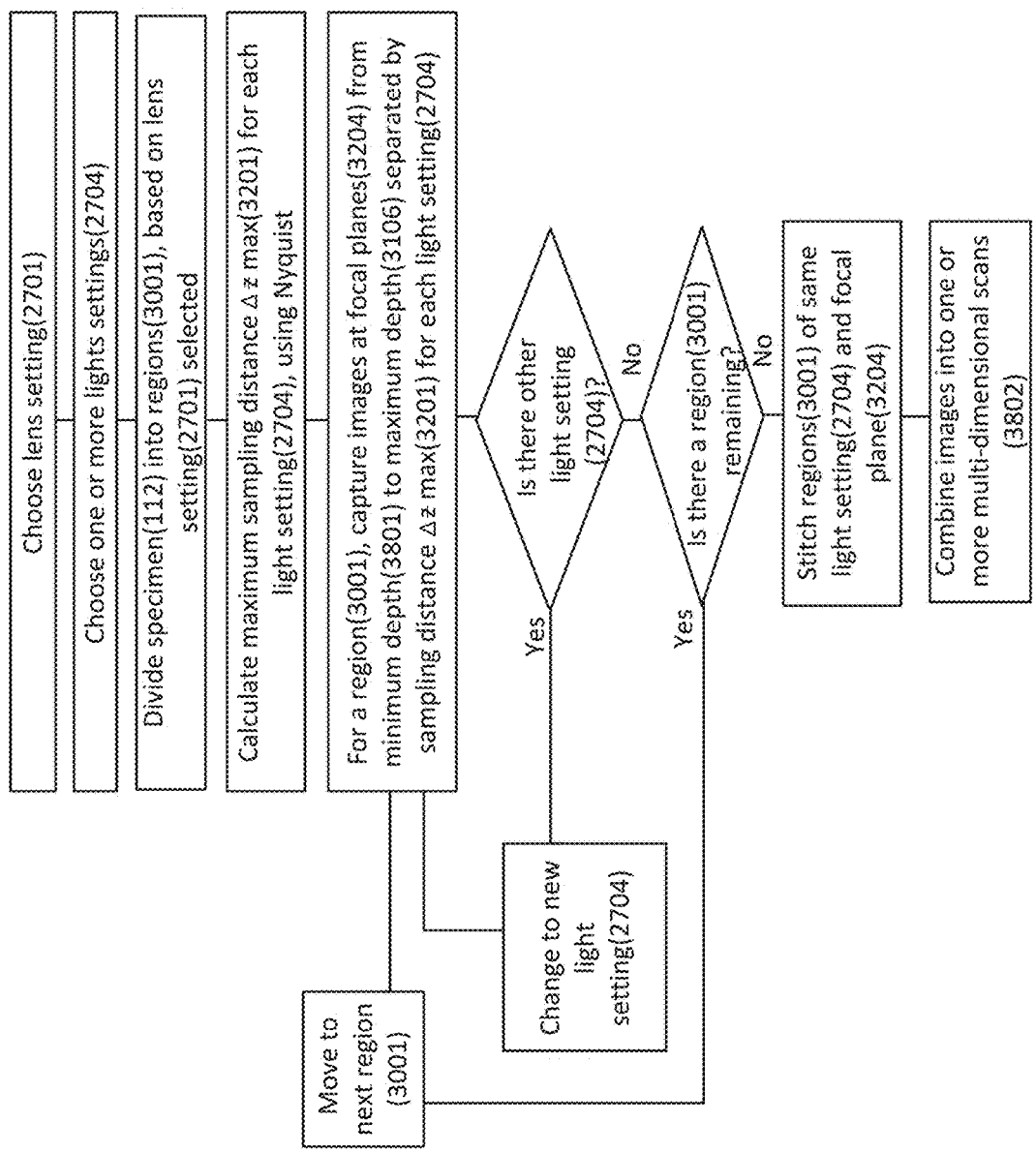
FIG. 42 illustrates another exemplary method for scanning a specimen at each focal plane using multi-dimensional scanning.

FIG. 42 illustrates another exemplary method for scanning specimen 112 at each focal plane 3204 using multi-dimensional scanning. In a preferred method, lens setting 2701 can be selected. Next, light settings 2704 to use on specimen 112 can be chosen. Then, specimen 112 can be divided into regions 3001 based on lens setting 2701 selected. Based on characteristics of the light, maximum sampling distance 3201 can be calculated. In one embodiment, sampling distance 3202 less than or equal to maximum sampling distance 3201 can then be chosen. Then, minimum depth 3801 can be determined. Next, focal planes 3204 can be selected. For region 3001, images can be captured at each focal point 3601 from minimum depth 3801 to maximum depth 3106 separated by sampling distance 3202. This process can be repeated for each light setting 2704. The above-mentioned steps can be repeated for each region 3001 remaining. Then, regions 3001 of the same light setting 2704 and focal plane 3204 can be stitched together into multi-dimensional scans 3802.

Figure 43:
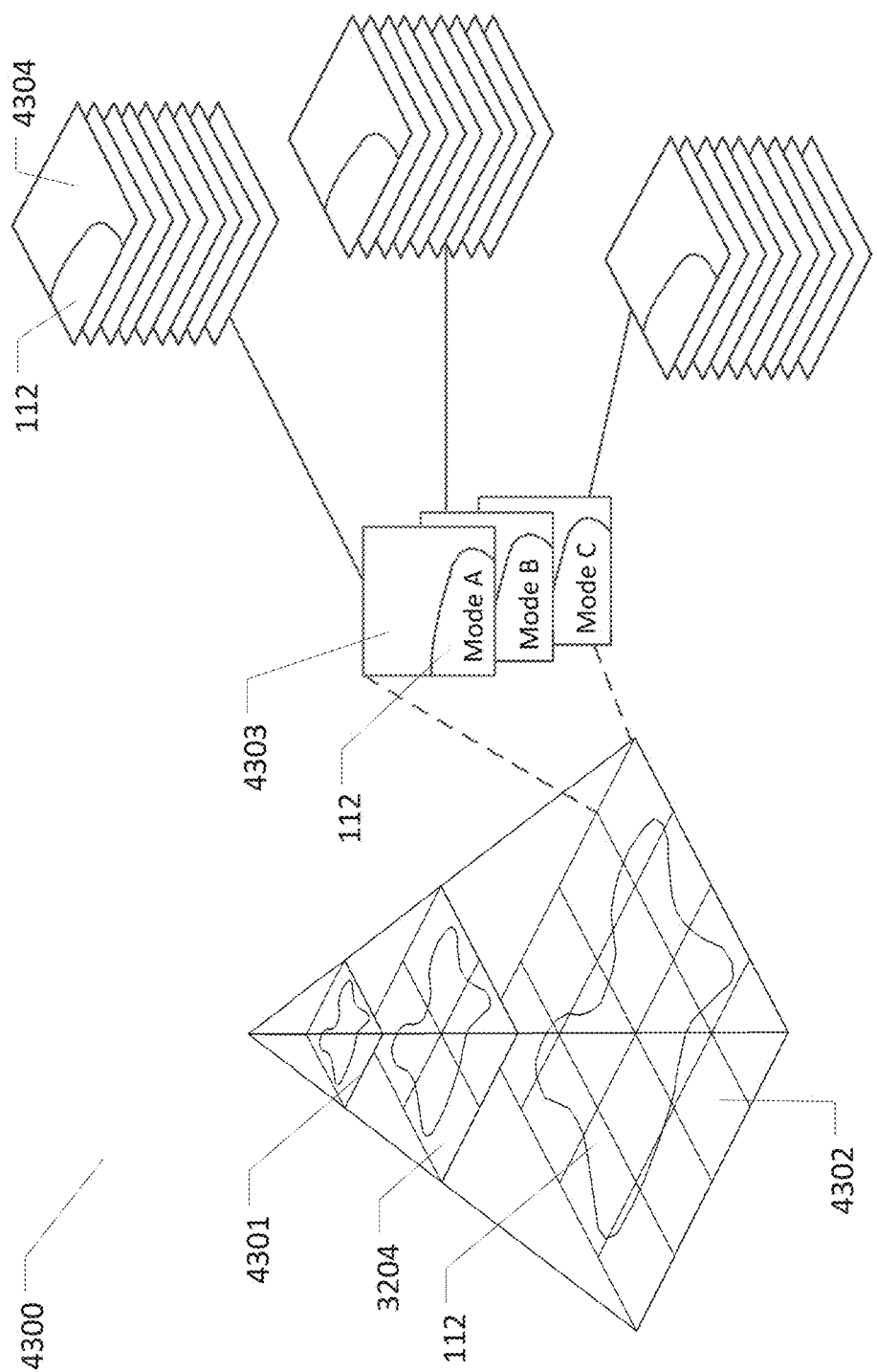
FIG. 43 illustrates a pyramidal data structure.

FIG. 43 illustrates a pyramidal data structure 4300. In one embodiment, pyramidal data structure 4300 can be a multi-modal and/or multidimensional pyramidal data structure 4300. In general, tiling divides an image into a plurality of sub-images. Such division allows easier buffering of the image data in memory, and quicker random access of the image data. Pyramidal tiling involves creating a set of low-pass, band-pass or otherwise lower resolution copies of an image. Then each of those copies is divided into one or more tiles 4302. One example of a data structure that uses Pyramidal tiling is the JPEG Tiled Image Pyramid (JTIP). A JTIP image stores a plurality of successive layers 4301 of the same image at different resolutions. Each layer 4301 is tiled, and as the resolution of a layer improves relative to a previous layer, the number of tiles increases. As described in this disclosure, a plurality of focus-stacked scans 3206 and/or multi-dimensional scans 3802 can be stored in pyramidal data structure using a novel pyramidal-tiling technique. Tile 4302 can comprise one or more modes 4303. In one embodiment, modes can relate to light settings 2704. Each mode 4303 can comprise one or more sub-images 4304. In one embodiment, sub-images 4304 can be sequential sub-images of multi-dimensional scans 3802.

Figure 44:
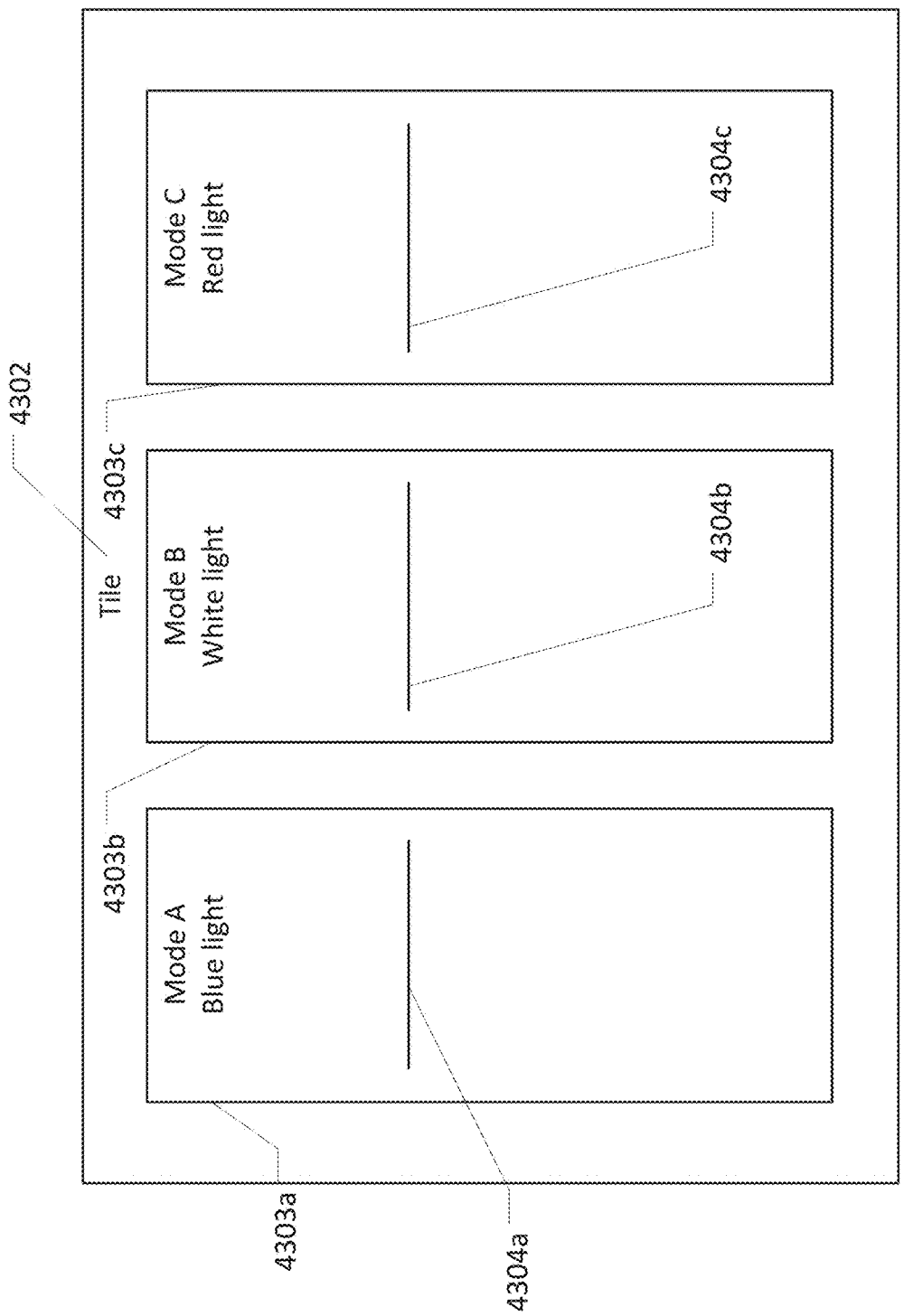
FIG. 44 illustrates one embodiment of a multi-modal pyramidal data structure.

FIG. 44 illustrates one embodiment of multi-modal pyramidal data structure 4300. In a first exemplary embodiment, pyramidal data structure 4300 can be multi-modal, and comprise a plurality of focus-stacked scans 3206. In such embodiment, tiles 4302 can comprise a plurality of modes 4303. Modes 4303 within each tile 4302 can comprise sub-image 4304. As an example, sub-image 4304a within mode 4303a can be a portion of focus-stacked scan 3206 of specimen 112 in blue light, sub-image 4304b within mode 4303b can be a portion of focus-stacked scan 3206 of specimen 112 in white light, and sub-image 4304c within mode 4303c can be a portion of focus-stacked scan 3206 of specimen 112 in red light. Furthermore, sub-image 4304a, sub-image 4304b, and sub-image 4304c can be images of the same sub-portion of specimen 112.

Figure 45:
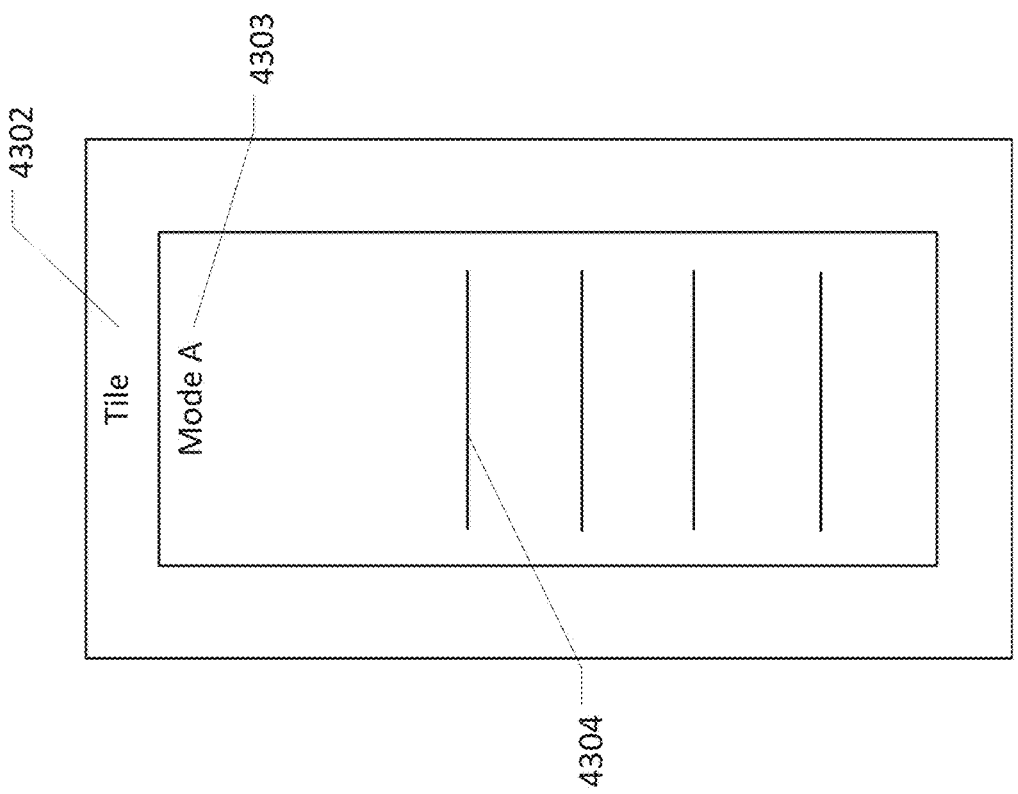
FIG. 45 illustrates one embodiment of a multi-dimensional pyramidal data structure.

FIG. 45 illustrates one embodiment of multi-dimensional pyramidal data structure 4300. In a second exemplary embodiment, pyramidal data structure 4300 can be multi-dimensional, and comprise multi-dimensional scan 3802. In such embodiment, tile 4302 can comprise one mode 4303. Mode 4303 can comprise a sequence of sub-images 4304 of a multi-dimensional scan. Each sub-image can be of the same sub-portions of specimen 112, but focused on a different focal plane 3204.

Figure 46:
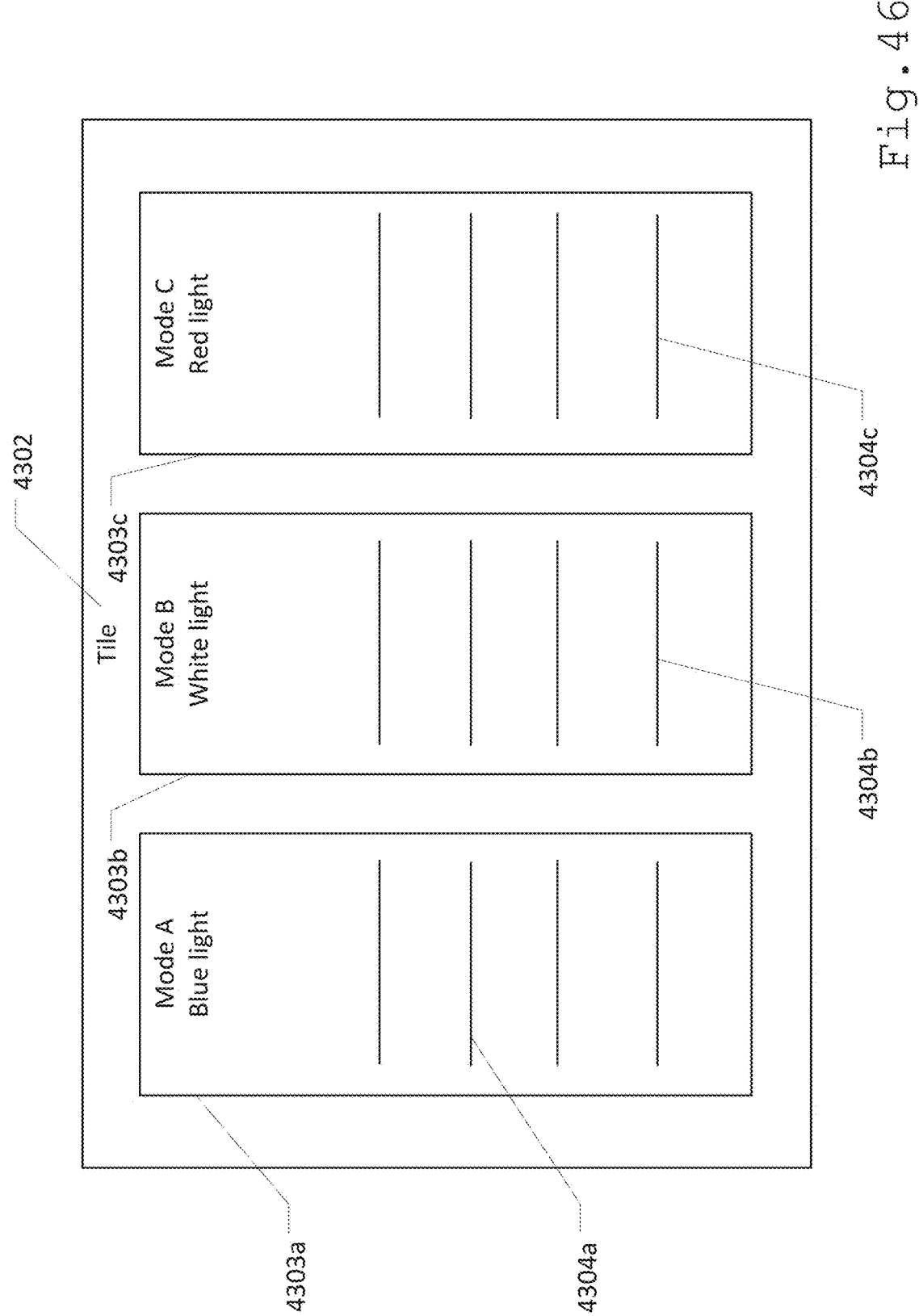
FIG. 46 illustrates one embodiment of multi-modal multi-dimensional pyramidal data structure.

FIG. 46 illustrates one embodiment of multi-modal multi-dimensional pyramidal data structure 4300. In a third exemplary embodiment, pyramidal data structure 4300 can be multi-modal and multi-dimensional, comprising a plurality of multi-dimensional scans 3802. In such embodiment, tile 4302 can comprise multiple modes 4303, each comprising a sequence of sub-images 4304 from a multidimensional scan. In one embodiment, each mode 4303 can have the same number of sub-images 4304. For example, mode 4303a may have been sampled in blue light, mode 4303b in white light, and mode 4303c in red light. In such embodiment, scanner application 204 may have scanned all three modes 4303 using sampling distance 3202 related to blue light. In another embodiment, modes 4303 within tile 4302 can have varying numbers of sub-images 4304. This may occur when scanner application 204 scanned different modes 4303 using different sampling distances 3202 related to the light settings 2704 in the particular mode 4303.

Figure 47:
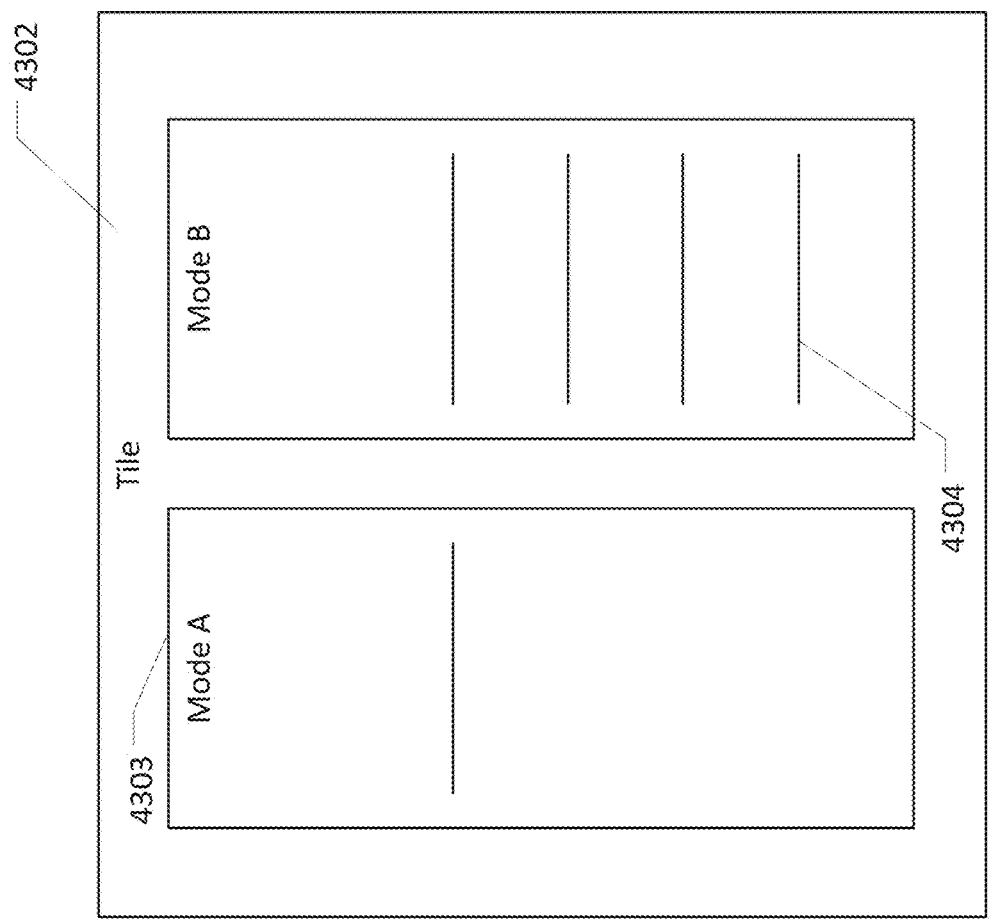
FIG. 47 illustrates another embodiment of multi-modal multi-dimensional pyramidal data structure.

FIG. 47 illustrates another embodiment of multi-modal multi-dimensional pyramidal data structure 4300. In a fourth exemplary embodiment, pyramidal data structure 4300 can be multi-modal and multi-dimensional, comprising focus-stacked scan 3206 within first mode 4303a, and multi-dimensional scans 3802 within second mode 4303b. In such embodiment, tile 4302 can comprise sub-image 4304 from focus-stacked scan 3206 and a sequence of sub-images 4304 from multi-dimensional scans 3802.

Figure 48:
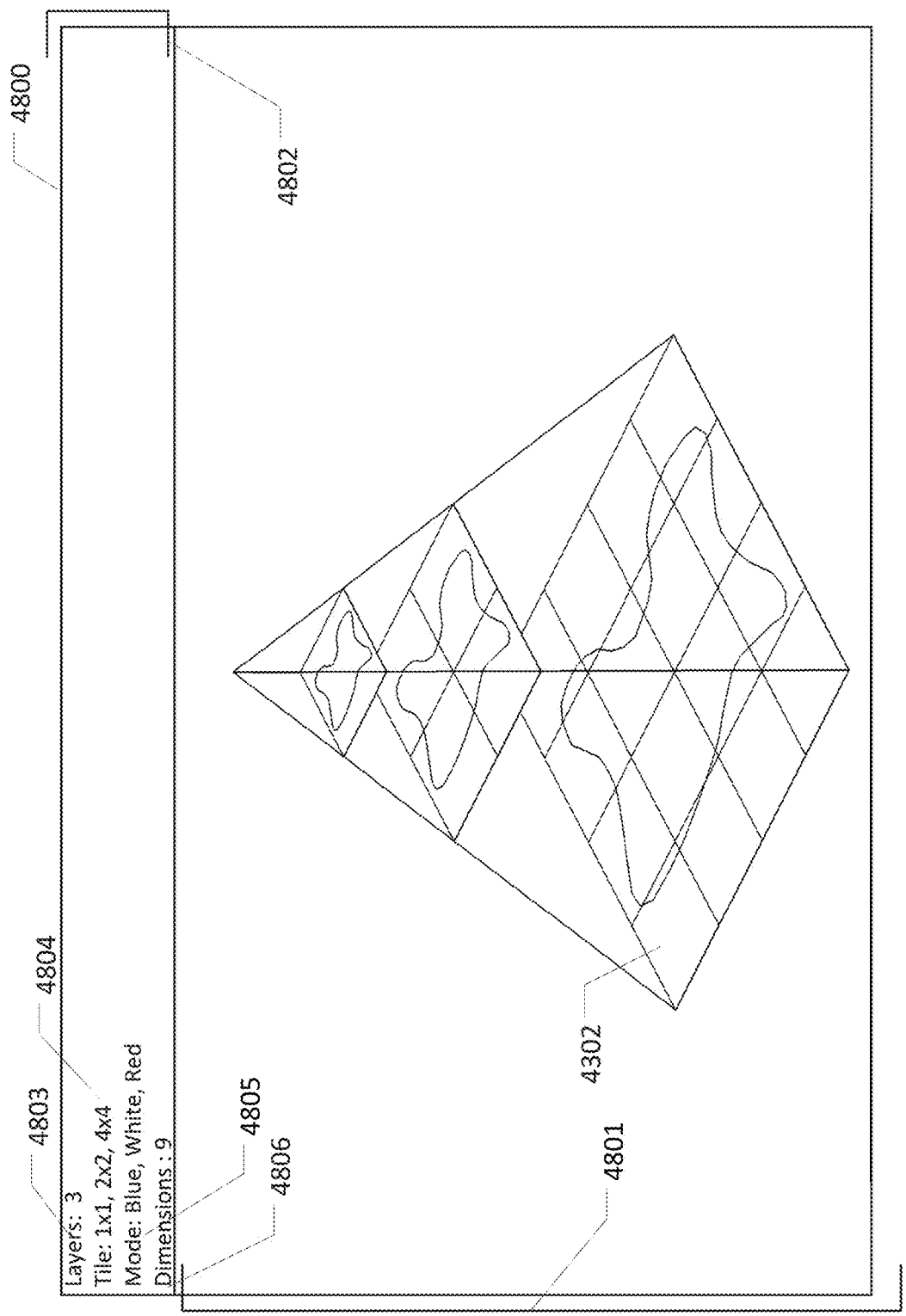
FIG. 48 illustrates a pyramidal file structure capable of enclosing a pyramidal data structure having one or more modes, and a plurality of dimensions.

FIG. 48 illustrates a pyramidal file structure 4800 capable of enclosing pyramidal data structure 4300 having one or more modes 4303, and/or a plurality of dimensions (sub-images 4304 within one or more modes 4303). Pyramidal file structure 4800 can comprise a body 4801 and a header 4802. Body 4801 can comprise pyramidal data structure 4300. Header 4802 can define pyramidal data structure 4300 with a layer plan 4803, a tile plan 4804, a mode plan 4805, and/or a dimension plan 4806. Layer plan 4803 can instruct the number of layers within pyramidal data structure 4300. In one embodiment, the number indicated on layer plan 4803 can be predetermined. In another embodiment, a user can set the number of layers when creating pyramidal file structure 4800. In one embodiment, one or more modes 4303 can be single-layer focus-stacked scan 3206. In another embodiment, each mode 4303 can be scanned differently. As such, one mode 4303 can be single-layer focus-stacked scan 3206 while other modes 4303 within tile 4302 can be multi-dimensional scans 3802. In one embodiment, dimension plan 4806 can have uniform dimensions resulting in the same number of sub-images 4304 for each mode 4303, as shown in header 4802 of FIG. 48. In another embodiment, dimension plan 4806 can have different dimensions for each scan, resulting in each mode 4303 having a different number of sub-images 4304. In one embodiment, header 4802 can comprise spacing information, such as sampling distance ($\Delta z$) 3202 between focal planes 3204 within mode 4303. In another embodiment, XYZ data can be stored in sub-image 4304, along with other settings such as lens setting 2701, light settings 2704, and/or camera settings. Pyramidal file structure 4800 can be compressed. In one embodiment, pyramidal file structure 4800 can be compressed using wavelet compression.

FIG. 49 illustrates a viewer application allowing user to view scans of specimen 112 within pyramidal data structure 4300. In one embodiment, computer application 609 can be a viewer application. In another embodiment, server application 604 and/or scanner application 204 can be a viewer application that computer application 609 accesses. Remote access can be in computer data store 610. In one embodiment, viewer application can comprise a magnifier 4901, a panning cursor 4902, a focus controller 4903, and a mode selection 4904. Viewer application can read header 4802 to determine what options are available to user to control the viewing of pyramidal data structure 4300. Magnifier 4901 can allow user to zoom in and zoom out the image of specimen 112 on display 302. Panning cursor 4902 can allow user to move scan of specimen 112. Focus controller 4903 can allow user to view sub-images 4304 at specific focal planes 3204 of specimen 112 if pyramidal data structure 4300 is multi-dimensional. Mode selection 4904 can allow user to select mode 4303 to view specimen 112 in if pyramidal data structure 4300 is multi-modal.

FIG. 50A-D are a sequence of figures that illustrates magnification of specimen 112 viewing pyramidal data structure 4300. The user can control the magnification of specimen 112 using magnifier 4901.

Figure 50A:
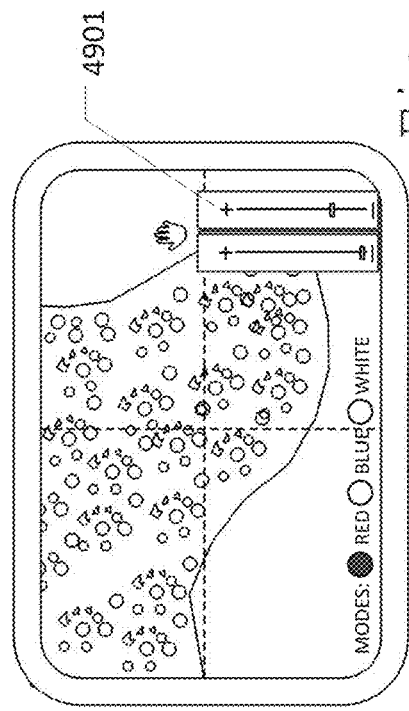
FIG. 50A illustrates an entire specimen being viewed.

FIG. 50A illustrates entire specimen 112 being viewed. Using the pyramidal data structure 4300 shown in FIG. 43, top-most layer 4301 having the lowest level of resolution relative to the layers, can be displayed. At this level, image data of entire specimen 112 can be retrieved from a single tile 4302 in one embodiment.

Figure 50B:
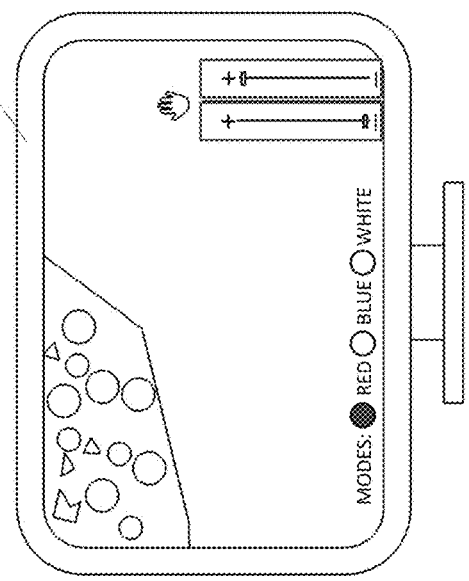
FIG. 50B illustrates a specimen being magnified by adjusting a magnifier.

FIG. 50B illustrates specimen 112 being magnified by adjusting magnifier 4901. As specimen 112 is magnified, smaller tile 4302 with higher image resolution can be retrieved. To keep continuity with focus, sub-image 4304 can be chosen such that focal plane 3204 remains constant between old and new sub-images 4304.

Figure 50C:
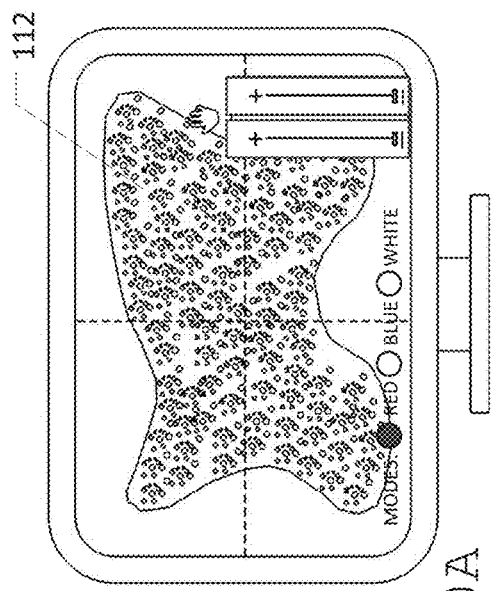
FIG. 50C illustrates a specimen being magnified by further adjusting a magnifier.

FIG. 50C illustrates specimen 112 being magnified by further adjusting magnifier 4901. One advantage scanner 100 has over traditional microscopes is that magnification within viewer application can be continuous, while under a traditional microscope, magnification is discrete and governed by available lenses.

Figure 50D:
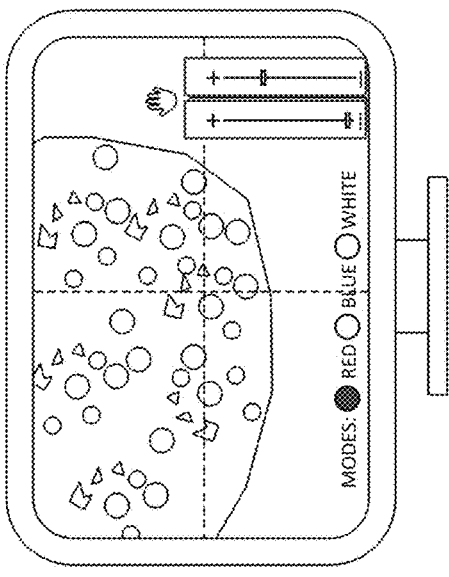
FIG. 50D illustrates a specimen being completely magnified by further adjusting a magnifier to its maximum position.

FIG. 50D illustrates specimen 112 being completely magnified by further adjusting magnifier 4901 to its maximum position. In one embodiment, when user zooms in all the way, sub-image 4304 on display 302 is a portion of stitched image at its highest resolution. Such sub-image 4304 can come from tile 4302 at the bottom layer 4301 of pyramidal data structure 4300.

Figure 51:
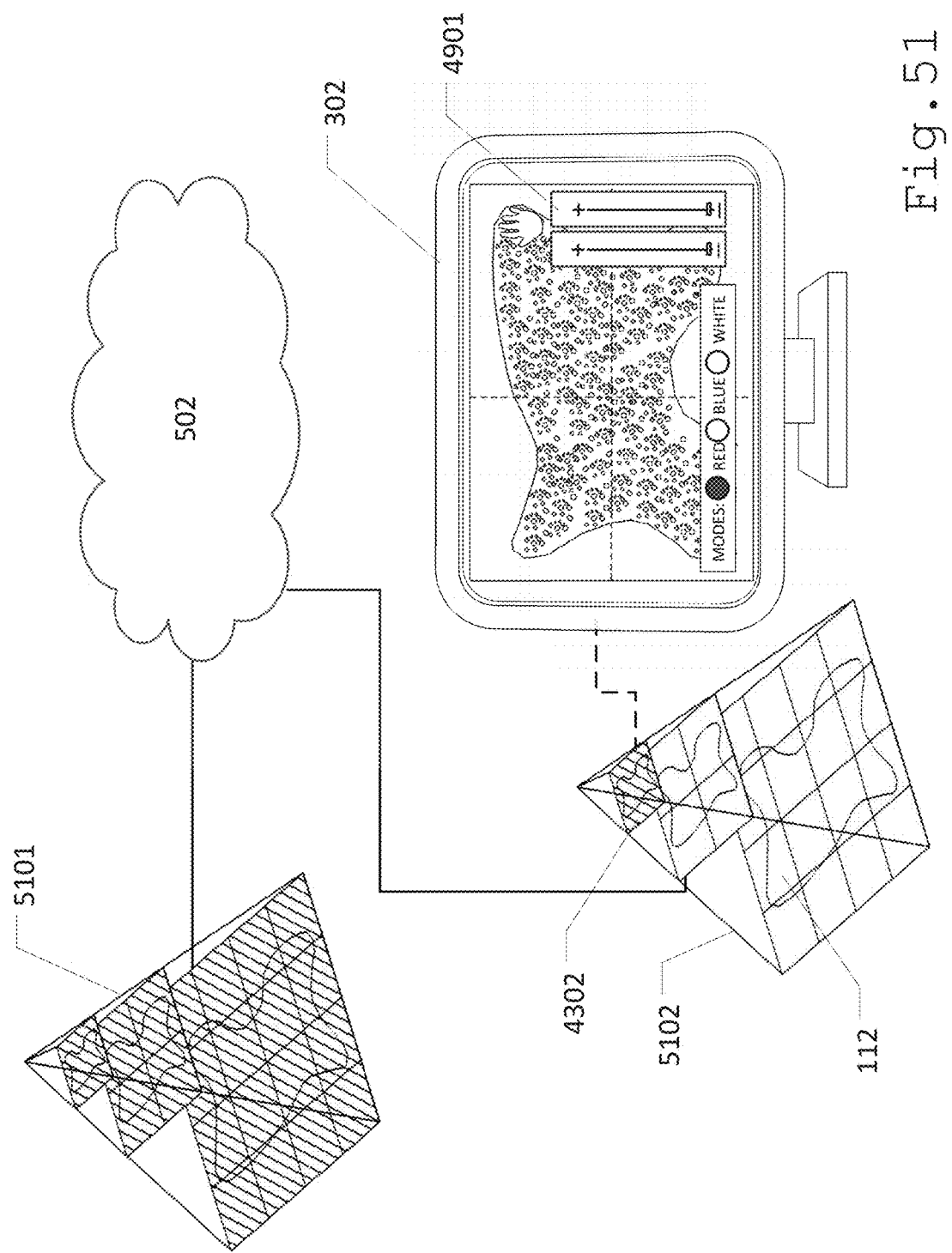
FIG. 51 illustrates how image data can be transferred from a local access to a remote access.

FIG. 51 illustrates how image data can be transferred from a local access 5101 to a remote access 5102. Specimen 112 can be transferred from local access 5101 to remote access 5102 through network 502 to be viewed on display 302 using a viewer application. In one embodiment, local access 5101 can be in server data store 605. In another embodiment, local access 5101 can be in scanner data store 205 Each tile 4302 of pyramidal data structure 4300 can be stored within local access 5101. Tiles 4302 within local access 5101 can be accessed, viewed, and stored within remote access 5102.

As an example scenario, a user at remote access 5102 can initially choose to view entire specimen 112 on display 302. In such scenario, remote access 5102 can communicate with local access 5101 to view image data of entire specimen 112. Server 501 can then choose the appropriate layer 4301 and tile 4302 to transfer based on the user's selected area and/or level of magnification. Since the user chooses to view entire specimen 112, the top-most layer 4301 having single tile 4302 in this embodiment can be transferred and stored within remote access 5102, as shown in FIG. 51.

Figure 52:
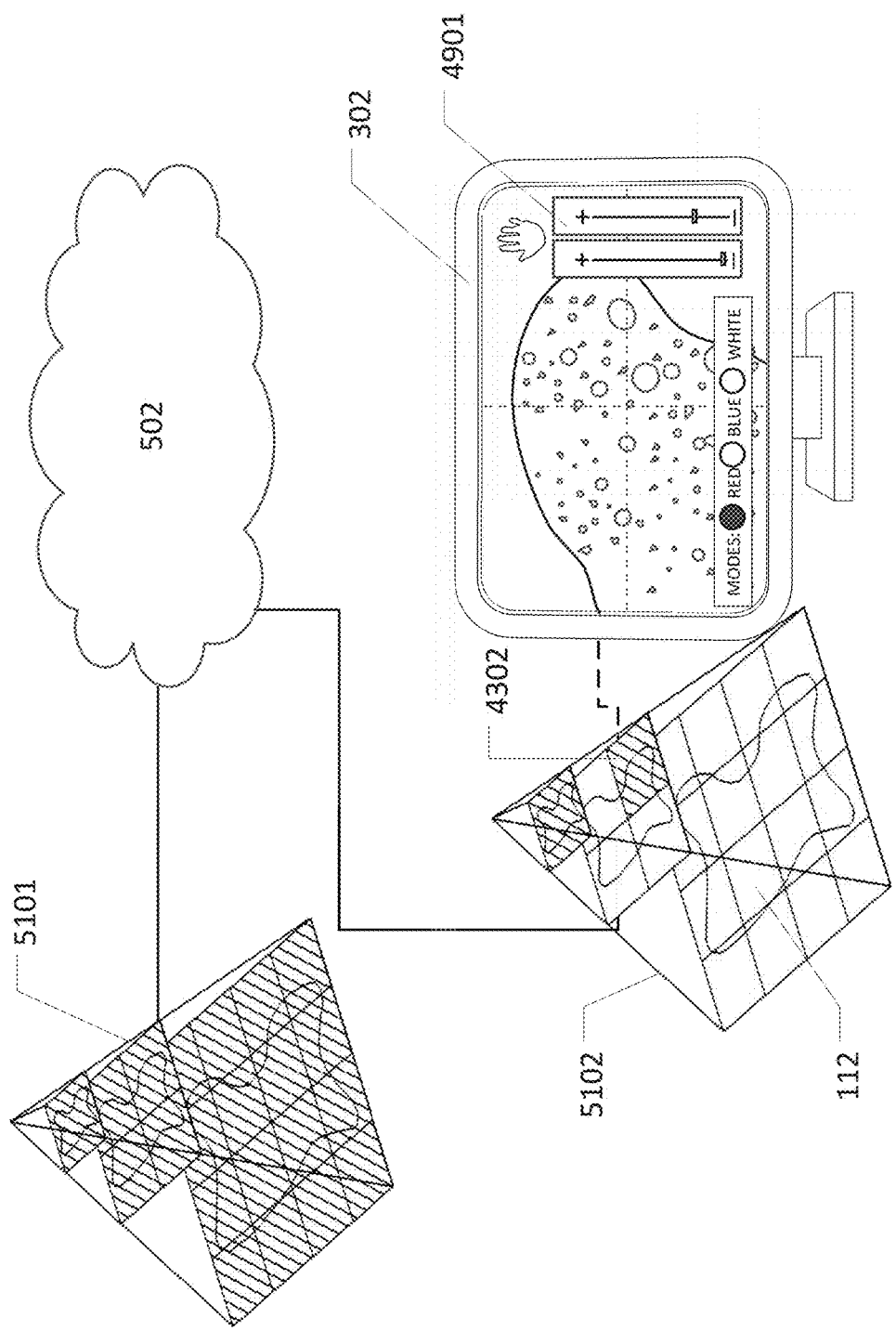
FIG. 52 illustrates magnifying a selected area of specimen on a remote access.

FIG. 52 illustrates magnifying a selected area of specimen 112 on remote access 5102. The user at remote access 5102 can choose to zoom in and/or zoom out of the screen in order to select a specific area of interest on specimen 112. As a user controls the magnification of the screen, server 501 can select the appropriate layer 4301 and tiles 4302 that corresponds to the selected view of the user. In this case, as the user selects to magnify the specific area of interest, a portion of the next layer 4301 from local access 5101 can be retrieved by remote access 5102. To do so, one or more tiles 4302 corresponding to the specific area selected by the user can be transferred to remote access 5102.

Figure 53:
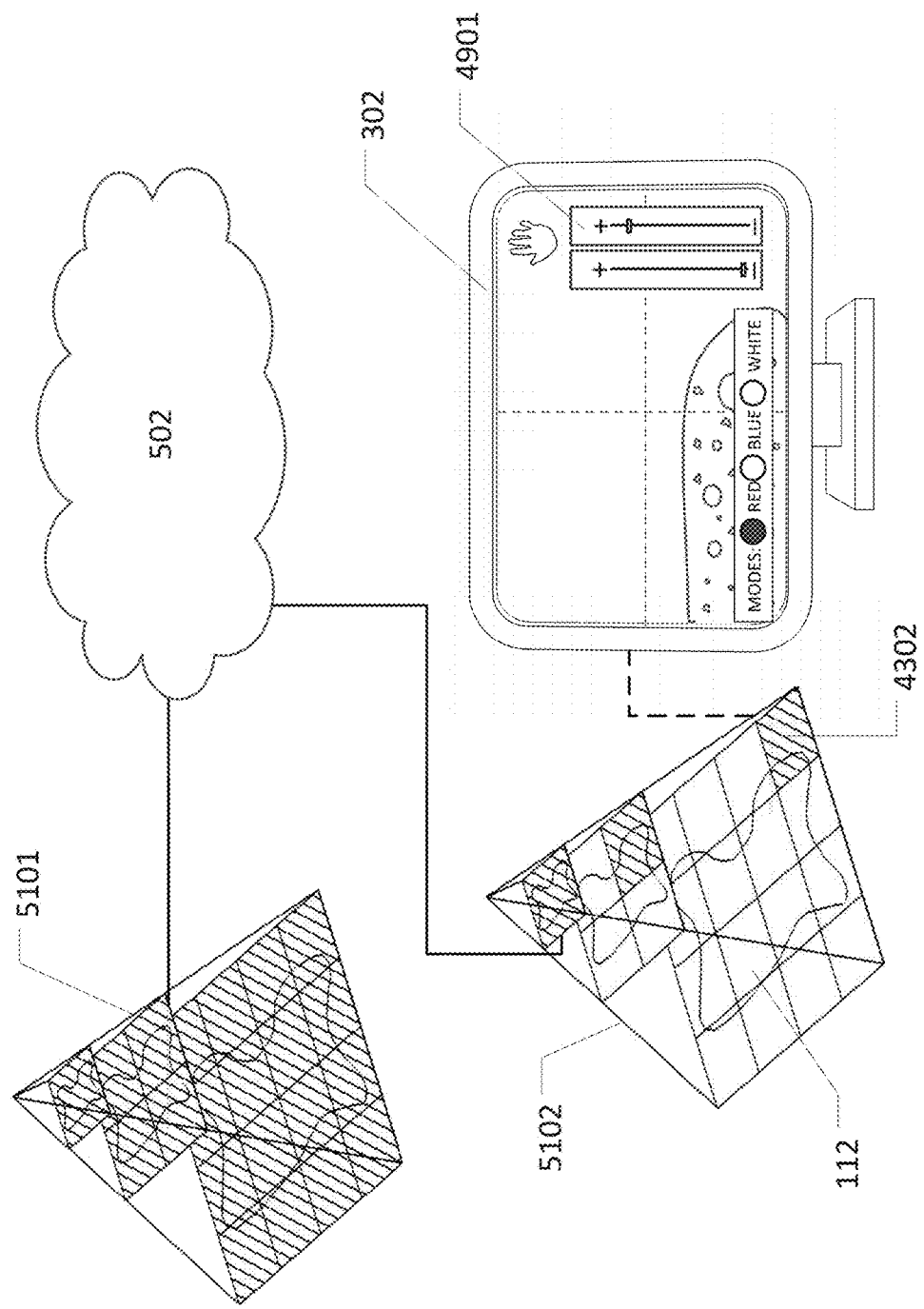
FIG. 53 illustrates fully magnifying a selected area from a remote access.

FIG. 53 illustrates fully magnifying a selected area from remote access 5102. The user can choose to fully zoom in into a specific area that is within the previously displayed image of specimen 112. Based from the selected area of the user, server 501 can choose the appropriate layer 4301 and tile 4302 from local access 5101. Server 501 can select tiles 4302 from the last layer 4301 to transfer to remote access 5102.

FIG. 54 illustrates selecting a different area to view from remote access 5102. The user can choose to select other areas to view from remote access 5102. As server 501 transfers a specific tile 4302 and layer 4301 to remote access 5102, that specific tile 4302 from layer 4301 can also be stored within remote access 5102. In FIG. 54, the user chooses to view an area that is adjacent to the previously selected area. In this case, as user moves to adjacent area, tile 4302 that is adjacent to the previously tile 4302 can be transferred and stored to remote access 5102.

FIG. 55A-D illustrates adjusting focus controller 4903 and mode selection 4904 in multi-modal multi-dimensional pyramidal data structure 4300 on display 302. One purpose of pyramidal data structure 4300 is to, when viewed, imitate viewing specimen 112 under a microscope. To that end, many controls in viewer application are similar to controls on a microscope. Just as a user of a microscope can adjust the focus when viewing a specimen, so too can a user view different focal planes 3204 when pyramidal data structure 4300 comprises multi-dimensional scans 3802 of specimen 112. Further, just as a user of a microscope can change light settings 2704, so too can a user view specimen 112 under light conditions if such light conditions are captured in various modes 4303 of multi-modal pyramidal data structure 4300.

FIG. 55A illustrates viewer application viewing sub-image 4304 focused on focal plane 3204 near region peak 3105. Areas of specimen 112 near regional peak 3105 will show up as in-focus areas 5501, wherein areas below regional peak 3105 will be out-of-focus areas 5502. To adjust focus, user can use focus controller 4903 to cycle through sub-images 4304 of mode 4303, each captured at different, consecutive focal planes 3204.

FIG. 55B illustrates a viewer application viewing sub-image 4304 focused on focal plane 3204 between regional peak 3105 and maximum depth 3106. Areas of specimen 112 near such focal plane 3204 will show up as in-focus areas 5501, wherein areas above and below such focal plane 3204 will be out-of-focus areas 5502. To further adjust focus, user can use focus controller 4903 to further cycle through sub-images 4304.

FIG. 55C illustrates a viewer application viewing sub-image 4304 focused on focal plane 3204 near maximum depth 3106. Areas of specimen 112 near maximum depth 3106 will show up as in-focus areas 5501, wherein areas above maximum depth 3106 will be out-of-focus areas 5502.

FIG. 55D illustrates a viewer application switching modes 4303 using mode selection 4904 when viewing multi-modal multi-dimensional pyramidal file structure 4800 on display 302. In microscopy, sometimes viewing specimen 112 in particular light settings 2704, such viewing yields information that may not be visible in other light settings 2704. When switching modes 4303, sub-image 4304 from the new mode 4303 replaces sub-image 4304 from the old mode 4303. In a preferred embodiment, both sub-images 4304 are from a common tile 4202 and on a common focal plane 3204. In doing so, the effect for user is that specimen 112 on display 302 stays the same, but it appears to be affected only by differences in mode 4303, such as going from white light to blue light, as shown in FIG. 55D.

A number of software components can be stored in scanner memory 202, server memory 602, and computer memory 607 and can be executable by scanner processor 201, server processor 601, and computer processor 606. In this respect, the term "executable" means a program file that is in a form that can ultimately be run by scanner processor 201, server processor 601, and computer processor 606. Examples of executable programs can be, for example, a compiled program that can be translated into machine code in a format that can be loaded into a random access portion of scanner memory 202, server memory 602, and computer memory 607, and run by scanner processor 201, server processor 601, and computer processor 606, source code that can be expressed in proper format such as object code that is capable of being loaded into a random access portion of scanner memory 202, server memory 602, and computer memory 607 and executed by scanner processor 201, server processor 601, and computer processor 606, or source code that can be interpreted by another executable program to generate instructions in a random access portion of scanner memory 202 to be executed by scanner processor 201, server processor 601, and computer processor 606, etc. An executable program can be stored in any portion or component of scanner memory 202, server memory 602, and computer memory 607 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Scanner memory 202, server memory 602, and computer memory 607 is defined herein as including both volatile and nonvolatile memory and data storage components. Volatile components are those that do not retain data values upon loss of power. Nonvolatile components are those that retain data upon a loss of power. Thus, scanner memory 202, server memory 602, and computer memory 607 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, server processor 601, and computer processor 606 can represent multiple, server processor 601, and computer processor 606 and scanner memory 202, server memory 602, and computer memory 607 can represent multiple scanner memory 202, multiple server memory 602, and multiple computer memory 607 that operate in parallel processing circuits, respectively. In such a case, first local interface 203, a second local interface 603, and a third local interface 608 can be an appropriate network, including network 502 that facilitates communication between any two of the multiple scanner processor 201, server processor 601, and computer processor 606, between any scanner processor 201, server processor 601, and computer processor 606, and any of the scanner memory 202, server memory 602, and computer memory 607, or between any two of the scanner memory 202, any two of the server memory 602, and any two of the computer memory 607, etc. First local interface 203, second local interface 603, and third local interface 608 can comprise additional systems designed to coordinate this communication, including, for example, performing load balancing. Scanner processor 201, server processor 601, and computer processor 606 can be of electrical or of some other available construction.

Although scanner application 204, server application 604, and computer application 609, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 26, 34, 35, 37, 41 and 42 show the functionality and operation of an implementation of portions of scanner application 204. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as scanner processor 201, server processor 601, and computer processor 606 in a computer system or other system. The machine code can be converted from the source code, etc. If embodied in hardware, each block can represent a circuit or a number of interconnected circuits to implement the specified logical function(s).

Although the flowcharts of FIGS. 26, 34, 35, 37, 41 and 42 show a specific order of execution, it is understood that the order of execution can differ from that which is depicted. For example, the order of execution of two or more blocks can be scrambled relative to the order shown. Also, two or more blocks shown in succession in FIGS. 26, 34, 35, 37, 41 and 42 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including scanner application 204, server application 602, and computer application 609, that comprises software or code can be embodied in any computer-readable storage medium for use by or in connection with an instruction execution system such as, for example, scanner processor 201, server processor 601, and computer processor 606 in a computer system or other system. In this sense, the logic can comprise, for example, statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for controlling a specimen scanner remotely comprising the steps
   receiving by a server real-time image data of a specimen from a specimen scanner over a network, said specimen scanner comprising a stage that supports said specimen, a camera pointed at said stage, one or more lenses, and one or more light sources directed at said stage;
   transmitting said real-time image data to a remote computer over said network such that a user at said remote computer can view said real-time image data;
   providing by said server a graphical user interface to said remote computer connected to said network, said remote computer not local to said specimen scanner, said graphical user interface operable to receive instructions to control said stage, choose a lens of said one or more lenses, or adjust said one or more light sources;
   receiving said instructions by said server from said remote computer;
   transmitting said instructions to said specimen scanner to control said specimen scanner based on said instructions, said instructions adjusting said real-time image data being captured by said specimen scanner; and
   transmitting to said remote scanner adjusted real-time image data to said remote computer over said network such that said user at said remote computer can view said updated real-time image data.

2. The method of claim 1 wherein said instructions comprise a lens setting that chooses a lens from said one or more lenses.

3. The method of claim 1 wherein said instructions comprise a light setting that adjusts said one or more light sources.

4. The method of claim 3 wherein said one or more light sources comprises a reflective light source.

5. The method of claim 4 wherein said light setting adjusts a color of said reflective light source.

6. The method of claim 3 wherein said one or more light sources comprises a transmitted light source.

7. The method of claim 1 wherein said instructions comprise the step of adjusting focus using a focus control of said graphical user interface, wherein adjusting said focus control results in moving said stage along a z-axis.

8. The method of claim 1 wherein said instructions comprise the step of adjusting focus using a focus control of said graphical user interface, wherein adjusting said focus control results in moving said camera along a z-axis.

9. The method of claim 1 wherein said instructions comprise a panning instruction that results in said stage moving along an x-axis and a y-axis.

10. The method of claim 1 wherein said instructions is to create one or more scans using said specimen scanner.

11. The method of claim 10 wherein said one or more scans comprise a focus-stacked scan.

12. The method of claim 10 wherein said one or more scans comprise a multi-dimensional scan.

13. The method of claim 10 wherein said one or more scans comprise a focus-stacked scan and a multi-dimensional scan.

14. The method of claim 10 wherein said scan is of a petrographic specimen.

15. The method of claim 10 comprising the step of transmitting to said remote computer a file structure comprising at least a portion of said one or more scans.

16. A system for controlling a specimen scanner remotely comprising
   a server memory comprising
      a server application, and
      a server data store; and
   a server processor that at the direction of said server application
      receives real-time image data of a specimen from a specimen scanner over a network, said specimen scanner comprising a camera, a stage that supports said specimen, one or more lenses, and one or more light sources directed at said stage;
      transmits said real-time image data to a remote computer over said network such that a user at said remote computer can view said real-time image data;
      provides a graphical user interface to said remote computer connected to said network, said remote computer not local to said specimen scanner, said graphical user interface operable to receive instructions to control said camera, choose one of said lenses, or adjust said light sources;
      receives said instructions from said remote computer;
      transmits said instructions to said specimen scanner to control said specimen scanner based on said instructions, said instructions adjusting said real-time image data being captured by said specimen scanner; and
      transmits to said remote scanner adjusted real-time image data to said remote computer over said network such that said user at said remote computer can view said updated real-time image data.

17. The system of claim 16 wherein said camera captures said real-time image data of said specimen.

18. The system of claim 16 wherein said light source comprises a reflective light source.

19. The system of claim 16 wherein said light source comprises a transmitted light source.

20. The system of claim 17 wherein said real-time image data is a video.

21. The system of claim 17 wherein said real-time image data is an image.

22. A non-transitory computer readable storage medium that stores a computer readable program code, wherein the computer readable program code is adapted to be executed to receive real-time image data of a specimen from a specimen scanner over a network, said specimen scanner comprising a camera, a stage that supports said specimen, one or more lenses, and one or more light sources directed at said stage;

transmit said real-time image data to a remote computer over said network such that a user at said remote computer can view said real-time image data;

provide a graphical user interface to said remote computer connected to said network, said remote computer not local to said specimen scanner, said graphical user interface operable to receive instructions to control said camera, choose one of said lenses, or adjust said light sources;

receive said instructions from said remote computer;

transmit said instructions to said specimen scanner to control said specimen scanner based on said instructions, said instructions adjusting said real-time image data being captured by said specimen scanner; and transmit to said remote scanner adjusted real-time image data to said remote computer over said network such that said user at said remote computer can view said updated real-time image data.

* * * * *